(12) United States Patent
Annem et al.

(10) Patent No.: US 8,271,700 B1
(45) Date of Patent: Sep. 18, 2012

(54) LOGICAL ADDRESS DIRECT MEMORY ACCESS WITH MULTIPLE CONCURRENT PHYSICAL PORTS AND INTERNAL SWITCHING

(75) Inventors: Babysaroja Annem, Allentown, PA (US); David J. Clinton, Coopersburg, PA (US); Praveen Alexander, Royersford, PA (US)

(73) Assignee: PMC-Sierra US, Inc., Sunnyvale, CA (US)

( * ) Notice: Subject to any disclaimer, the term of this patent is extended or adjusted under 35 U.S.C. 154(b) by 0 days.

(21) Appl. No.: 13/012,296

(22) Filed: Jan. 24, 2011

Related U.S. Application Data

(63) Continuation-in-part of application No. 12/277,194, filed on Nov. 24, 2008, now Pat. No. 7,877,524.

(60) Provisional application No. 60/989,847, filed on Nov. 23, 2007, provisional application No. 61/409,745, filed on Nov. 3, 2010.

(51) Int. Cl.
*G06F 13/28* (2006.01)

(52) U.S. Cl. .......................................... 710/26; 710/22

(58) Field of Classification Search .................... 710/22, 710/26
See application file for complete search history.

(56) References Cited

U.S. PATENT DOCUMENTS

| | | | |
|---|---|---|---|
| 6,732,198 B1 | 5/2004 | Johnson et al. | |
| 7,716,389 B1 * | 5/2010 | Bruce et al. | 710/22 |
| 2005/0149632 A1 | 7/2005 | Minami et al. | |
| 2006/0190689 A1 | 8/2006 | Niekerk | |
| 2006/0271752 A1 * | 11/2006 | Cowan et al. | 711/163 |
| 2011/0153890 A1 * | 6/2011 | Barry et al. | 710/110 |

\* cited by examiner

*Primary Examiner* — Chun-Kuan Lee
*Assistant Examiner* — David Martinez
(74) *Attorney, Agent, or Firm* — Dennis R. Haszko

(57) ABSTRACT

A DMA engine is provided that is suitable for higher performance System On a Chip (SOC) devices that have multiple concurrent on-chip/off-chip memory spaces. The DMA engine operates either on logical addressing method or physical addressing method and provides random and sequential mapping function from logical address to physical address while supporting frequent context switching among a large number of logical address spaces. Embodiments of the present invention utilize per direction (source-destination) queuing and an internal switch to support non-blocking concurrent transfer of data on multiple directions. A caching technique can be incorporated to reduce the overhead of address translation.

19 Claims, 38 Drawing Sheets

LOGICAL ADDRESS DIRECT MEMORY ACCESS WITH MULTIPLE CONCURRENT PHYSICAL PORTS AND INTERNAL SWITCHING

CROSS-REFERENCE TO RELATED APPLICATIONS

This application is a continuation-in-part of U.S. application Ser. No. 12/277,194, filed Nov. 24, 2008, which issued as U.S. Pat. No. 7,877,524 on Jan. 25, 2011, and claims the benefit of U.S. Provisional Application No. 60/989,847 filed on Nov. 23, 2007, and of U.S. Provisional Application No. 61/409,745 filed on Nov. 3, 2010, the contents of which are incorporated herein by reference in their entirety.

FIELD OF THE INVENTION

The present invention relates generally to memory communication in computers. More particularly, the present invention relates to direct memory access (DMA) address translation.

BACKGROUND OF THE INVENTION

Direct memory access (DMA) is a feature of modern computers that allows certain hardware subsystems within the computer to access system memory for reading and/or writing independently of the central processing unit. Many hardware systems use DMA including disk drive controllers, graphics cards, network cards, and sound cards. Computers that have DMA channels can transfer data to and from devices with much less Central Processing Unit (CPU) overhead than computers without a DMA channel.

Without DMA, using programmed input/output (PIO) mode, the CPU typically has to be occupied for the entire time it is performing a transfer. With DMA, the CPU can initiate the transfer, do other operations while the transfer is in progress, and receive an interrupt from the DMA controller once the operation has been completed. This is especially useful in real-time computing applications where not stalling behind concurrent operations is critical.

A typical usage of DMA is copying a block of memory from system RAM to or from a buffer on the device. Such an operation does not stall the processor, which as a result can be scheduled to perform other tasks. DMA transfers are essential to high performance embedded systems. They are also essential in providing so-called zero-copy implementations of peripheral device drivers as well as functionalities such as network packet routing, audio playback and streaming video.

Scatter/gather is used to do DMA data transfers of data that is written to noncontiguous areas of memory. A scatter/gather list is a list of vectors, each of which gives the location and length of one segment in the overall read or write request.

There are many variants of Scatter-Gather List (SGL) format, one example of which is defined in IEEE 1212.1 Block Vector Structure Specification. The format of an SGL element with a chaining example is shown FIG. 1. Within each scatter/gather element is a 4-byte buffer length and an 8-byte buffer address. There is also a 4-byte reserved field, for alignment, with the most significant bit defined as the extension bit (ext). An extension bit set to logical '1' designates the descriptor as pointing to a chained buffer of scatter/gather descriptors. Only the last scatter/gather descriptor may chain, it does not have to chain. A chained scatter/gather list may chain to another scatter/gather list. The end of the scatter/gather list is realized by matching the scatter/gather count.

A buffer length of zero, as shown in the fourth entry 40, signifies that no data is transferred for that scatter/gather element. It does not signify end of list, nor does it have any other special meaning. In addition to the above IEEE defined fields, the bit immediately to the right of the extension bit in the SGL element (eob—byte 15, bit 6) is reserved for indicating whether the SGL element is the last element for that SGL list. This bit is called the end-of-buffer (eob) bit and when set to a logical '1' indicates that the particular SGL element is the last element for that particular SGL list. The DMA ideally will not request a data length that goes beyond the cumulative length indicated by this last element for a given SGL list. If the DMA requests data beyond the last SGL element's size, the Scatter-Gather Block will trigger an error interrupt, and will freeze or halt all operations.

A DMA structure supporting SGL is a common feature of storage controller and high performance network interface cards. High-end storage controllers for Small Computer System Interface (SCSI), Serial Attached SCSI (SAS), or Fiber Channel controllers typically support a large number of directly or indirectly attached target devices, and support a number of concurrent input/output (I/O) commands per target device. Each of the outstanding commands (e.g. SCSI I/O Read or Write) is associated with at least one pre-allocated data buffer that either holds the data to be transmitted for a Write command, or provides the space to receive the data from the execution of a Read command from SCSI protocol perspective, each of the data buffers is addressed linearly as data is transferred, while physically the data buffer can be fragmented in non-contiguous regions.

The SGL is typically used to represent a user data buffer that is pre-allocated for each outstanding I/O. Typically, the storage interface bus, such as SAS links, are shared by multiple target devices when these devices are indirectly attached through expanders. As a result, the data frames from the concurrent I/O are time interleaved over a physical bus interface, each frame representing a portion of data belonging to a larger I/O. To deliver the data into the appropriate buffer associated with the I/O, the DMA engine needs to switch context from one SGL to another at the boundary of frame sequences representing different I/Os. This requirement of context switching between partial transfers among different SGLs imposes significant challenges on the DMA design as the DMA needs to track the current position of transfer at each SGL.

As noted before, physically, a data buffer is organized as a sequence of buffer fragments, as denoted by SGL. There are several reasons why the data buffers need to be fragmented.

Page fragments: The first reason is virtual memory management in the host CPU and operating system. Modern CPUs support virtual memory via the intelligent Memory Management Unit (MMU), which utilizes a hierarchy of segment and or page tables to map a logically contiguous user memory space for each process into the physical memory hierarchy, for protection of one user space from another, and to provide a linear view of memory from each user process. This also allows the logical memory space to be much larger than the actual physical main memory space by swapping a certain region of logical memory that is currently not in use with much larger disk swap space. Before a data buffer can be used as a DMA data buffer, typically, the application layer allocates a data buffer in virtual address space, the kernel or device driver page locks the virtual address buffer to ensure the entire virtual address buffers are loaded and fixed in physical main memory space (no swapping to disk). Since the virtual to physical address translation is done based on MMU pages (e.g. 4K byte long physical memory that is perfectly aligned at 4K address boundaries), the virtual buffer is now mapped into a sequence of physical pages, each page being uniform in size and alignment that can be presented by a SGL. However, since the virtual address buffer can start at arbitrary byte address granularity, the first byte of the virtual address buffer can start from an arbitrary byte offset of a physical page. In other words, the SGL represents a sequence of uniform size pages that is page aligned, except for the first fragment that can start at arbitrary byte offset of a page, and the last fragment can end at arbitrary byte offset of another page.

Arbitrary fragments: The second form of buffer fragment can be much more constraint-free. This is often caused by an application directly using arbitrarily arranged fragments (with no size or alignment constraints) in the user space (either virtual memory of physical memory space) and using these as an I/O buffer. For example, a modern operating system (OS) supports the file system of an I/O subsystem Application Programming Interface (API) that accepts SGL as a buffer argument for disk I/Os. The purpose is to minimize unnecessary memory movement in software. For example, a user program wants to write some data fields from various data structures into a file. Instead of allocating a contiguous data buffer in the virtual address space as a temporary workspace to copy all the necessary fields before issuing the I/O from the workspace buffer, the user program chooses to create a SGL with each entry pointing to the direct location of the necessary data structure fields to be written, and then issues a write I/O operation to the file system using SGL as the argument representing the I/O buffer. This creates an I/O operation using an arbitrary SGL with the benefit of eliminating the extra step of managing the workspace buffer and the data movement between data structure and workspace.

There are a number of well-known DMA techniques that suffer from the following disadvantages.

DMA addressing: The majority of known DMA techniques operate in physical address space. This means the requestor of a DMA operation specifies a DMA request using physical addresses, or an SGL that contains physical address information for each DMA operation. This approach is quite intuitive and simple when handling data movement in contiguous data buffers. However, when the DMA operation needs to do context switching between partial transfers using different SGLs, the use of physical addressing places a significant burden on the DMA master (requestor). To enable the DMA to resume data transfer on a partial SGL buffer, the DMA needs to save much information in SGL partial transfer context, including: the current pointer in SGL, the head pointer to the SGL, the current fragment physical address, and the remaining byte count within the current fragment. Such context needs to be managed on per concurrent SGL basis. When the DMA resumes data transfer on an SGL buffer, the DMA needs to reload the partial context to allow proper physical address calculation. The SGL partial context not only adds significant complexity to both the DMA engine and the DMA master, but also adds cost for the context storage, and reduces the performance of the DMA engine because of the extra processing step involved in context management. This problem can be particularly severe in a storage controller application that needs to support a large number of concurrent I/Os (SGLs) that are time interleaved over the physical bus.

There are some DMA methods that support data transfer based on virtual addresses. This approach utilizes an address mapping structure analogous to CPU MMU. A Table Lookup Buffer (TLB) structure is used to implement a virtual address to physical address translation scheme. This approach is well suited for limited SGL buffers denoted as "page fragments" described above. However, because of the page index based lookup structure, this approach can only handle uniform size buffer fragments. Therefore, it cannot support "arbitrary fragments" that have no restrictions on the alignment and size of each buffer fragment.

Due to the complexity of SGLs involved, known DMA structures have various degrees of difficulty in supporting time interleaved partial sequential transfers with multiple SGLs, and/or random partial transfers using an SGL. It is worth noting that random partial transfers with SGL, although rare, are a necessary function to support modern storage protocols, such as SAS, that generate requests that can move the current position within a SGL buffer to a random offset (most likely backwards) while handling transport layer retry conditions.

Concurrent data transfers and request queue organization: Known DMA structures typically sit on an arbitrated system bus, which connects multiple bus masters to slaves such as the memory controller that provides access to main system memory. The DMA being a bus master can arbitrate for access of the slave (i.e. the main memory) and when the access request is granted, the DMA generates bus transactions to perform memory read or write operations. When there are multiple slave memory spaces, such as off-chip main memory space connected through a memory controller, Peripheral Component Interconnect (PCI) host memory space connected through a PCI controller, and on-chip memory space, these memory spaces are treated as independent system bus slave devices that the DMA can access through the system bus interface.

While the independent memory interfaces can operate in parallel, known DMA structures and system bus interconnects limit the concurrency of these memory spaces due to a number of common architectural characteristics causing lack of concurrent switching within the DMA datapath. For example, a shared system bus limits the transactions to one master-slave pair at anytime. As a result, when the DMA is accessing one memory interface, it cannot transfer data with a different memory transfer. In another example, of a non-blocking switch based system bus interconnect, the DMA only occupies one physical port of the system bus switch. In this state, even though the system bus allows multiple masters to access multiple slaves in a non-colliding traffic pattern, the DMA cannot transfer data with two independent slaves (memory spaces) simultaneously limited by the master port occupied by the DMA engine, because the DMA is connected to the system bus switch through one shared physical port for accessing all of the memory spaces.

Another common architectural characteristic is a Shared Request queue structure. Known DMA approaches tend to use common request First Come First Serve (FCFS) queues that are shared by data transfers in all directions, wherein the direction of a transfer is defined by the source memory space-destination memory space pair. Even though many DMA structures support multiple queue organizations based on priority or type of transfer, the lack of segregation of request queues based on direction of data movement fundamentally limits the parallelism of data transfer because of Head of Line (HOL) blocking issue. Consequently, such DMA engines cannot fully utilize the parallel bandwidth of the physical memory spaces. For example, if request A wants to move a piece of data from PCI to Double Data Rate (DDR) memory, while request B wants to move another piece of data from internal memory to PCI. Even though the physical memory spaces (PCI interface read, DDR write, internal Random Access Memory (RAM) read, PCI interface write) can support the parallel execution of transfers A and B, when A and B are posted into a common queue in sequence, such two transfers will take place sequentially, resulting in idle time of the memory bus interfaces at various time stages, which in turn means lower system throughput, longer processing time for a given task, more waste of bandwidth on the memory and external interfaces.

SGL caching: Known DMA engines that handle SGL require the DMA engine, or the DMA master/requestor to keep track of the SGL context for each list, including the pointer to the current SGL entry, the current offset within the SGL fragment, the pointer to the head of the SGL, etc. Or, alternatively, for prior art architectures that do not keep SGL context, the DMA engine is required to perform full SGL traversal for each DMA transfer using SGL. The first approach not only adds the cost of context storage on a per SGL list basis, but also adds significant complexity to the DMA master for the interpretation of SGL format, SGL traversal, context maintenance and manipulation.

Internal switch—Virtual Output Queuing (VOQ): Known DMA engines use a combination of a VOQ buffer and crossbar switch with VOQ arbiter for achieving non-blocking data transfer between input and output ports of the crossbar. The application of known crossbar arbitration techniques requires the data transfers to be divided into fixed time slots, corresponding to fixed data cell sizes, so that all ports can operate in lockstep based on a fixed time scale. Due to speed differences among the different memory spaces, applying fixed time slot techniques requires a certain amount of output buffer to be reserved for rate adaptation, and for adaptation between different native burst sizes.

Port trunking: Known DMA engine throughput is limited to the speed of the individual physical port of the memory interface. There is no known DMA method that can increase the data throughput via the use of striping data across multiple physical ports to the same memory space while preserving the ordering or DMA operations and indications.

Hole Insertion/Removal: Known DMA engines lack the capability to insert or remove holes within the data stream based on pre-defined fixed spacing between the adjacent holes and the pre-defined gap size of the hole. Such a feature can be useful for handling Data Protection Information (DPI) which requires the insertion of a checksum and tags on a per sector basis.

Endianess transformation: Known DMAs operate on consistent bus endianess format. Hence, they are incapable of transferring data between buses with different width and endianess definitions. A system where such a requirement exists would be, for example, a System On Chip (SOC) having a big-endian 32-bit CPU that needs to transfer a block of data to a PCI space that organizes data in 64-bit little-endian format.

Descriptor pipelining to accommodate very long bus latency: Known DMAs process one DMA descriptor at a time. Some designs pre-fetch the next DMA descriptor while the current DMA descriptor is in progress to overlap the time of descriptor fetching and the DMA transfer. Such designs with single or dual descriptors in the processing pipeline are sufficient to achieve high system throughput when the latency for a descriptor is low compared to the processing time for the actual DMA transfer. However, for systems where the DMA transfer is dominated by small transfers (transfer a small number of bytes) and the bus latency for descriptor fetching is low, the throughput declines because the DMA incurs idle time waiting for DMA fetching due to the long latency. To achieve high throughput in high latency systems for small DMA transfers, novel architecture enhancements are necessary.

DMA Bypass Mode: Known DMA controllers do not support DMA transfer where the descriptor is fetched and written back immediately without transferring data from source node to sink node. This feature could be useful in system level performance analysis.

It is, therefore, desirable to provide an improved DMA approach that overcomes one or more of the disadvantages of current DMA approaches.

SUMMARY OF THE INVENTION

Due to the shortcomings of both physical address DMA and virtual address DMA, there exists a pressing need to solve the DMA address translation by treating each logical data buffer as one independent linear logical space, while the underlying physical memory is defined by an SGL with arbitrary fragments. This approach is an element of embodiments of the present invention that are called logical addressing and address translation based on SGL.

Embodiments of the present invention adopt a switch fabric design technique and apply it in combination with a read port arbiter, read port logic and the write port logic to achieve non-block concurrent operation of DMA channels. Embodiments of the present invention further utilize an arbitration scheme that is not based on fixed time slots for data transfer.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 28 illustrates 10-byte data in little-endian on a 64-bit data bus (Starting Address=3) according to an embodiment of the present invention;

FIG. 29 illustrates 10-byte data in little-endian on a 128-bit data bus (Starting Address=3) according to an embodiment of the present invention;

FIG. 30 illustrates 10-byte data in 32-bit big-endian on a 64-bit data bus (Starting Address=3) according to an embodiment of the present invention;

FIG. 31 illustrates 10-byte data in 32-bit big-endian on a 128-bit data bus (Starting Address=3) according to an embodiment of the present invention;

FIG. 32 illustrates 10-byte data in 64-bit big-endian on a 64-bit data bus (Starting Address=3) according to an embodiment of the present invention;

FIG. 33 illustrates 10-byte data in 64-bit big-endian on a 128-bit data bus (Starting Address=3);

DETAILED DESCRIPTION

Figure 1:
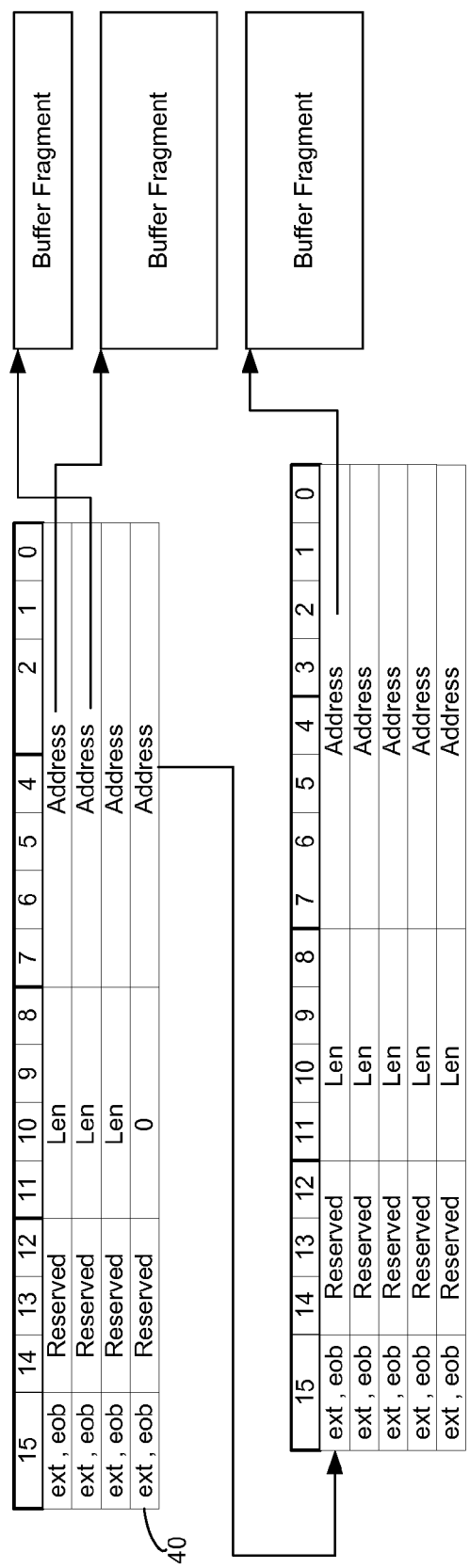
FIG. 1 illustrates a scatter gather element in IEEE 1212.1 format.

Generally, the present invention provides a DMA engine that is suitable for higher performance SOC devices that have multiple concurrent on-chip/off-chip memory spaces. The DMA engine operates either on a logical addressing method or physical addressing method and provides random and sequential mapping functionality from logical addresses to physical addresses, while supporting frequent context switching among a large number of logical address spaces. Embodiments of the present invention utilize per direction (source-destination) queuing and an internal switch to support non-blocking concurrent transfer of data in multiple directions. A caching technique can be incorporated to reduce the overhead of address translation. Embodiments of the present DMA architecture utilize a number of techniques to address the problems that exist in known DMA structures. The described system and methods are particularly useful in high performance applications, such as RAID On a Chip SOC applications (ROC SOC).

The architecture discussed in relation to embodiments of the present invention is not restricted to storage systems. This can be implemented in any network system that requires transferring data between multiple memory resources, and is particularly applicable to RAID controllers.

In the following description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof. Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

FIGS. 2A, 2B, 2C and 2D is a block diagram of a DMA engine architecture, according to an embodiment of the present invention. DMA engine 100 supports multiple concurrent data transfers across various memory spaces simultaneously. DMA engine 100 is capable of high performance operation due in part to an SGL cache architecture, reliable data transfer operation and provides diagnostic features such as error handling management. These features are discussed in further detail later.

The example configuration of DMA engine 100 shown in FIGS. 2A to 2D is a 16-channel, fully programmable controller that efficiently supports concurrent DMA transfers. DMA engine 100 handles data movement among three memory spaces—the Global Shared Memory (eGSM), the PCIe Host Memory and the DDR DRAM Memory. A DMA requester (not shown) stores the descriptor in eGSM shared memory and the corresponding descriptor index in one of 64 GSM descriptor queues, and then initiates a DMA request to DMA engine 100. The DMA engine 100 descriptor specifies how data movement operation will be executed. The DMA engine 100 descriptor is defined as a Message Frame (MF) and the address pointer to the MF is called Message Frame Address (MFA). The MFA pointers are written and read out of the messaging GSM descriptor queues and the MFs are stored in the shared memory of DMA requester.

The DMA engine 100 embodiment of FIGS. 2A-2D includes 8 DMA channels 102, 104, 106, 108, 110, 112, 114 and 116, a Message Frame Address (MFA) read interface 118, a read descriptor round robin direction arbiter 120, a write back MFA round robin direction arbiter 122, and an MFA write interface 124. DMA sub-channel 102 is used for PCIe to DDR data transfers. DMA sub-channel 104 is used for DDR to PCIe data transfers. DMA sub-channel 106 is used for PCIe to GSM data transfers. DMA sub-channel 108 is used for GSM to PCIe data transfers. DMA sub-channel 110 is used for DDR to DDR data transfers. DMA sub-channel 112 is used for DDR to GSM data transfers. DMA sub-channel 114 is used for GSM to DDR data transfers. DMA sub-channel 116 is used for GSM to GSM data transfers. DMA read descriptors provided by read descriptor round robin direction arbiter 120 for a particular transfer is provided to the corresponding DMA sub-channel, and a corresponding write MFA is provided to the write back MFA round robin direction arbiter 122.

Each of the 8 DMA channels include a queue arbiter and descriptor fetching engine 126, read pre-fetch FIFO's 128, write pre-fetch FIFO's 130, MFA in-flight FIFO's 132, read control engine 134, write control engine 136, a read port arbiter 138, a read port or read port engine 140 which can include a CP buffer 142, a write port interface controller 144, a write port or write port engine 146, a descriptor fetching engine 148, and a write MFA arbiter 150. Elements 128, 130, 134, 136, 152 and 154 can be considered part of a DMA descriptor processor. While these listed components are common to all the DMA channels 102, 104, 106, 108, 110, 112, 114 and 116, some differ in componentry over others. As will be described later, read port 140 can include parity logic for supporting local parity for transfers within the DMA engine, and write port 146 can include corresponding parity logic for ensuring that the received data is error free. For example, the read port can include logic for calculating and adding corresponding parity bits to the data being transferred within the DMA engine, while the write port can include parity decoding and correction logic for detecting and correcting errors prior to outputting the data. Channels 102, 104 and 110 include a shared SGL controller 152 for read control engine 134 and a shared SGL controller 154 for write control engine 136. Channels 106 and 112 include a shared SGL controller 152 for read control engine 134. Channels 108 and 114 include a shared SGL controller 154 for write control engine 136, while sub-channel 116 does not have any shared SGL buffers.

Figure 3:
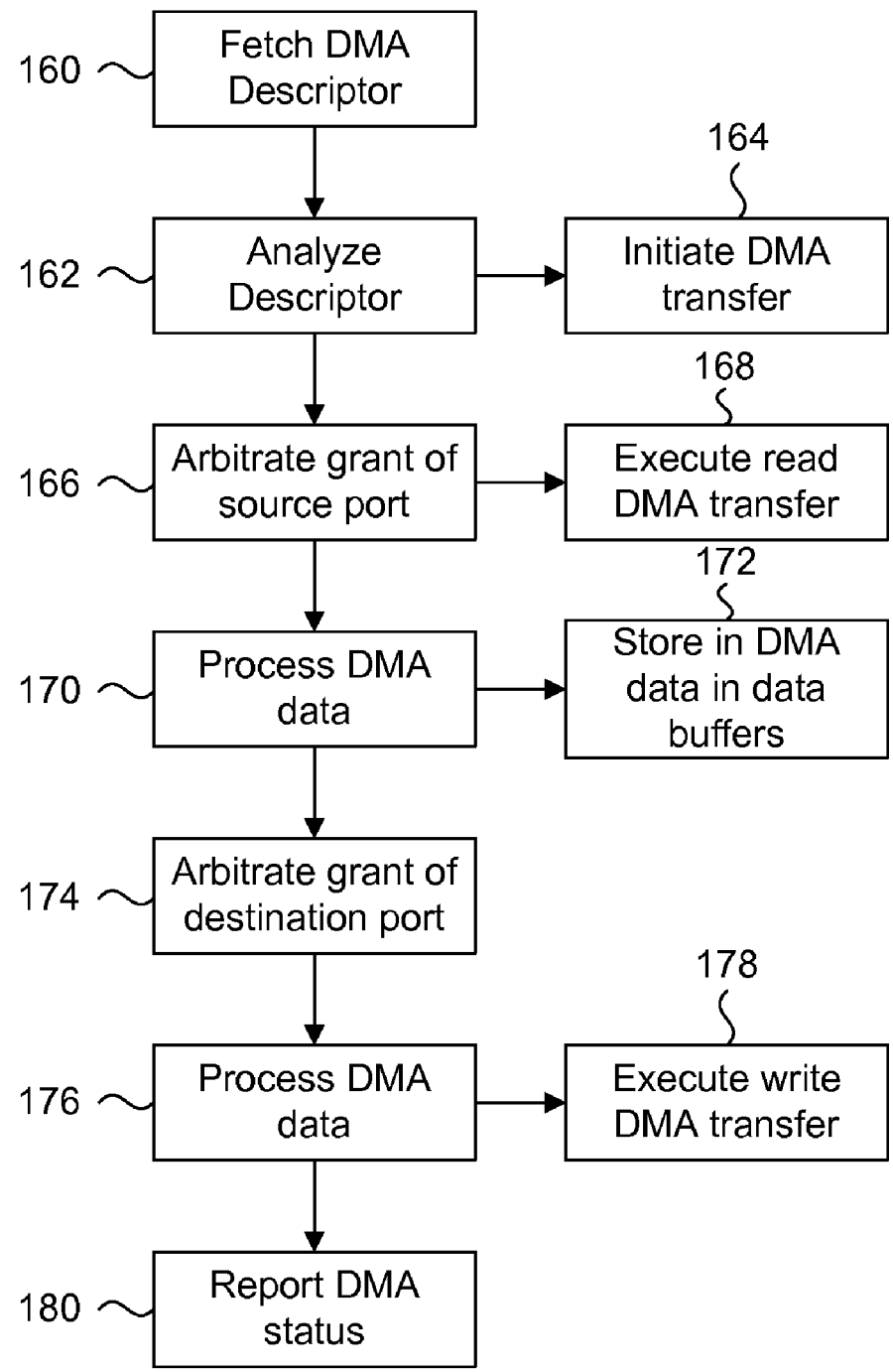
FIG. 3 is a flow chart showing general operation of the DMA engine embodiment of FIGS. 2A to 2D, according to a present embodiment.

A general description of the operation of DMA engine 100 now follows with reference to the flow chart of FIG. 3. The operating method begins at step 160 where a DMA descriptor for the queue granted for a specific DMA direction is fetched. Following at step 162, the descriptor control word is analyzed and then the DMA transfer is initiated at step 164. At step 166, granting of the source port is arbitrated, and the read DMA transfer is executed at step 168. The DMA data is processed at step 170 based on the control information in the DMA, and then stored in data buffers at step 172. Subsequently at step 174, arbitration for grant of the destination port is determined. The DMA data is processed based on the control information related to destination port at step 176, and the write DMA transfer is executed at step 178. In concluding the operation, the DMA status is reported back to the DMA requester that issues and stores the descriptors at step 180.

Following is a more detailed description of a DMA transfer operation, beginning with the descriptor fetching operation, followed by the read DMA operation and ending with the write DMA operation, according to the present embodiments. The following description applies to any one of the DMA channels 102, 104, 106, 108, 110, 112, 114 and 116.

Descriptor Fetch

Each DMA direction is associated with two priority channels, a high priority channel and a low priority channel. Accordingly, there are two read pre-fetch FIFO's 128, two write pre-fetch FIFO's 130 and corresponding read control blocks 134 and write control blocks 136. The DMA requester can assign a data transfer request to any of the available 64 GSM descriptor queues by configuring the appropriate base address registers. These descriptor queues are configured with all the required information to initiate a DMA transfer.

Each DMA direction is associated with a GSM descriptor queue arbiter and descriptor fetching engine 126. The queue arbiters 126 poll through GSM descriptor queues activated by the DMA requester. Each of these GSM Descriptor Queues contains control information required to fetch DMA descriptors (MF). The granted GSM descriptor queue is used by the associated descriptor fetching engine 126 of that DMA direction. Since there are multiple descriptor fetching engines 126 that need to access their respective GSM descriptor queues to fetch DMA descriptors, they arbitrate again among themselves for accessing the GSM memory interface in a round robin order.

The DMA descriptor fetching engine 126 initiates request to access GSM interface arbiters to fetch descriptor index (MFA) and subsequently descriptor (MF). These read requests belonging to different DMA directions get arbitrated for accessing the GSM MFA/MF ports. The DMA engine 100 supports two GSM ports to fetch MFA/MF or write back MFA. For example, one GSM port (eg. Port 9) is used for read/write access of MFA while another GSM port (eg. Port 10) is used for reading MF. Since the AXI interface to GSM ports supports independent address and data channels, the DMA engine 100 can process two read operations—one in address phase and the other in data phase concurrently.

On fetching a descriptor, the control information is interpreted and stored in descriptor context buffers separately for read and write data transfer operations, such as in read pre-fetch FIFO's 128 and write pre-fetch FIFO's 130. This facilitates in letting read DMA transfer to be independent of write DMA transfer and thereby support handling multiple DMAs concurrently. These descriptor context buffers will be filled with descriptors as long as there is an empty slot available in the buffer provided that there are valid DMA requests issued by the DMA requester. The descriptor index along with associated DMA Completion Context is stored in a separate FIFO called MFA In-Flight FIFO 132. Whenever the DMA engine 100 completes a data transfer, the respective Write Port Engine 146 will update the DMA completion status in this FIFO. Each DMA channel includes a separate high priority sub-channel and a low priority sub-channel, where each sub-channel has a read DMA control engine 134 and a write DMA control engine 136.

Read DMA Operation

A Read DMA data transfer starts once the descriptor fetching engine 126 has at least one valid DMA descriptor in its descriptor context buffers. Read control engine 134 would request the descriptor fetching engine 126 to issue a new descriptor. On receiving the descriptor, it processes the control information to identify whether the DMA transfer is associated with SGL, DPI or 4K boundary crossing, and breaks DMA into multiple read commands. In the present example, a read command can have a byte count range from 1 Byte to a maximum of 1K bytes.

In the case of DMA transfers involving SGL mode, the read control engine 134 issues requests to an SGL controller, such as SGL controller 152 or 154 for logical to physical address translation before generating the read command.

The read control engines 134 that have a common source port are subject to arbitration for grant of read port engine 140. The source port arbiter 138 issues access to one of the requesting read control engines 134 based on either weighted round robin mode access or strict priority mode access. The access is granted to one read control engine 134 at a time is based on the availability of buffer slots in the read DMA engine data buffer. The granted read control engine now has full accessibility over the read DMA Port Engine 140.

On completion of issuing read commands for the DMA in-flight, even while the data for read commands is in-flight, the read control engine 134 issues a posted completion status to the descriptor fetching control engine 126 and fetches a new DMA descriptor. The components of read port 140 are first described in order to better describe the operations occurring therein for a read operation.

Figure 4:
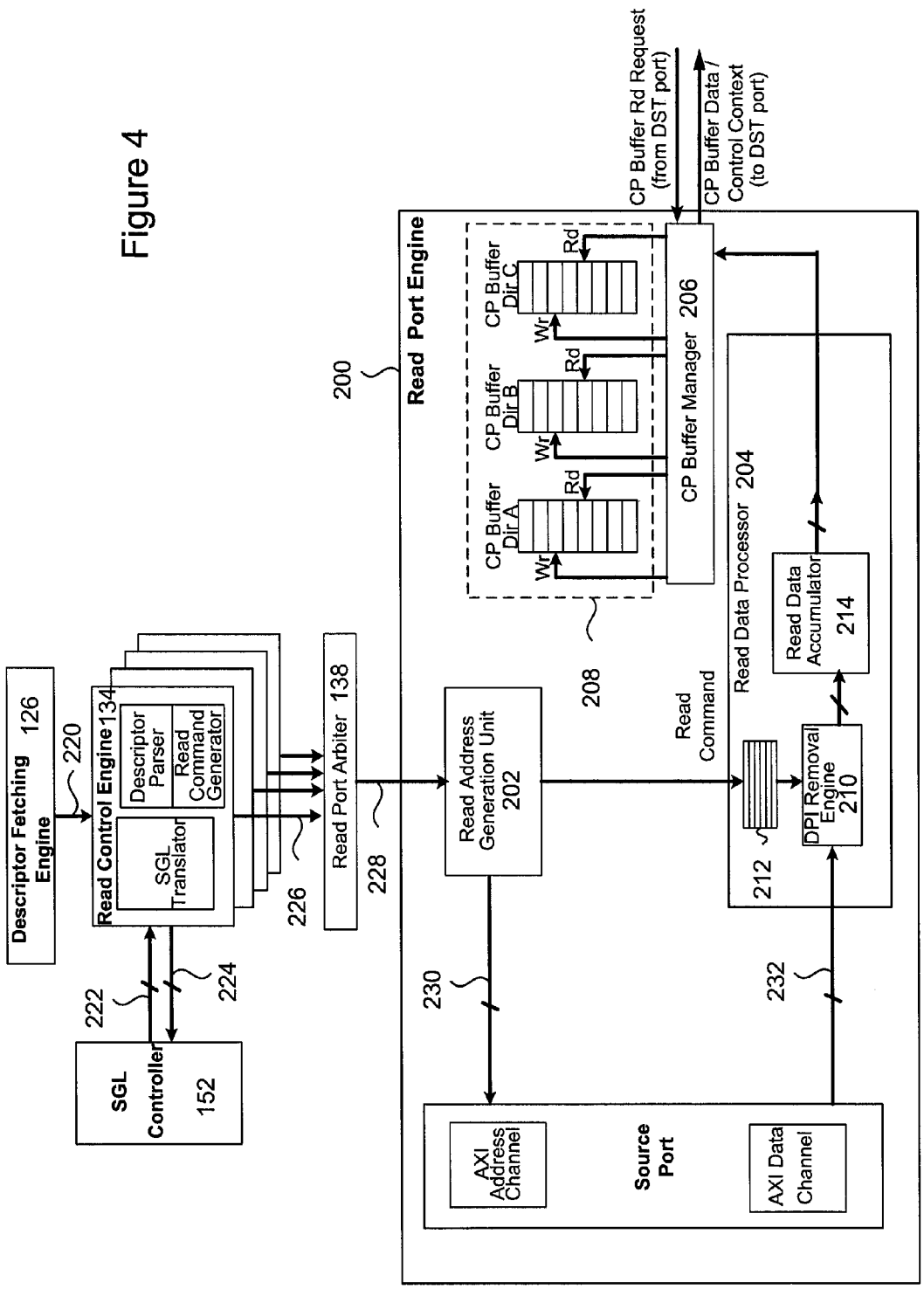
FIG. 4 is a block diagram of the read port of the DMA engine embodiment of FIGS. 2A to 2D.

An embodiment of the read port 140, also referred to as a read DMA port engine, is shown in FIG. 4. The read DMA port engine 200 includes a read address generation unit 202, a read data processor 204, and a CP buffer management unit including a CP buffer controller 206 with CP buffers 208. The read data processor includes a DPI removal engine 210, a read command FIFO 212, a read data accumulator 214 and a CRC Generator 216. The other components appearing external to read DMA port engine 200 are previously shown and described in FIGS. 2A, 2B, 2C and 2D, some of which are shown again in FIG. 4 to illustrate the read operation.

To re-summarize the read operation prior to operations by the read DMA port engine 200, the queue arbiter and descriptor fetching engine 126 provides a read DMA descriptor at arrow 220. If the current DMA transfer is in the SGL mode, the read control engine 134 receives a read command logical address at arrow 222, and translates it into a read command physical address which is provided back to SGL controller 152 at arrow 224. The read control engine 134 includes a descriptor parser and read command generator which provide a read command context to the read port arbiter 138 at arrow 226. The read port arbiter 138 determines which read control engine 134 should be granted access to the read port engine 200, and provides the granted read command at arrow 228. On receiving the granted read command from read control engine 134, the read address generation unit 202 parses through the control information and issues AXI read requests via read address channel 230

On completion of issuing all the AXI requests, the read AXI request generator (not shown) issues read request completion which causes the read DMA port engine 200 to allow access for the next pending read command. In this way, while the data is in-flight owing to longer round trip data latency, the DMA engine 100 can support issuing multiple read AXI transactions concurrently. The granted read command sent to the read address generation unit 202 is stacked up in read command FIFO 212 for reference by read data processor 204. The sizing of the read command FIFO 212 should be able to support all the read commands in-flight for the source port. The DPI removal engine 210 receives the read command context from read command FIFO 212 and generates a read data strobe signal for the incoming data received from read data channel 232. During this process, the DPI removal engine 210 disables the read data strobe whenever it detects DPI bytes in the read data channel 232. The read data accumulator 214 receives the same read command context as DPI removal engine 210 from the read command FIFO 212. It receives the read data from source port and the appropriate read data strobe from the DPI removal engine 210, and packs them into a 32-byte word.

These 32-byte words are sent to the CP buffer controller 206 to be written or stored, to the appropriate CP buffer 208. The CP buffers 208 are dedicated on a per DMA direction, and the CP Buffer Controller 206 keeps track of the read command context and read/write data transfer related to CP buffers.

Before discussing a write DMA operation, a description of a cross-bar switch based datapath controller follows.

Cross Bar Switch Based Datapath Controller

Figure 5:
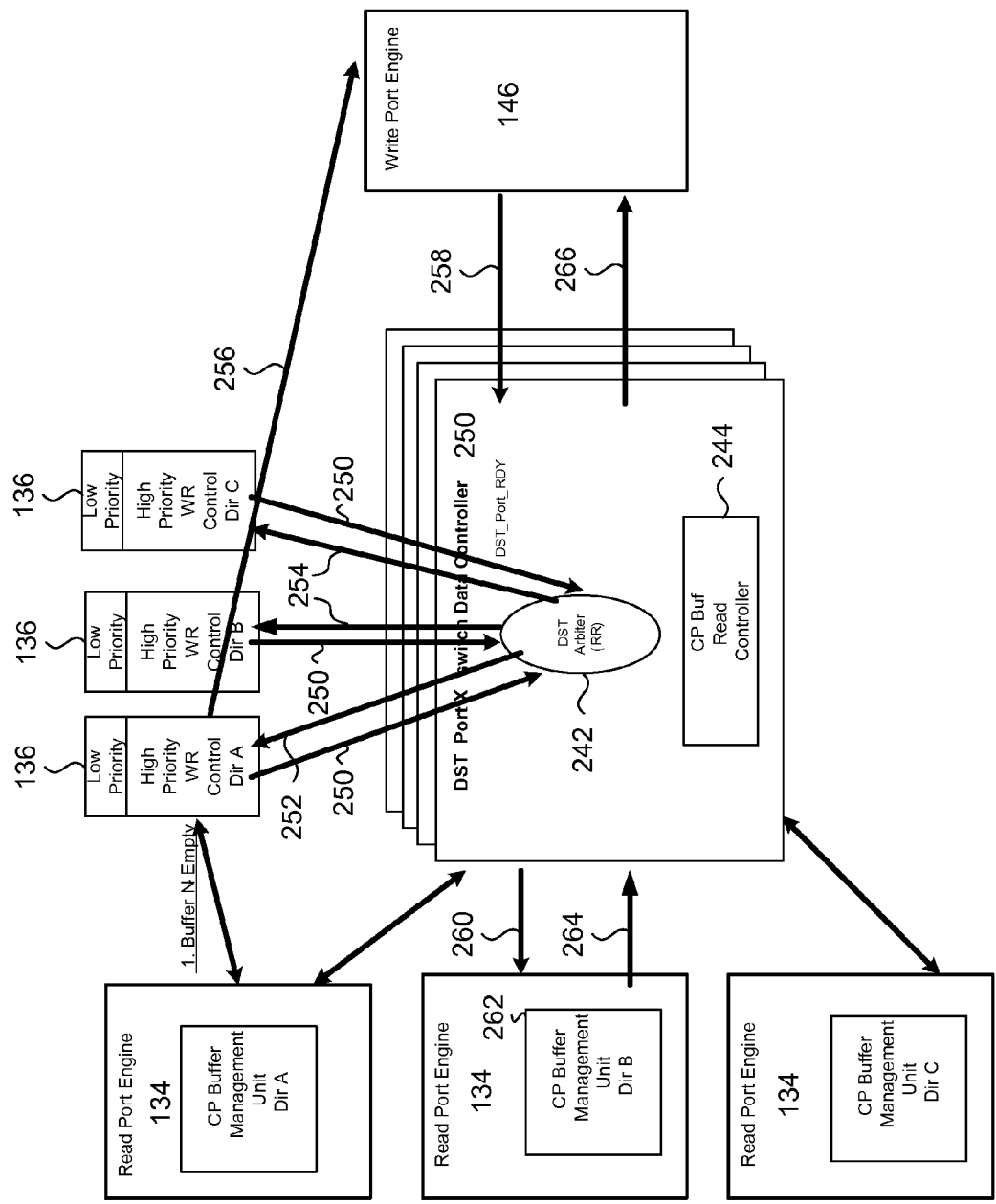
FIG. 5 is a block diagram showing the functional relationship of an embodiment of a cross bar switch data path controller with other components of the DMA engine embodiment of FIGS. 2A to 2D, according to a present embodiment.

FIG. 5 is a block diagram showing the functional relationship of an embodiment of the write port interface controller 144, also referred to as a cross bar switch based datapath controller 240, and the other components in the channel. The cross bar switch based datapath controller 240 consists of four write port arbiters 242. In the present example, each of the four issues write commands to DDR, PCIe, D2G/G2G and P2G directions with the associated control logic, and includes an associated CP buffer read controller 244. Each of these arbiters 242 receive requests from write control engines, such as write control engines 136, and a control status from destination port indicating that it is ready to process a write command. Based on this control information, the write port arbiter 242 grants access to one of the requesting write control engines 136 to access write port engine 146. The write command control information is sent to the write port engine 136 for data transfer. The write port interface controller 144 also generates a read address for the respective CP buffer read operation from a read control engine 134, under the control of CP buffer read controller 244.

An example operation flow of FIG. 5 follows. The write control engines 136 each issue requests 250 for access of the write port engine 146 to write port interface controller 144. The arbiter 242 issues a grant 252 to one of the write control engines 136, while issuing grant refusals 254 to the other write control engines 136. The write control engine 136 receiving the grant 252 then issues a write command context to write port engine 146 at arrow 256. Write port engine 146 then sends a CP buffer read request to write port interface controller 144 at arrow 258. The CP buffer read controller 244 processes the request and issues its own CP buffer read request to the selected read control engine 134 at arrow 260. This request is received by the CP buffer management unit 262 of the selected read port engine 134, which subsequently sends CP buffer data/control context information to the write port interface controller 144 at arrow 264. The control context information is processed by the CP buffer read controller 244, and the CP buffer data is provided to write port engine 146 at arrow 266.

Write DMA Operation

Write DMA data transfer starts once the descriptor fetching engine 126 has at least one valid DMA descriptor in its descriptor context buffers. Write control engine 136 would request descriptor fetching engine 126 to issue a new descriptor. On receiving the descriptor, it waits to receive CP Buffer write completion status from the corresponding read port engine 140 to initiate generating write commands. A write command has a byte count range from 1 byte to a maximum of 1K bytes.

In the case of DMA transfers involving SGL mode, the write control engine 136 sends the write command containing a logical address to the write port engine 146. On receiving a new descriptor, the write control engine 136 also can initiate requests to the SGL controller 154 for fetching the physical context of SGL fragments associated with the DMA. The write port engine 146 issues the logical context sent via the write command towards write control engine 136 to fetch the physical context of the SGL buffer.

The write control engines 136 that have a common destination port arbitrate for grant of the write port engine 146. The write port arbiter 242 issues access to one of the requesting write control engines 136 based on round robin mode. The access is granted to one write control engine 136 at a time based on the availability of a filled CP buffer slot for the respective DMA direction and the write port engine 146 being ready to process new write commands. The granted write control engine 136 now has full accessibility over the write DMA port engine 146.

On completion of the data transfer of the current write command, while the response completion of this write command is in-flight, the write control engine 136 can issue the next write command to be processed by the write port engine 146. When the last write command of a DMA is received by the respective write port engine 146, the write control engine 136 proceeds to fetch the next pending DMA. When the response completion of the last AXI transfer for the last write command of a DMA is received by write port engine 146, a DMA completion for the DMA in-flight is triggered. A DMA completion triggers the descriptor fetching engine 126 to write back updated descriptor status and descriptor index back to GSM descriptor queues.

Figure 6:
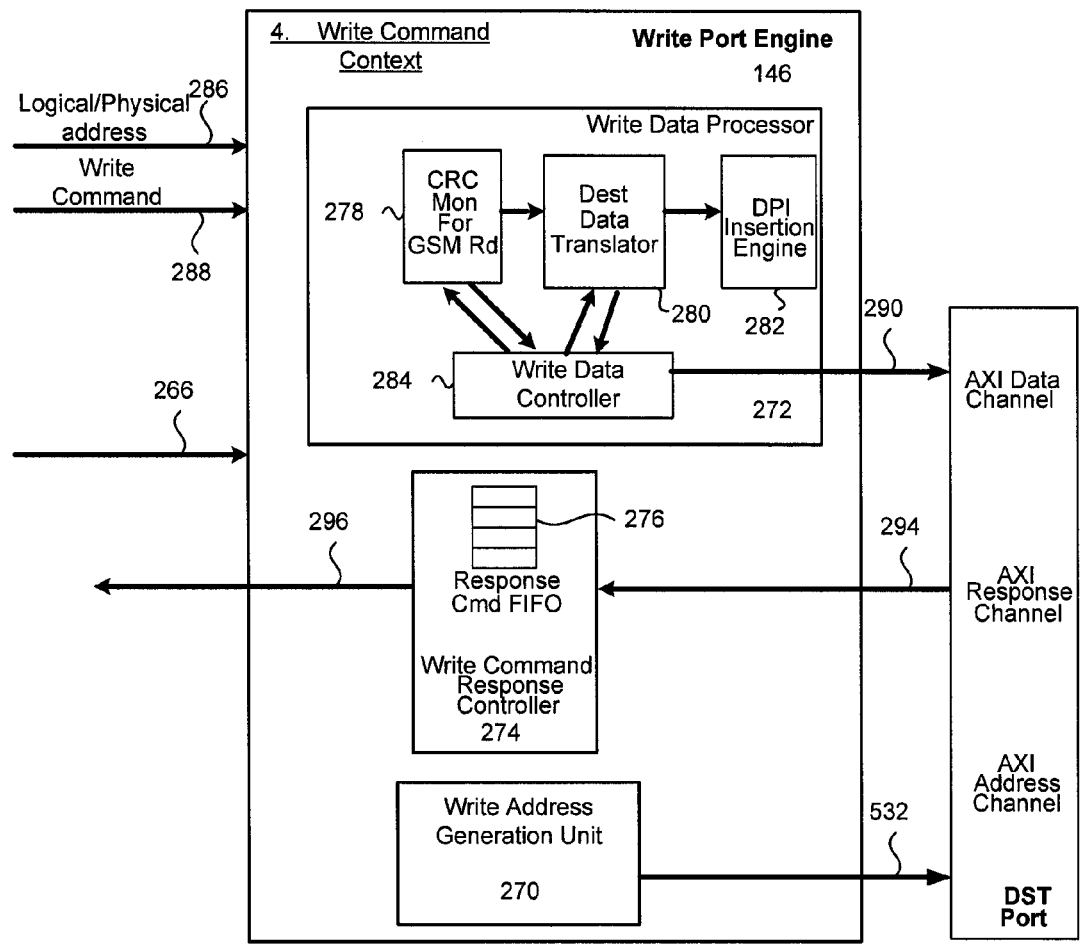
FIG. 6 is a block diagram showing components of a write port engine, according to a present embodiment.

FIG. 6 is a block diagram showing some of the components of write port engine 146, according to a present embodiment. The write port engine 146 includes a write address generation unit 270, a write data processor 272 and a write response controller 274. The write response controller 274 includes a response command FIFO 276. In the case of a GSM write port engine, the write data processor 272 can include a CRC Monitor and Output Buffer 278. The write data processor 272 can further include a destination data translator 280, a DPI engine 282, and a write data controller 284. To complete the write operation, the following actions are taken by the write port engine 146.

After receiving CP buffer data at arrow 266, the write address generation unit 270 receives the write command from the granted write control engine 136, which can include one or both physical and logical address information as shown by arrows 286 and 288. The received CP buffer data is then processed by write data processor 272 to provide the write data at arrow 290. The write address generation unit 270 provides a write address request concurrently with the write data at arrow 292. It is noted that each write command is broken into multiple AXI write transactions. Eventually, the completion response shown by arrow 294 for each of the write AXI requests is monitored by the write response controller 274, which in-turn generates DMA completion status for the descriptor fetching engine. The DMA completion status is shown at arrow 296.

Addressing and Address Translation Method

Figure 7A:
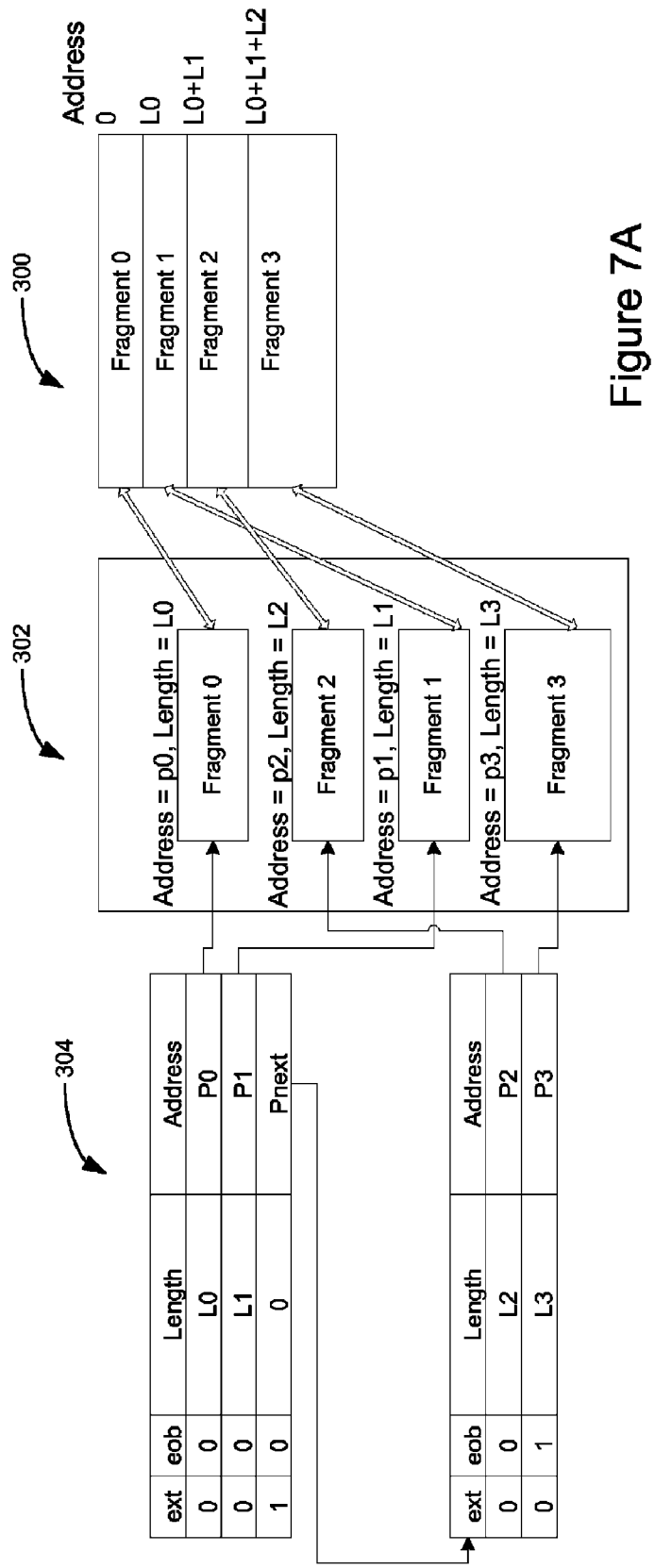
FIG. 7A illustrates a logical offset to physical address translation within one SGL according to an embodiment of the present invention.

Embodiments of the present invention utilize a logical buffer address to physical address translation scheme to simplify the processing of partial buffer transfer using a large number of concurrent SGLs. FIG. 7A illustrates the mapping of a contiguous logical offset address, as denoted by the contiguous logical offset address space 300, to a physical SGL buffer consisting of four physical buffer fragments, as shown in the fragmented physical memory address space buffer 302, with arbitrary address alignment and arbitrary fragment length, as denoted by the chained SGL 304. This address translation scheme allows a DMA master/requestor to view the fragmented SGL buffer 302 as the single contiguous logical address space 300 that can be accessed in a random fashion.

Since the SGL 304 involved defines the SGL buffer as a sequence of four buffer fragments, denoted as Fragment0 through Fragment3, the SGL defines the logical address space as an independent contiguous address space starting at logical offset 0, and ending at logical offset (L0+L1+L2+L3−1) equal to the total length of all buffer fragments. Logical offset 0 through L0−1 is mapped to the physical address of Fragment0, i.e. P0, P0+1, . . . (P0+L0−1). Similarly the logical offset addresses starting from L0, L0+1, through L0+L1−1 are mapped to the physical address range occupied by Fragment1, as represented by physical address range P1, P1+1, . . . P1+L1−1. This process mapping is defined by the following process:

X: the logical offset address
N: the total number of SGL fragments
P[I] (I=0 . . . N−1): the physical start address of FragmentI
L[I] (I=0 . . . N−1): the length of physical FragmentI
Y: the physical address corresponding to logical offset address X.

For X within the range of $$\left[0, \sum_{i=0}^{N-1} L[i] - 1\right],$$

$$Y = \text{mapping}(X) = P[j] + X - \sum_{i=0}^{j-1} L[i]; \text{ where } X \in \left[\sum_{i=0}^{j-1} L[i], \sum_{i=0}^{j} L[i]\right);$$

The formula above defines the mapping of logical offset addresses using a single, or chained, SGL. This concept is further extended to define a single logical address space that can handle multiple SGL lists, and SGL buffer fragments that can reside in multiple physical memory spaces as well.

Figure 8:
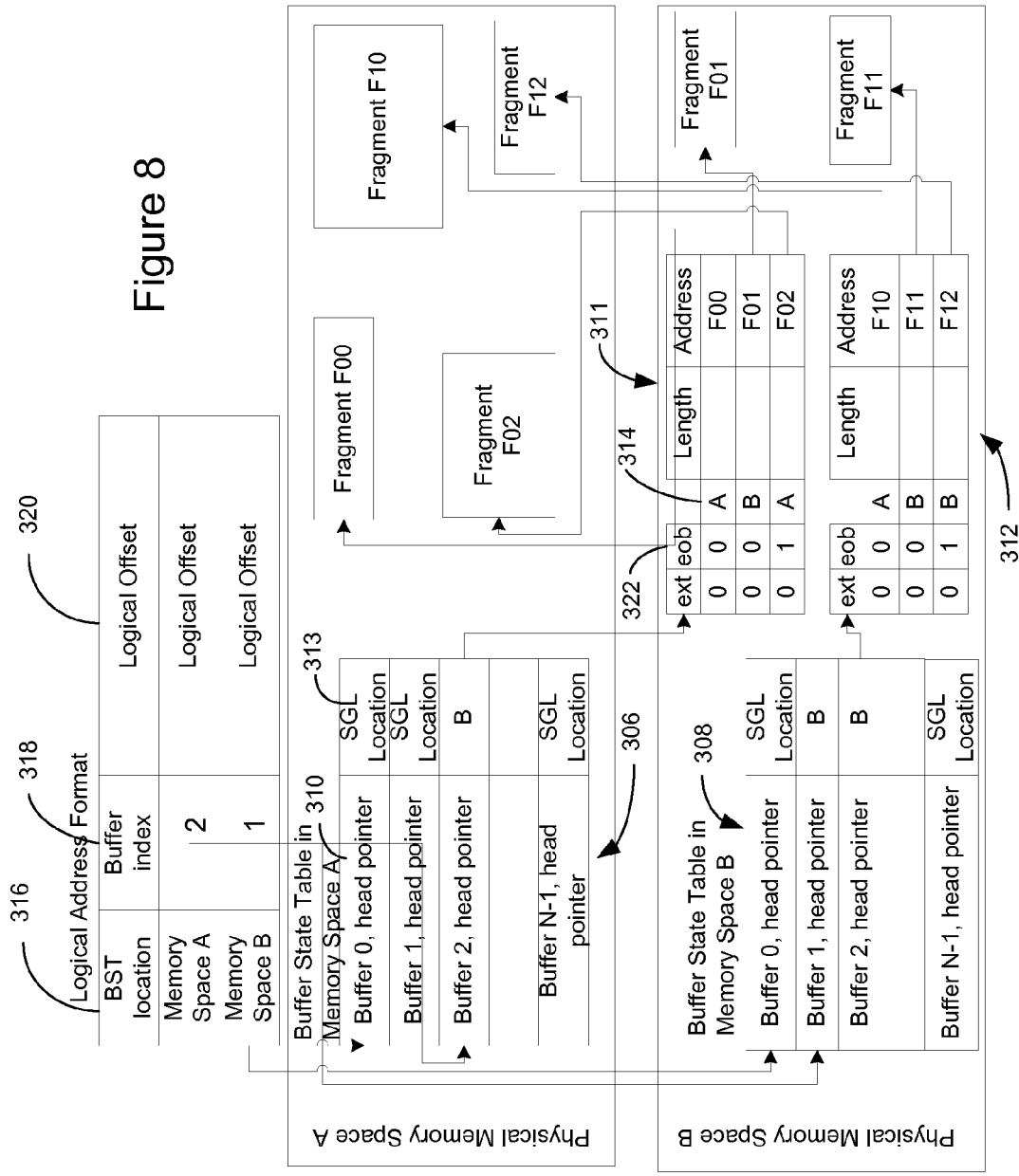
FIG. 8 illustrates logical to physical address translation in multiple memory spaces according to an embodiment of the present invention.

FIG. 8 illustrates the mapping from logical address to physical address in multiple memory spaces. In this example, only two independent memory spaces (A and B) are shown. However, this is not intended to be limiting in any way, and, as will be apparent to anyone of skill in the art, the invention can be extended to more than two independent memory spaces. Examples of separate memory spaces can be, for example, a DDR DRAM memory space, a PCI host memory space, and a GSM on-chip embedded memory space. To support multiple concurrent SGL lists, embodiments of the present invention introduce a novel data structure called a Buffer State Table (BST). A BST is provided in each memory space, such as BST 306 and BST 308 shown in FIG. 8. The entries in the exemplary BST table 306 hold a head pointer 310 to each independent SGL list 311, 312 (i.e. the address of first element of SGL list), and the memory space location 313 (i.e. which memory space is used) of the SGL entry. Each independent SGL in use occupies one entry of the BST table until the SGL is no longer in use. The present invention allows multiple BST tables to be used concurrently, one in each memory space. This provides the flexibility for size and efficiency trade-off when allocating BST table entries. Each SGL entry or element can be further extended to include an SGL location field 314 that specifies which memory space holds the affected buffer fragment. This allows a single SGL to mix buffer fragments from different memory spaces.

A logical address format for descriptors is also shown in FIG. 8. The logical address contains multiple fields, including the BST location 316 that specifies the memory space in which to find the BST table, the buffer index 318 that specifies which entry of the BST corresponds to the data buffer in operation, and the logical offset 320 that indicates the logical offset address within one SGL buffer of the DMA, based on the logical offset to physical address mapping scheme explained in relation to FIG. 7A.

Note that the EOB (end of buffer) field 322 in the SGL entry is used to mark the end of the SGL buffer. According to embodiments of the present address translation method, if a transfer exceeds the total length of all fragments combined in an SGL, the DMA engine can check the buffer over-flow condition and signify an error condition.

Note that although the SGL location field is specified as part of the BST entry, in alternative embodiments, the SGL location field can also be part of the logical address, as an additional field of the DMA descriptor. The purpose of the field still remains to identify the memory space in which the SGL is located. Similarly the fragment location field can be moved to the BST entry, logical address, or the DMA descriptor, although this could potentially limit the flexibility of mixing the buffer fragments from different memory spaces in a single SGL.

In summary, from a user's perspective, to make use of the logical address model proposed by the present invention, the following steps are necessary in this embodiment:

1. At system initialization, BST tables are set up in the desired memory spaces.
2. When an SGL list is created for use, the SGL entries are created in the desired memory spaces, pointing to the buffer fragments allocated in the desired memory spaces. An empty entry in the BST table needs to be allocated, and the head pointer of the SGL is placed into the allocated entry. From this point on the logical buffer as represented by the SGL is added to the DMA system for further usage. Each logical buffer in the BST table is called an active logical buffer.
3. The DMA master can create one, or multiple, DMA descriptors that specify data movement using the logical address corresponding to one or multiple active logical buffers. The DMA transfer can start from any arbitrary logical address of an active logical buffer, and end with any arbitrary logical address of the logical buffer as long as it does not exceed the total logical buffer length. Multiple DMA transfers using independent active logical buffers can be intermixed or executed concurrently, without interfering with the address translation of each other. Step three can be repeated as many times as required.
4. When all the desired data transfer using an SGL buffer (active logical buffer) is completed, the master can release the BST entry back to an unused pool. This completes the life cycle of the logical buffer affected, and the affected SGL can no longer be used by the DMA engine.

Figure 7B:
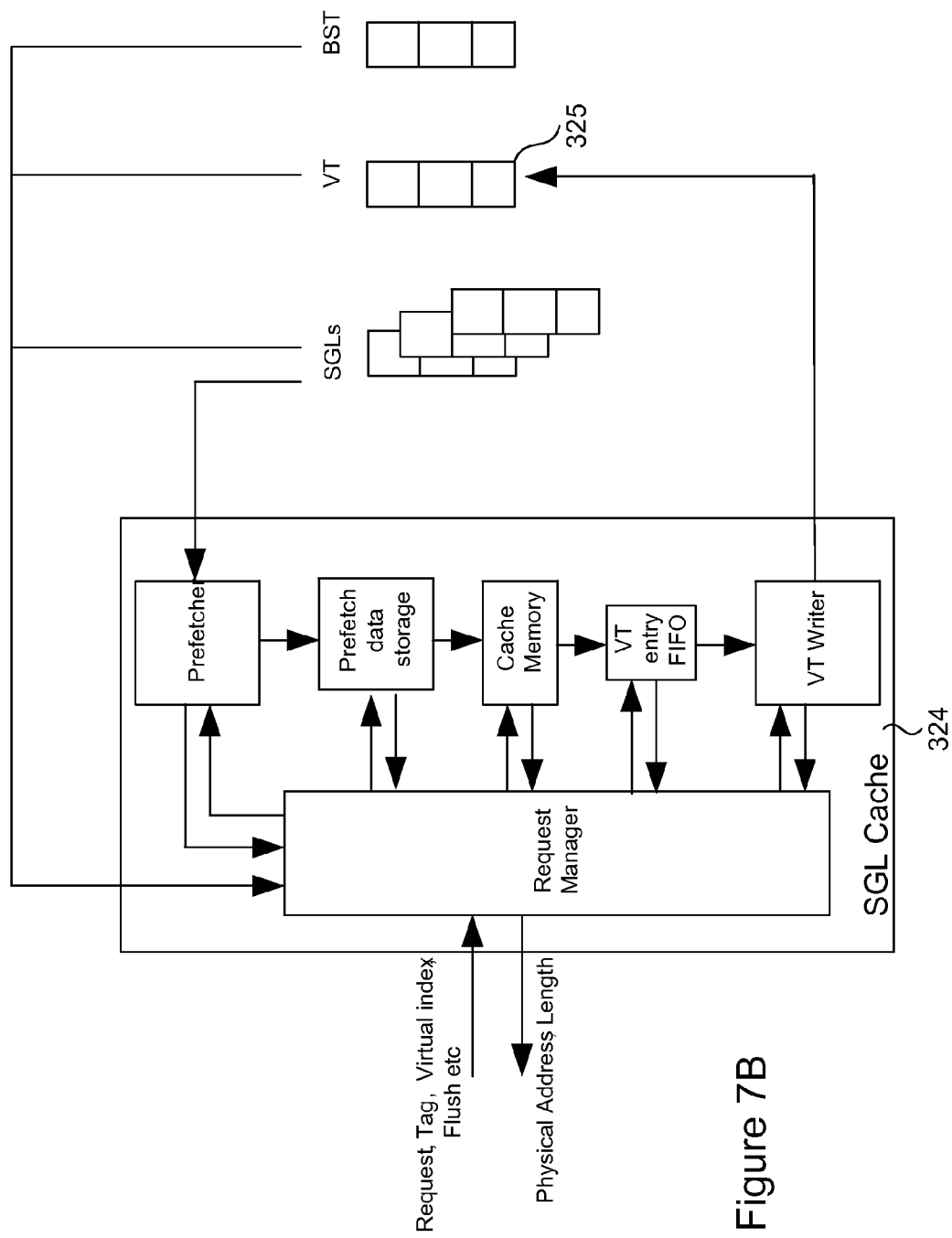
FIG. 7B illustrates a two-dimensional SGL cache architecture.

An alternate embodiment of the address translation method is used in resolving issues related to conflict misses, large miss penalty due to SGL traversal, bandwidth degradation due to SGL flush, etc. This alternate embodiment is based on the architecture of a two-dimensional SGL Cache 324, as shown in FIG. 7B. This embodiment stores SGL data based on two dimensions—one dimension is based on the cache index and another dimension is based on pre-fetching of the data stored for each cache entry. A novel replacement and line swapping strategy based on a "virtual index" is introduced in this alternate embodiment. In addition, it also provides support for coherency when multiple instances of two-dimensional SGL cache 324 are used in the alternate embodiment. In addition to this, this SGL cache design provides a victim table (VT) 325 for storing context information that is evicted out of the cache. The details of two-dimensional SGL cache organization are described in detail in U.S. application Ser. No. 12/939,128, filed Nov. 3, 2010, the contents of which are incorporated by reference herein in their entirety.

Concurrent Channels and Queue Organization

As noted in the background, existing implementations of DMA channel and queue organization in known DMA systems do not take advantage of the concurrent nature of modern system buses. Concurrency exists among multiple buses that can be operated at the same time, as well as on data buses that support independent bi-directional transfers (for read/write at the same time without sharing bus bandwidth). In certain designs, even when the buses can be operated concurrently, the queue structure causes head of line blocking and hampers the DMA engine from achieving maximum concurrent transfers across all the system buses.

Figure 9:
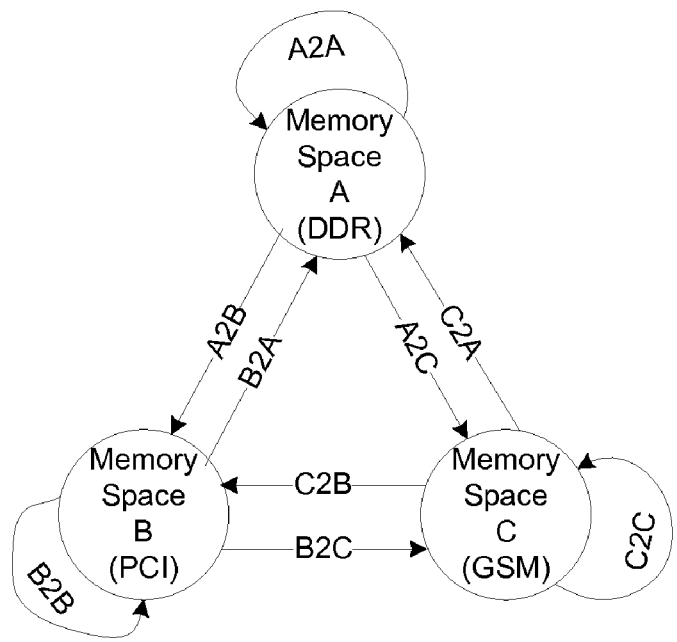
FIG. 9 illustrates a DMA channel organization based on transfer direction (single priority) according to an embodiment of the present invention.

Embodiments of the present invention organize DMA channels according to the direction of data transfer. An example given in FIG. 9 illustrates the organization of DMA channels for a DMA engine that can handle three independent concurrent memory spaces, wherein each memory space can support independent concurrent read and write access in a concurrent or shared manner. The three independent memory spaces are denoted as A, B and C. In a preferred embodiment, memory spaces A, B and C represent a DDR DRAM memory interface, a PCIe memory interface, and an on-chip shared memory (GSM) memory space, respectively. In the preferred embodiment, the DDR memory interface controller provides separate internal read and write bus interfaces, such as AXI read and write channels, that can be operated in parallel, although the actual access to the DDR DRAM utilizes the shared DDR bus to the external memory. The PCIe controller provides independent internal read and write bus interfaces, and the actual PCIe bus interfaces does support concurrent read/write full duplex access due to the use of independent receive and transmit physical links on the bus. The on-chip shared memory controller provides concurrent read and write bus interfaces that can operate simultaneously.

Embodiments of the present invention exploit the parallelism that exists on these concurrent read and write ports on the separate memory interfaces to achieve high data transfer throughput. For example, the PCIe read port can supply read data that can be transferred into the GSM write port, while the GSM read port can supply data into the DDR write port. Such transfers can happen in parallel without interference among each other. Hence the present invention divides the DMA channel based on the principle of data transfer direction. As illustrated in the diagram, each node (A, B, C) in the diagram represents an independent memory interface, and each directed arc between a source node and a sink node represents the direction of the transfer, where the source node represent the source of data, and the sink node represents the destination of the transfer. In the example of three memory spaces, there are total of nine transfer directions:

A2A: transfer data from memory space A to memory space A

A2B: transfer data from memory space A to memory space B

A2C: transfer data from memory space A to memory space C

B2A: transfer data from memory space B to memory space A

B2B: transfer data from memory space B to memory space B

B2C: transfer data from memory space B to memory space C

C2A: transfer data from memory space C to memory space A

C2B: transfer data from memory space C to memory space B

C2C: transfer data from memory space C to memory space C

Each direction-based DMA channel handles data for a particular direction of data movement. And all the direction-based DMA channels can be executed in parallel. At any given time, any subset of the nine direction-based DMA channels can be active simultaneously. When the active DMA channels do not overlap with each other (i.e. each node has <=1 active arc departing, and each node has <=1 active arc arriving), then the active DMA channels have access to the full source and sink memory space (whichever has lower throughput will get saturated). For example, if A2A, B2C, C2B are active at the same time, all three channels can operate at the full speed to saturate their respective source or sink ports. If the active channels share the same source or sink memory space, the DMA engine can provide arbitrated access among the active channels at the contended read or write port to ensure the bandwidth of the contended port is shared based on desired policy, as will be discussed below in greater detail.

Figure 10:
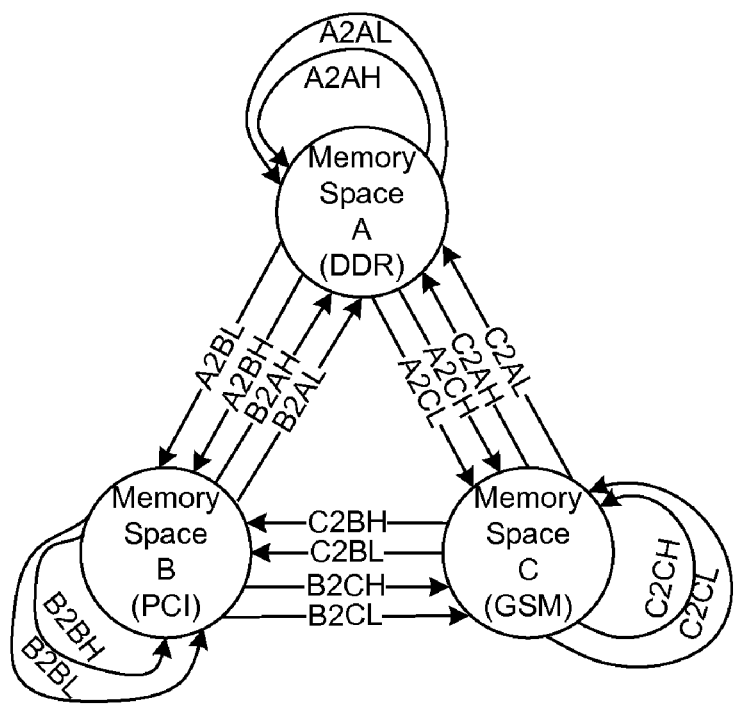
FIG. 10 illustrates DMA channels based on transfer direction (dual priority) according to an embodiment of the present invention.

FIG. 10 further extends the idea of direction-based DMA channel partitioning to support a plurality of channels per direction of transfer. In the example shown, two channels are provided per direction as represented by the H and L suffixes in the channel label, corresponding to high priority and low priority channel on each direction. For example:

A2BH: transfer high priority data from space A to space B
A2BL: transfers low priority data from space A to space B It should be noted that the concept of multiple channels per direction is not limited to two channels; more channels can be provided based on system requirements. Nor is the policy for channel arbitration limited to priority based schemes, other arbitration policies such as round-robin, weighted round robin, priority round-robin or other scheduling policies can be applied among channels of the same direction.

The purpose of providing multiple channels per transfer direction is to allow different Quality of Service (QoS) of DMA transfers to be provided at the same time. For example, the lower priority channels can be used to execute bulk data movement of large byte count, while the high priority channels can be used to execute latency sensitive movement of small control messages. Without the additional high/low priority channels, if both types of data movement are mixed in the same DMA channel, a smaller control message movement can get stuck behind a large bulk data movement that has already been started when the request for a smaller transfer is made, hence the smaller transfer will suffer the long latency of waiting for the current larger transfer to complete. With separate channels, the small movement can be started right away and the access interleaved with the data movement of the larger bulk transfer.

Given the concurrent nature of DMA channels provided by the present invention, it is important to organize the DMA request queues appropriately to maximize the parallelism in this architecture. Known DMA structures utilize shared request queues, or request queues organized based on priority, but without the concept of request queues organized based on transfer direction. Such designs can easily cause Head of Line (HOL) blocking that results in low system throughput. For example, if a shared request First Come First Serve (FCFS) queue is used to post DMA requests regardless of direction of transfer, a request sequence of Req1(A2B), Req2(A2B), Req3(C2A), Req4(B2A) can be posted sequentially. Req1 is then fetched first and dispatched to channel A2B, Req2 is then fetched, but is blocked because channel A2B is already busy, hence Req3 and Req4 are also blocked until Req1 is completed even though Req3 and Req4 do not utilize the blocked channel A2B, and should be able to proceed without blockage. However, due to the shared queue, the HOL blocking condition causes Req3 and Req4 to be delayed and the efficiency of DMA is lower.

In embodiments of the present invention, the request queues are organized based on the direction of transfer. In a DMA structure with multiple channels per direction, each channel can have its own independent request queue. In other words, each DMA channel is organized is based on direction and Quality of Service (QoS) schemes, and the request queues are organized independently for the parallel channels. For example, in the present per-direction queue structure, Req3 and Req4 can each posted to their own queues because they belong to different transfer directions. Hence Req1, Req3, Req4 can be executed in parallel, and Req2 can be executed after Req1 is completed.

There are a number of methods for data structure organization of the request queues, including linked lists that chains the DMA descriptors together for each queue. Embodiments of the present invention can utilize the linked list based method. According to a presently preferred method, the DMA request queues are organized based on hardware system FIFOs that are globally accessible by all bus masters in a SOC.

Embodiments of the present invention support two schemes of communication between a DMA requestor (master) and a DMA engine. The two schemes are all based on GSM FIFO queues. Each set of GSM FIFO is organized as either two or three FIFOs sharing the same ring buffer space. Each scheme of communication provides different capabilities and requires a different number of processing steps for communication.

The first scheme is a two-stage FIFO communication method. This method is used when the DMA master does not need an indication of DMA operation completion, and there can be multiple DMA masters sharing the same DMA queue. Therefore no master has sufficient information to keep track of the queue occupancy. Hence it is necessary to provide flow control indication to ensure the DMA queues do not suffer from FIFO overflow/underflow.

Figure 12:
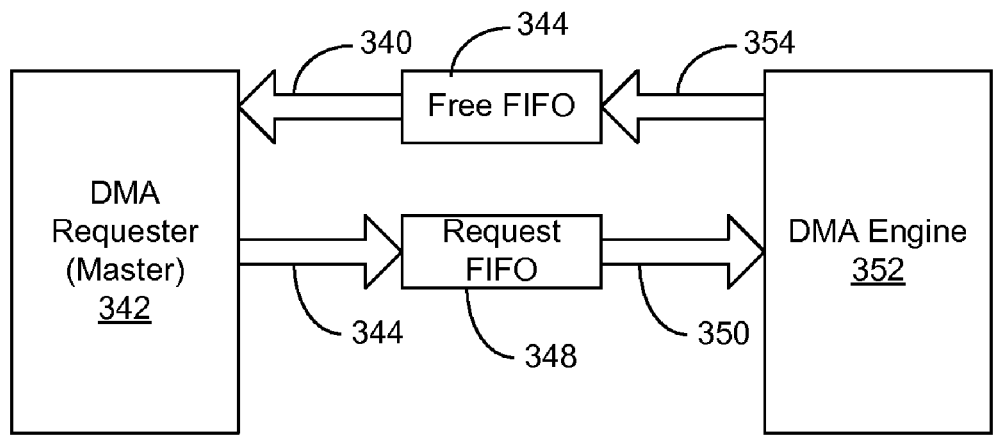
FIG. 12 illustrates a two-stage DMA queue communication scheme (Free-Request) according to an embodiment of the present invention.

Referring to FIG. 12, the process of communication of the first scheme is shown. As indicated by arrow 340, before a DMA master 342 makes a DMA request, it checks if the Free FIFO 344 is empty, if the FIFO 344 is empty, the master 342 has to wait for the FIFO 344 to become not empty. When the Free FIFO 344 is not empty, the master 342 reads a free pointer from the free queue, which allocates an unused DMA descriptor for use by the DMA master. As indicated by arrow 346, the DMA master 342 fills the allocated DMA descriptor with the information about the DMA request, and writes the pointer to the Request FIFO 348. This puts the request into the request queue. As indicated by arrow 350, the DMA engine 352 then detects the request queue is not empty indicating there is an outstanding DMA request to process. The DMA engine 352 then reads the request pointer from the request FIFO 348. The request pointer points to the DMA descriptor on the top of the queue. The DMA engine 352 then processes the DMA request to execute the data movement requested. As indicated by arrow 354, upon completion of the DMA data movement, the DMA engine 352 writes back the current request pointer to the Free FIFO 344. This completes the DMA operation, the present pointer and the associated descriptor is now returned to the free pool.

Figure 13:
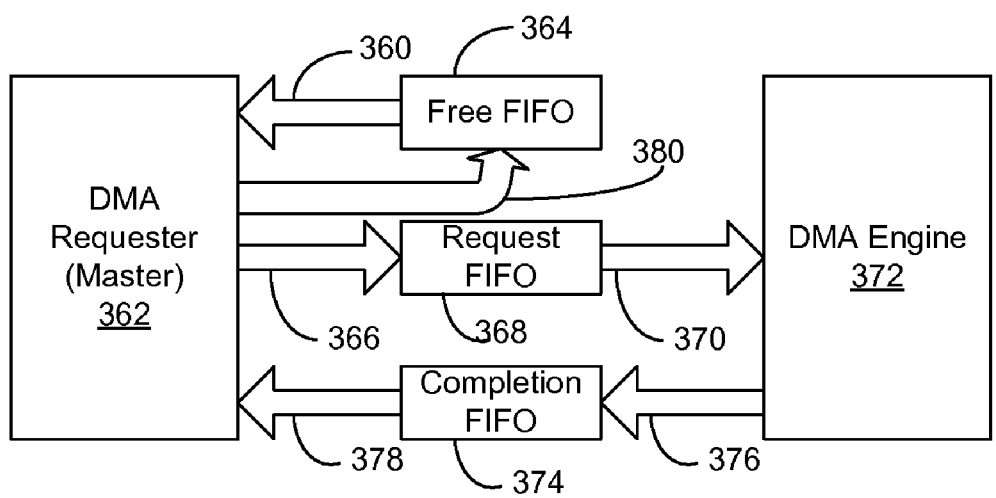
FIG. 13 illustrates a three-stage DMA queue communication scheme according to another embodiment of the present invention.

The second scheme is a three-stage FIFO communication method. The three stage method allows multiple DMA masters to share the same set of queues, yet provides flow control and completion indication for each DMA request to the DMA master. The flow of the second scheme is shown in FIG. 13.

As indicated by arrow 360, before a DMA master 362 makes a DMA request, it checks if the Free FIFO 364 is empty. If the FIFO 364 is empty, the master 362 has to wait for the FIFO to become not empty. When the Free FIFO 364 is not empty, the master 362 reads a free pointer from the free queue, which allocates an unused DMA descriptor for use by the DMA master 362. As indicated by arrow 366, the DMA master 362 then fills the allocated DMA descriptor with the information about the DMA request, and writes the pointer to the Request FIFO 368. This puts the request into the request queue. As indicated by arrow 370, the DMA engine 372 detects the request queue is not empty indicating that there is an outstanding DMA request to process. The DMA engine 372 then reads the request pointer from the request FIFO 368. The request pointer points to the DMA descriptor on the top of the queue. The DMA then process the DMA request to execute the data movement requested. Upon completion of the DMA data movement, the DMA engine 372 writes back the current request pointer to the Completion FIFO 374, as indicated by arrow 376. This completes the DMA operation, and provides indication of the DMA completion of the present descriptor to the DMA master 362. As indicated by arrow 376, the DMA master 362 detects the DMA completion FIFO 374 is not empty through polling, interruption of hardware thread event. It reads the completion pointer from the completion FIFO 374, which points to the associated descriptor that has just been completed. The master 362 then takes the required processing steps associated with the completion event, including, but not limited to, checking the DMA completion status, as indicated by arrow 378. As indicated by arrow 380, once post-processing of the DMA completion event is done, the master 362 then writes the present completion pointer back to the free FIFO 364. The current pointer and the associated descriptor are now returned to the free pool.

Note that the in addition to the pointer to DMA descriptor, the data structure written into the Free/Request/Completion FIFOs can be extended to include Request Valid flag, DMA success Flag, and/or application tag whose value is preserved and relay by the DMA between the FIFOs during the DMA processing.

Figure 14:
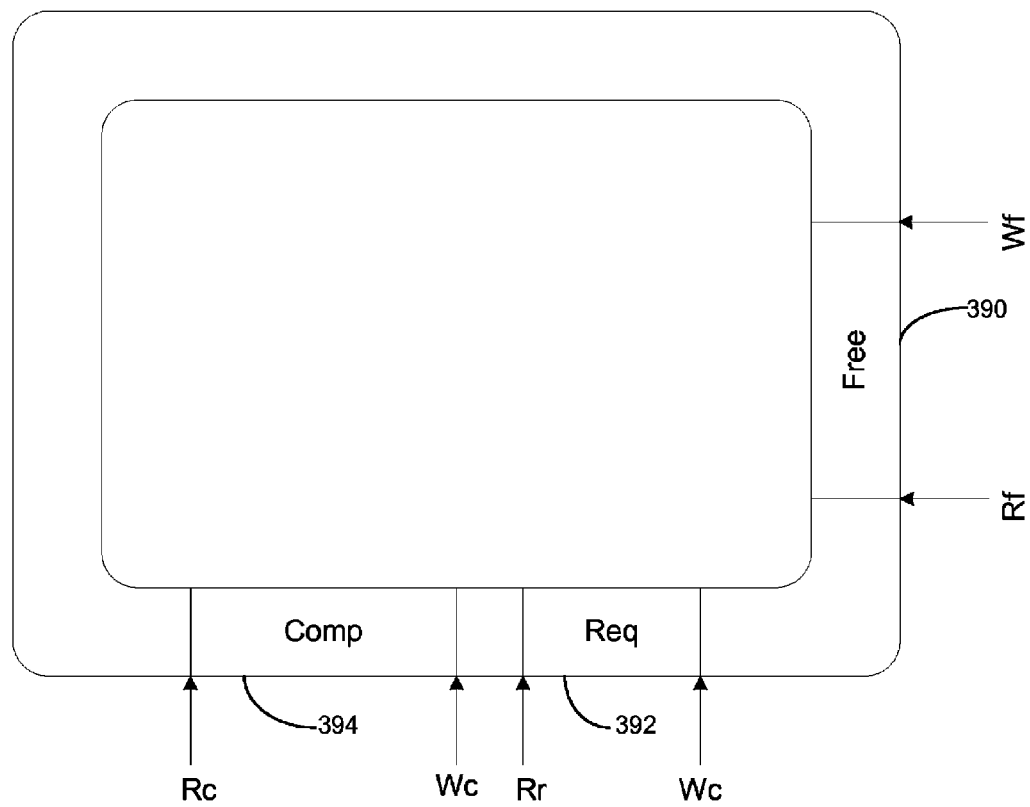
FIG. 14 illustrates sharing of ring buffer space of three sets of FIFOs in the queue according to an embodiment of the present invention.

In the above described FIFO communication schemes, the descriptor pointers cycle among the Free/Request/Completion FIFOs at different stages of a descriptor processing. Following the communication protocol, a pointer can only exist in one of the two- or three-stage FIFOs. In other words, the same pointer cannot exist in two FIFOs at the same time. This enables a novel scheme of ring buffer organization to implement the two- or three-stage FIFOs. The two- or three-stage FIFOs can share the same ring buffer space and just using two or three sets of pointers to implement the FIFOs. This results in 2× or 3× savings in buffer space depending on which communication scheme is used. FIG. 14 illustrates a DMA queue set with three FIFOs (Free/Request/Complete) 390, 392 and 394 sharing the same ring buffer space.

In the above described linked list data structure, each request queue is associated with a set of FIFOs which have a fixed mapping between them. The request queue can be programmed to use either (a) a set of FREE/POST/COMPLETION FIFO or (b) a FREE/COMPLETION FIFO. In embodiments where the DMAs are not programmed to post the DMA completion status in the FIFO allocated to a different request queue, the DMA engine would be limited in not being able to initiate the DMA requests after processing the current DMA. In otherwords, such a DMA engine using such a linked list data structure may not have the capability to initiate DMA requests by itself upon DMA completion, as the DMA completion queue had a fixed mapping to a DMA Free/Post Queue.

Figure 11:
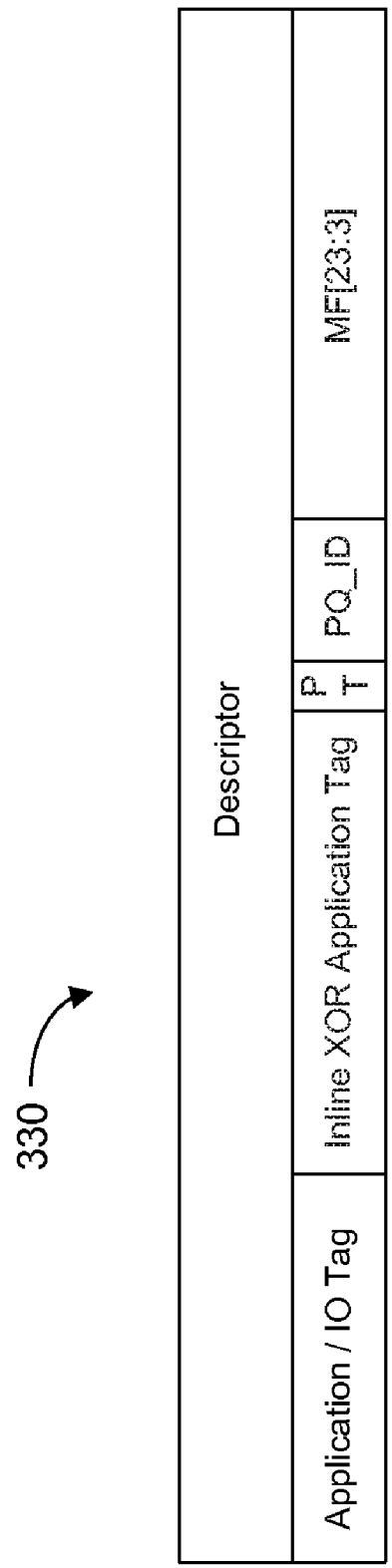
FIG. 11 is an illustration of an inter-descriptor field as part of a DMA descriptor, according to an embodiment of the present invention.

According to a present embodiment, instead of a linked list based method for processing DMA requests, the present embodiment utilizes a super-descriptor format. Now the completion status (DMA completion) can be posted to any DMA queue whose queue ID is configured in an inter-descriptor field. FIG. 11 is an illustration of an inter-descriptor field as part of a DMA descriptor. Inter-descriptor field 330 can be a 32 bit word which includes an Application/IO Tag sub-field, an Inline XOR Application Tag sub-field, a PT sub-field that indicates whether Inline XOR Application Tag is copied to MFA[47:32] or not, and a PQ_ID sub-field that represents the post queue ID whose base address is used to initiate the next DMA transfer, and an MF[23:3] sub-field field represents the starting Dword address of the next descriptor. The present embodiment copies these lower 21 bits of Inter descriptor Field 330 (i.e. MF[23:3]) into MFA [20:0] of the current DMA transfer while writing back the MFA status to GSM 122. Also referred to as a Descriptor Control Word 3, this inter-descriptor field 330 appears in Table 2b.

In an embodiment of the DMA engine, the request queues are associated with a programmable set of ring buffers. Upon completion of DMA transfer, the DMA engine can post the DMA Completion status to any DMA queue whose queue ID was configured in inter-descriptor field 330. As such, this facilitates initiation of the next DMA request. The descriptor information of this next DMA is located in the FIFO assigned to the queue where the previous DMA completion status was updated. This process helps reduce firmware intervention and thereby contributes to improved performance.

SGL Caching

Figure 15:
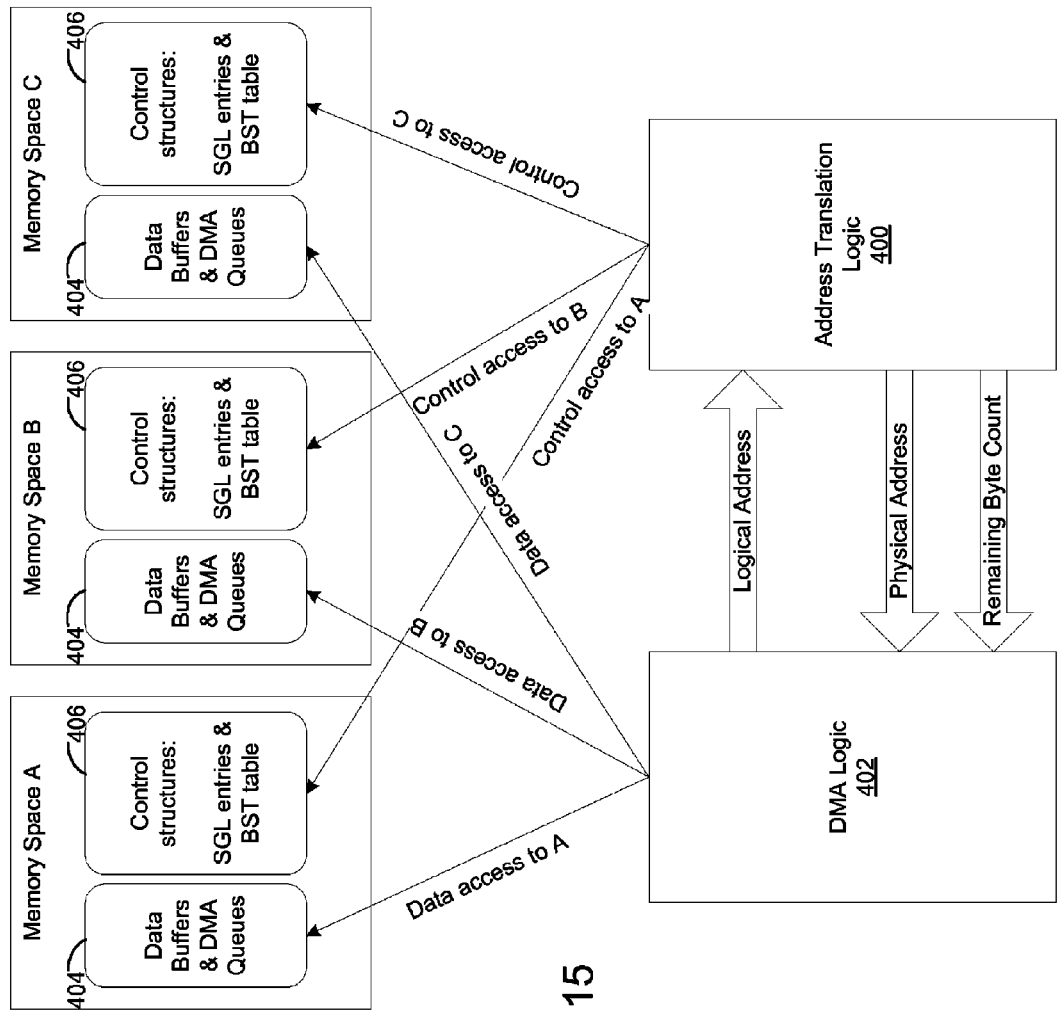
FIG. 15 illustrates partition of DMA logic from the address translation logic according to an embodiment of the present invention.

The address translation method described earlier defines the mapping between logical address and physical address. Embodiments of the present invention can utilize an architecture where the address translation logic 400 is separated from the DMA engine 402 as an independent subsystem, as illustrated in FIG. 15. Such partitioning allows for implementation flexibility of the address translation logic.

It is worth noting that because there can be multiple memory spaces (e.g. A, B, C), the DMA logic 402 and the address translation logic 400 both need to have access to all the memory spaces independently, as shown by the line arrows. The accesses to the same memory space from the DMA engine 402 and address translation logic 400 need to be arbitrated in an appropriate way that is outside the scope of the present invention. The DMA logic 402 accesses the DMA queues and the data buffer fragments 404 in a memory space, while the address translation logic 400 accesses the control structures 406 that support logic to physical address mapping including the BST tables and the SGL entries.

Embodiments of the present invention partition the DMA logic 402 from the address translation logic 400 by defining a novel, yet simple, interface between the two sub-blocks. The key signals are shown in block arrows. As defined from the DMA logic point of view, the signals are:

Logical Address (output): this signal indicates the value of logical address the DMA engine 402 wishes to translate.

Physical address (input): this signal provides the physical address translated from the logical address by the address translation logic 400.

Remaining Byte Count: This signal indicates how many bytes there are in the present SGL buffer fragment starting from the present physical address to the end of the fragment.

By utilizing the physical address (PA) and the remaining byte count (RBC) information, the DMA logic has all the information necessary to perform DMA data movement based on SGL fragments. The interface can be extended to support pipelining of multiple outstanding address translation requests, and signals can be added to indicate the validity of the requests and the translation results, as well as translation errors such as buffer overrun.

One implementation of the address translation logic is a context-free translation scheme. Given any logic address (LA) to be translated, the address translation logic (ATL) traverse the BST table, and the SGL list and chains, accumulating the byte count of the traversed SGL entries as the present logic address location, until the entry that matches the requested LA is reached. Then the ATL can calculate the corresponding PA and RBC based on the current SGL entry, and the PA/RBC are returned as the translation results. Such an approach, albeit simple, is time consuming and requires the full traversal of the SGL BST and SGL list that consumes memory bandwidth. Such a process is called full traversal translation procedure (FTTP).

Embodiments of the present invention advocate caching techniques to reduce the occasions where FTTP is required in order to speed up the translation as well as reducing the memory bandwidth consumed in the translation process. The basic concept is to keep track of a small number of active SGL entries and the LA to PA mapping that has been recently accessed. Based on temporal locality (if a SGL has been accessed recently, there is a good chance the same SGL buffer be accessed again in the near future), and spatial locality (the future access to a SGL buffer will likely have LA that is adjacent, most likely immediately following, the LA within the SGL that has been accessed last). The details of an SGL cache organization for ATL is described in a co-pending U.S. application Ser. No. 12/203,455, filed Sep. 3, 2008 and entitled "Address Translation Scheme And Cache With Modified Scatter Gather Element", which is incorporated herein by reference.

Figure 16:
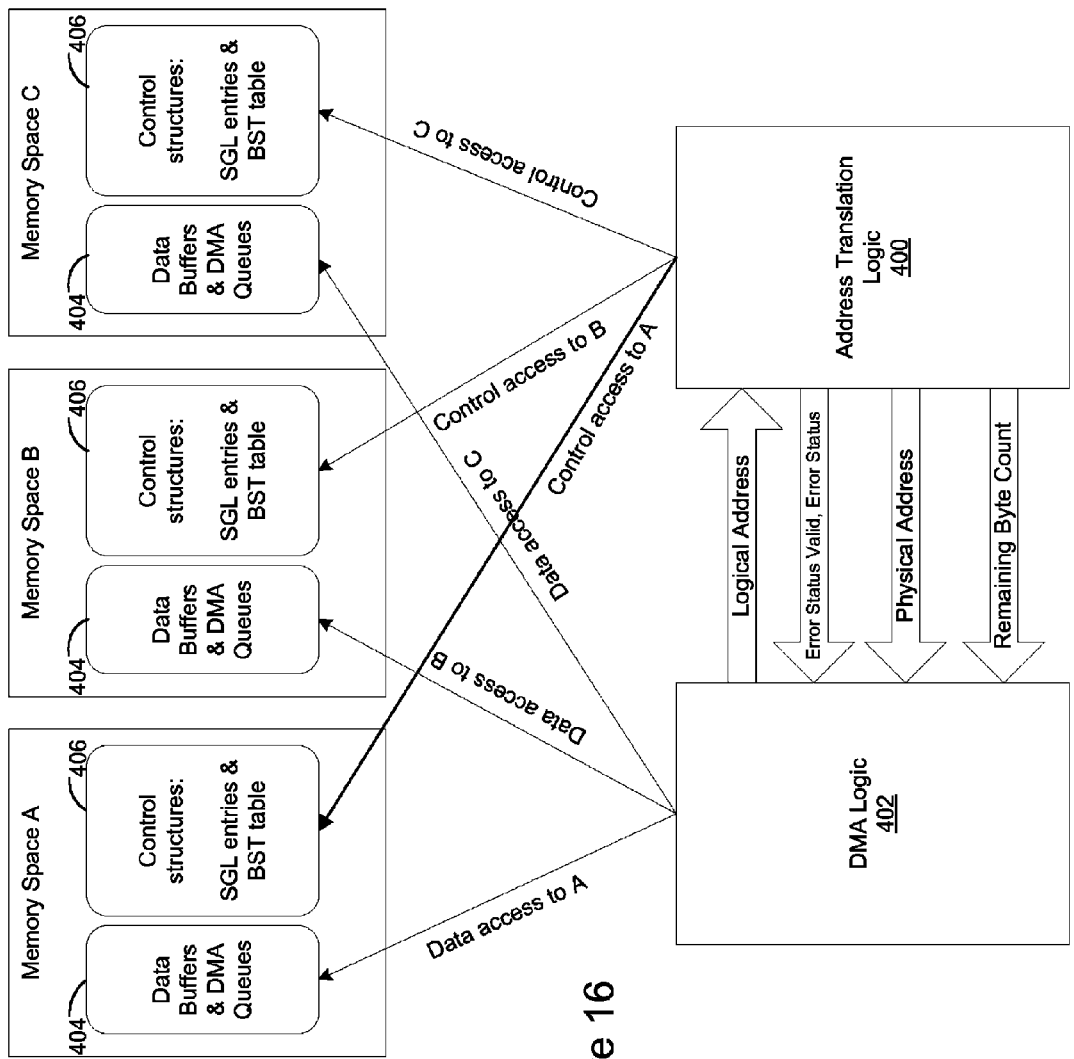
FIG. 16 is an alternate version of the embodiment of FIG. 15.

According to an alternate embodiment, a status of the logical to physical address fetch operation can be propagated back to the DMA logic 402. FIG. 16 includes the same blocks shown in FIG. 15, except that address translation logic 400 provides an error signal labeled Error Status Valid, Error Status to DMA logic 402. This error signal indicates the error status of the address translation request. Therefore, whenever any such logical to physical address fetch request initiated by DMA logic 402 results in an error detection by the SGL controller, such as read/write response errors, parity errors, EOB errors, the SGL controller will send back a bit-bucket address with the appropriate error status along with asserting the error status valid. A bit-bucket address can be an address where all the address bits are asserted to logical '1' by example.

By utilizing the physical address (PA), remaining byte count (RBC) and error status (ErrStatus) information, the DMA logic has all the information necessary to perform DMA data movement based on SGL fragments.

Two-Dimensional Scatter-Gather Cache

According to an embodiment of the present invention, the SGL cache can be implemented as a single cache region, using a direct mapped cache architecture. While such a cache architecture provides satisfactory performance, it is limited by conflict misses, a large miss penalty due to SGL traversal, and bandwidth degradation due to SGL Flush. Enhanced performance from the SGL cache can be obtained according to an alternate embodiment, in which the SGL controller cache is implemented as a multiple cache region, with a fully associative cache architecture. This is referred to as a two-dimensional SGL cache design that stores SGL data based on two dimensions, where one dimension is based on the cache index and a second dimension is based on pre-fetching of the data stored for each cache entry.

This present embodiment introduces a replacement and line swapping strategy based on a 'virtual index', and a victim table (VT) for storing context information that is evicted out of the cache. This alternate SGL cache architecture further provides support for coherency when multiple instances of the design are used. Additionally, improved error handling capabilities are provided with this architecture. Details of the two-dimensional SGL cache according to the present embodiment are described in commonly owned co-pending applications U.S. patent application Ser. No. 12/203,455 filed on Sep. 3, 2008 and U.S. patent application Ser. No. 12/939,128 filed on Nov. 3, 2010, the contents of which are incorporated herein by reference. A brief overview of the two-dimensional SGL cache now follows.

Figure 17:
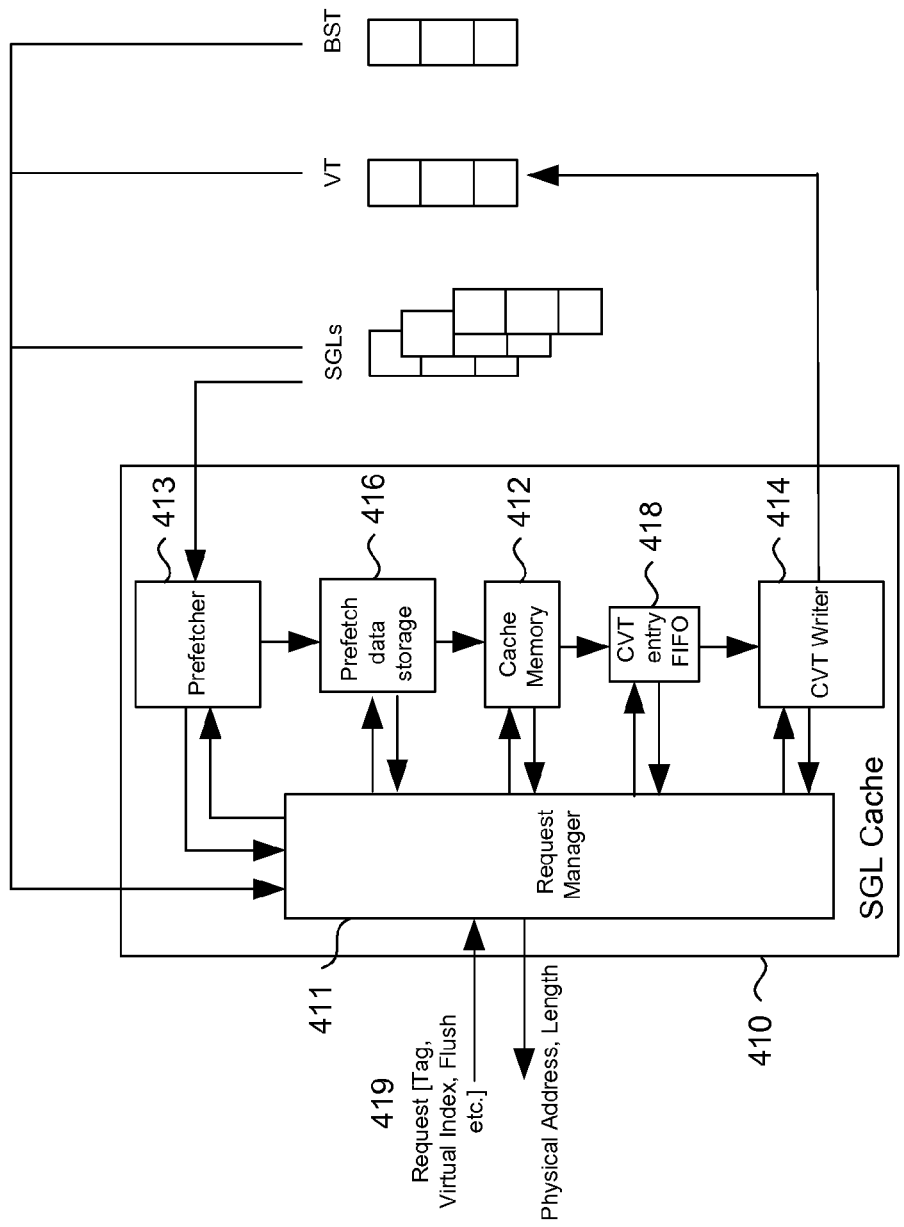
FIG. 17 is a block diagram of an SGL cache module according to an embodiment of the present invention.

FIG. 17 is a block diagram of an SGL cache module 410 according to an embodiment of the present invention. The SGL cache includes a request manager 411 and a cache memory 412 to provide the virtual indices. Other embodiments may have more or fewer components, or may combine certain components etc. In the embodiment shown in FIG. 17, the SGL Cache includes four major components: the request manager 411, a prefetcher 413, a Context Victim Table (CVT) writer 414 and the cache memory 412. The prefetcher 413 and CVT writer 414, and the associated prefetch data storage 416 and CVT entry FIFO 418, are optional components.

The request manager 411 is arranged to receive a DMA request 419. In the embodiment of FIG. 17, the request manager 411, prefetcher 413 and CVT writer 414 all have access to a plurality of memories and memory interfaces as necessary in order to fulfill SGL and BST table and CVT access. The request manager 411 is able to read from the BST, CVT and SGLs in memory. The prefetcher 413 reads only from SGLs and the CVT writer 414 only writes into the CVT. The contents and organization of the BST table in memory, and the contents and organization of the CVT in memory and the CVT writer are discussed in copending U.S. patent application Ser. No. 12/203,455.

In embodiments of the present disclosure, the Victim Table is implemented as a Context Victim Table, or CVT. The CVT stores context information for SGLs that have been evicted from the cache memory 412. It is indexed using BST indices and has a one-to-one association with the BST table (i.e. one entry in the BST table will get one entry in the CVT). In one embodiment, the BST Table and CVT are kept in separate memory spaces. In another embodiment, the CVT and BST Table may be combined into one table (since they are both indexed using BST indices). The context information stored into a CVT entry comprises information such as the starting address of the first SGL element in the evicted cache line, the accumulated SGL element length, cache region id, etc. The Request Manager uses the CVT as sort of a secondary level cache.

Crossbar Switch Based DMA Datapath

Figure 18:
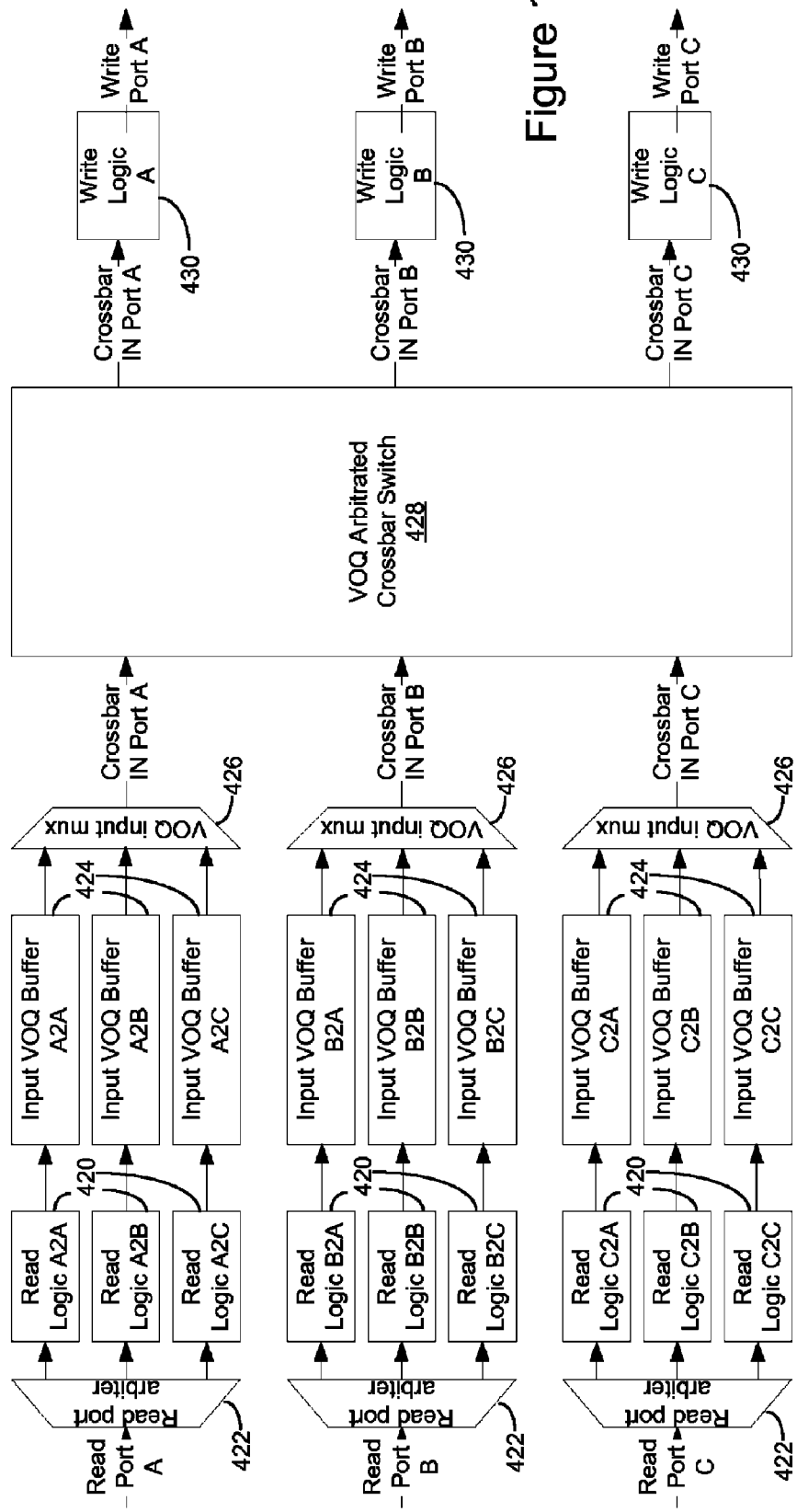
FIG. 18 illustrates a crossbar switch-based datapath according to an embodiment of the present invention.

As described earlier, embodiments of the present invention support the current channels in independent directions of data movement. To support the concurrent operations of the channels, the present invention can utilize a novel crossbar switch based DMA datapath. Such a datapath is illustrated in FIG. 18. The datapath diagram corresponds to a design with nine per direction concurrent channels as shown in FIG. 9. The same structure can be extended to support designs with different memory spaces and different channelization by organizing a VOQ input buffer for each concurrent DMA channel. The arrows in the diagram correspond to flow of data movement. The independent read ports are used to generate read access to the source memory spaces to supply the source data. The read logics 420 are organized based on the direction-based DMA channels. DMA channels sharing the same source port are grouped together via a read port arbiter 422 that is responsible for arbitrating the concurrent read accesses from the active DMA channels contended to read the source data from the same memory space. The read data returned to each DMA channel is then directed towards an input data buffer 424 that is organized on a per channel basis. This buffer is also referred to as Virtual Output Queue (VOQ) data buffer which is a commonly used structure in crossbar switch architectures. The VOQ data buffers 424 are organized on per input/output pair, and in some cases can be further divided based on the sub-channels sharing the same input/output direction for QoS purpose. Signals from the VOQ data buffers 424 are multiplexed from each read port by VOQ input multiplexers 426, and provided to a VOQ arbitrated crossbar switch 428.

It is a well known technique to use a combination of VOQ data buffer and crossbar switch with VOQ arbiter to achieve non-blocking data transfer between input and output ports of the crossbar. Embodiments of the present invention adopt commonly used switch fabric design techniques and apply them in combination with the read port arbiter 422, read port logic 420 and the write port logic 430 to achieve non-block concurrent operation of DMA channels. There are also a large number of VOQ crossbar switch arbitration techniques, as are known to those of ordinary skill in the art. Embodiments of the present invention can utilize these existing arbitration techniques for cross bar arbitration.

The application of known crossbar arbitration techniques requires the crossbar data transfers to be divided into fixed time slots, corresponding to fixed data cell size so that all ports can operate in lockstep based on a fixed time scale. Due to the speed differences of the different memory spaces, applying fixed time slot techniques requires a certain amount of output buffer for rate adaptation, and for adaptation of between the different native burst sizes.

Figure 19:
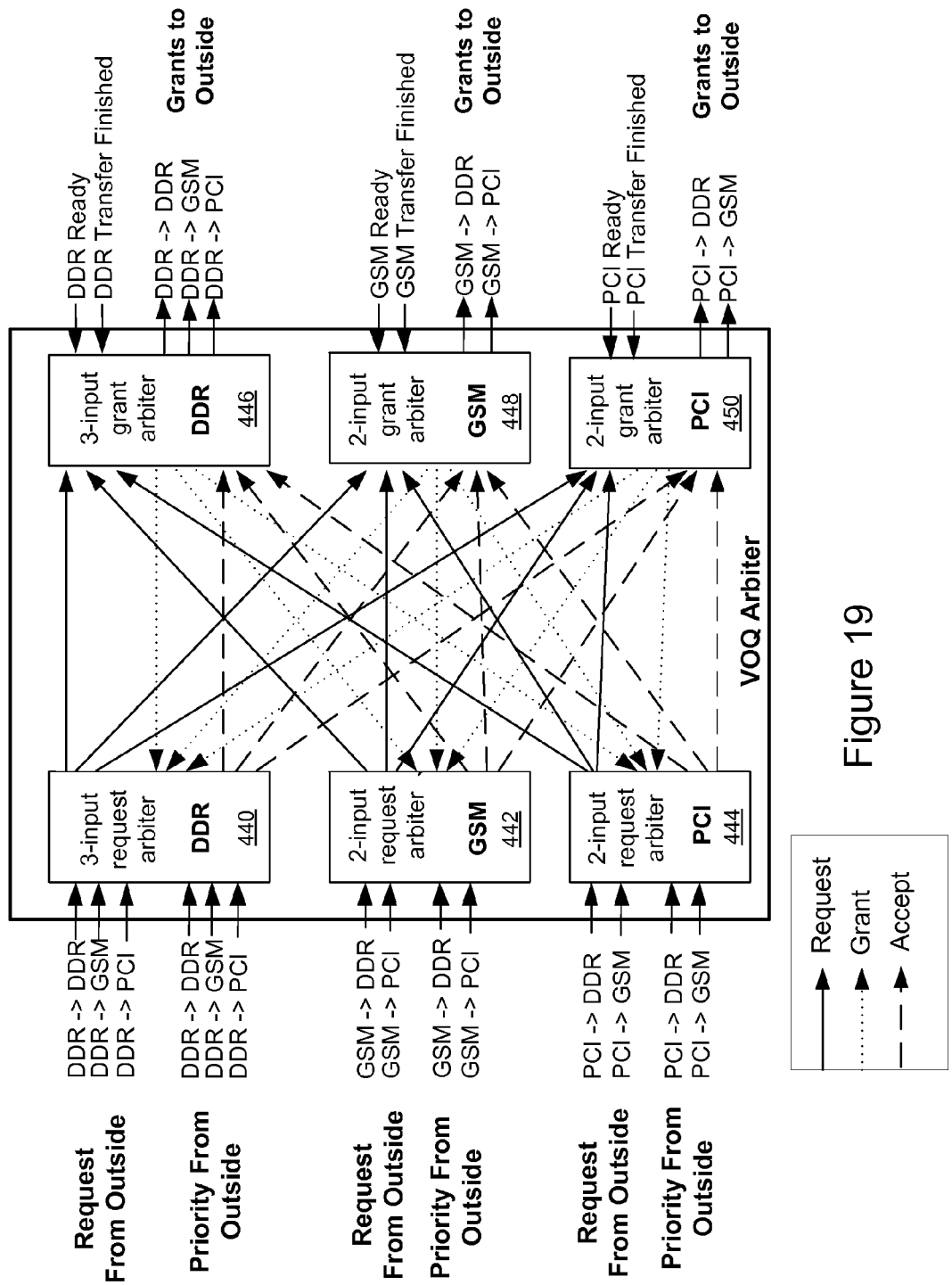
FIG. 19 illustrates a virtual output queue arbiter according to an embodiment of the present invention.

Embodiments of the present invention further permit a novel arbitration scheme that is not based on fixed time slots for data transfer. FIG. 19 shows the hardware implementation diagram for a novel VOQ arbiter. The illustrated VOQ arbiter includes three request arbiters 440, 442 and 444 and three grant arbiters 446, 448 and 450, for the inputs and outputs of channels associated with three physical memory spaces, here shown as DDR, GSM and PCI channels. The requests from outside indicate if the input buffers have data to transfer (non-empty). The priority signals from outside indicate if the input buffers are require higher priority treatment for starvation prevention. The priority signal is set if the buffer is full, and if the buffer contains the last block of a transfer. For example, for 10K-byte transfer, the DMA breaks it into 10 blocks of 1 K-byte each. When the 10th block is in the buffer, the LAST signal is set. The grants to outside are the grant signals to the DDR, GSM and PCI channels. After the arbitration is done, these grants are set high to indicate the link that won the arbitration. The signals between request arbiters 440, 442 and 444 and grant arbiters 446, 448 and 450 are internal signals. Solid arrows designate internal request signals. Dotted line arrows designate internal grant signals. Hashed line arrows designate internal accept signals.

Figure 20:
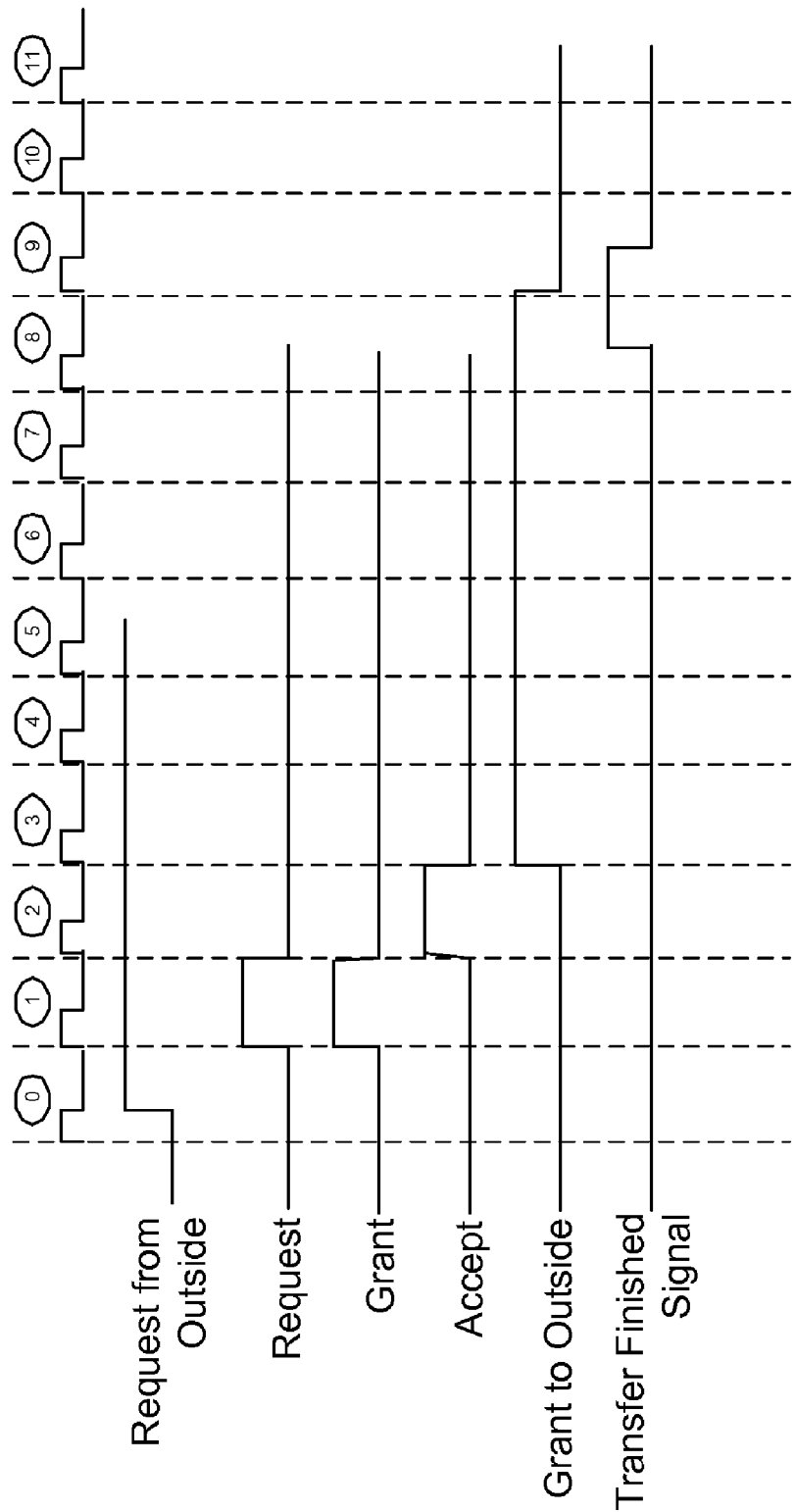
FIG. 20 illustrates an arbiter timing diagram according to an embodiment of the present invention.

FIG. 20 shows the timing diagram for the arbitration process. In cycle 0, the outside request is set. In cycle 1, the internal request is sent from the request arbiter to the corresponding grant arbiter. For example, if outside request DDR to GSM is high, internal request DDR to GSM is set as high, which is one input signal to the two-input grant arbiter for GSM. If more than one outside request is high, all the requests are sent to the corresponding grant arbiter. The grant arbiter responds with a grant signal. If more than one request of a grant arbiter is high, the grant arbiter chooses one according to a current Round-Robin pointer value. In cycle 2, the request arbiter sends out accept signals. If more than one grant is received by the request arbiter, the request arbiter only accepts one grant according to current Round-Robin pointer value. If the request arbiter did not receive any grant from the grant arbiter in the previous cycle (cycle 1), it does not send accept signal. Instead, it continues sending request signals. In cycle 3, if the grant arbiter receives an accept, the grant to outside is set as high. The connection is setup, until a "transfer finished" signal terminates the connection after transfer is complete (e.g. in cycle 8-9 in the diagram). The read signal is sampled at cycle 1. If the output port is not ready, the grant arbiter will not assert the grant signal.

Crossbar Switch with Dedicated Buffers

A limitation with the currently described crossbar switch based DMA datapath embodiment of FIG. 18, is that the DMAs that had same source port could not concurrently transfer data towards different destination ports. In the presently described embodiment, the input data buffers physically share the same memory space following Virtual Output Queue (VOQ) buffering. As such, concurrent support across multiple directions is limited, and supports the following modes of operation:

(a) Concurrent data transfers when two DMAs do not have the same source and destination ports. For example, DMA transfers associated with directions such as A2B and C2C where A,B and C are three different memory interfaces.

(b) For two DMA transfers namely A2B and A2C, concurrently processes are supported, namely:

a. Read data transfer for A2B b. Write data transfer for A2C.

For DMA directions A2B and A2C, the current embodiment does not support write data transfers towards destination ports B and C at the same time when both the destination ports are available to accept data transfers. This is because the memory interface that stores A2B and A2C have only one physical port interface to stream the data out of the memory. In particular, such a problem occurs if there is only one physical memory virtually shared among DMA directions that had same source port. As such, only one DMA direction can make connection to the destination port for data transfer causing Head Of Line (HOL) for the data belonging to the second DMA direction. Concurrency is supported in a way that while one DMA direction is actively fetching data from source port, the other DMA direction can actively transfer data towards destination port.

Figure 21:
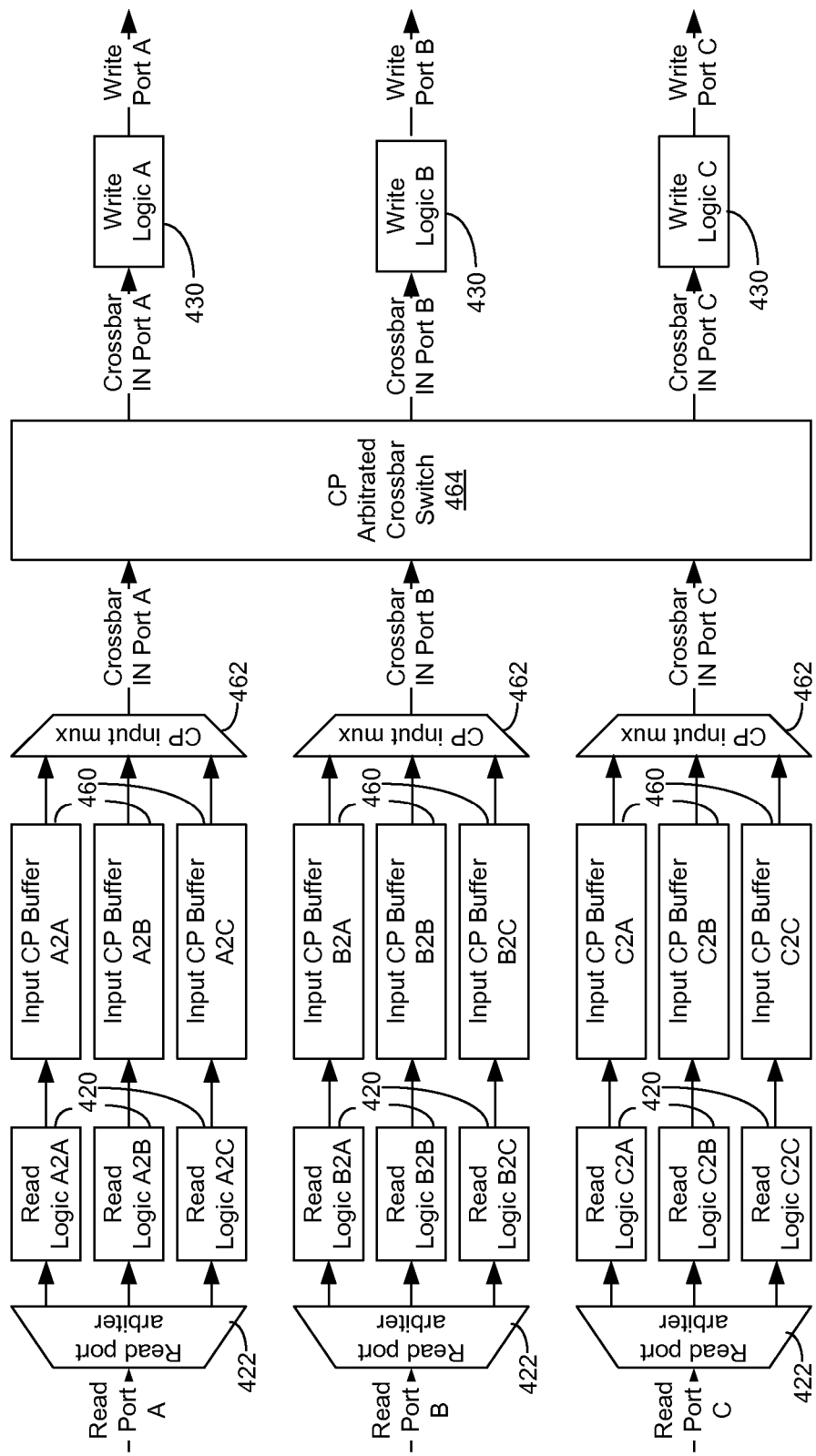
FIG. 21 is a block diagram of an alternate embodiment of the crossbar switch-based datapath of FIG. 18.

According to a present alternate embodiment of the crossbar switch based DMA datapath embodiment of FIG. 18, improved concurrency can be obtained by replacing the shared memory resource among the directions by a dedicated cross point buffer for each DMA direction. Therefore, DMAs with two different destination ports having same source port can seamlessly pass data transfer between source and destination ports. FIG. 21 is a block diagram of an alternate crossbar switch-based datapath, according to the present alternate embodiment. As shown in FIG. 21, elements 420, 422 and 430 are the same as those same numbered elements previously shown in FIG. 18. In the presently shown embodiment of FIG. 21, the input VOQ buffers 424 of FIG. 18 are replaced with input CP buffers 460, the VOQ input multiplexor 426 of FIG. 18 are replaced with CP input multiplexors 462, and the VOQ arbitrated crossbar switch 428 of FIG. 18 is replaced with CP arbitrated crossbar switch 464.

Each of the input CP buffers 460 are independent, therefore all the DMA directions are provided with independent memory interface. Whenever the input CP buffers are 460 are filled with data, the DMA read port engine issues requests towards the respective destination port arbiter for grant of connection to destination port for transferring the data. On establishment of the grant from destination port arbiter, the respective DMA direction transfers data seamlessly towards destination port without any HOL issue.

The architecture of the CP buffers has been provided the flexibility to not only support per-direction DMA transfer but also support multiplexed direction DMA transfer. For example, DMA transfers for directions A2B and C2B can share the same memory space and transfer data towards the destination port C in a time division multiplexed (TDM) order. The currently described embodiments support this feature for certain DMA directions. The selection between per-direction CP buffer vs. multiplexed-direction CP buffer will depend on the application and usage model. In alternate embodiments, the same structure can be extended to support designs with different memory spaces and different channelization by organizing a CP buffer for each concurrent DMA channel.

Port Trunking

Figure 22:
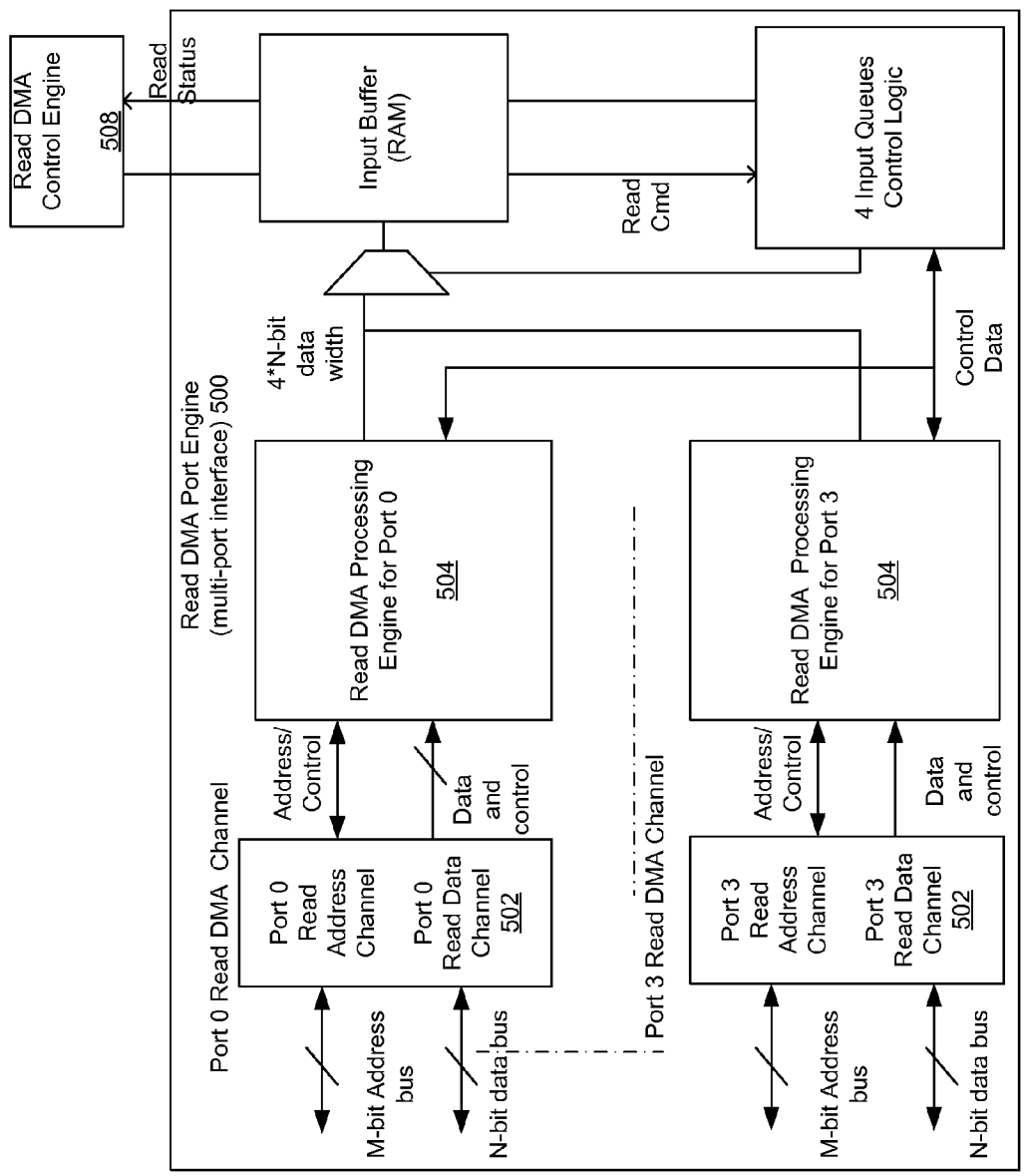
FIG. 22 illustrates port trunking on a source port according to an embodiment of the present invention.
Figure 23:
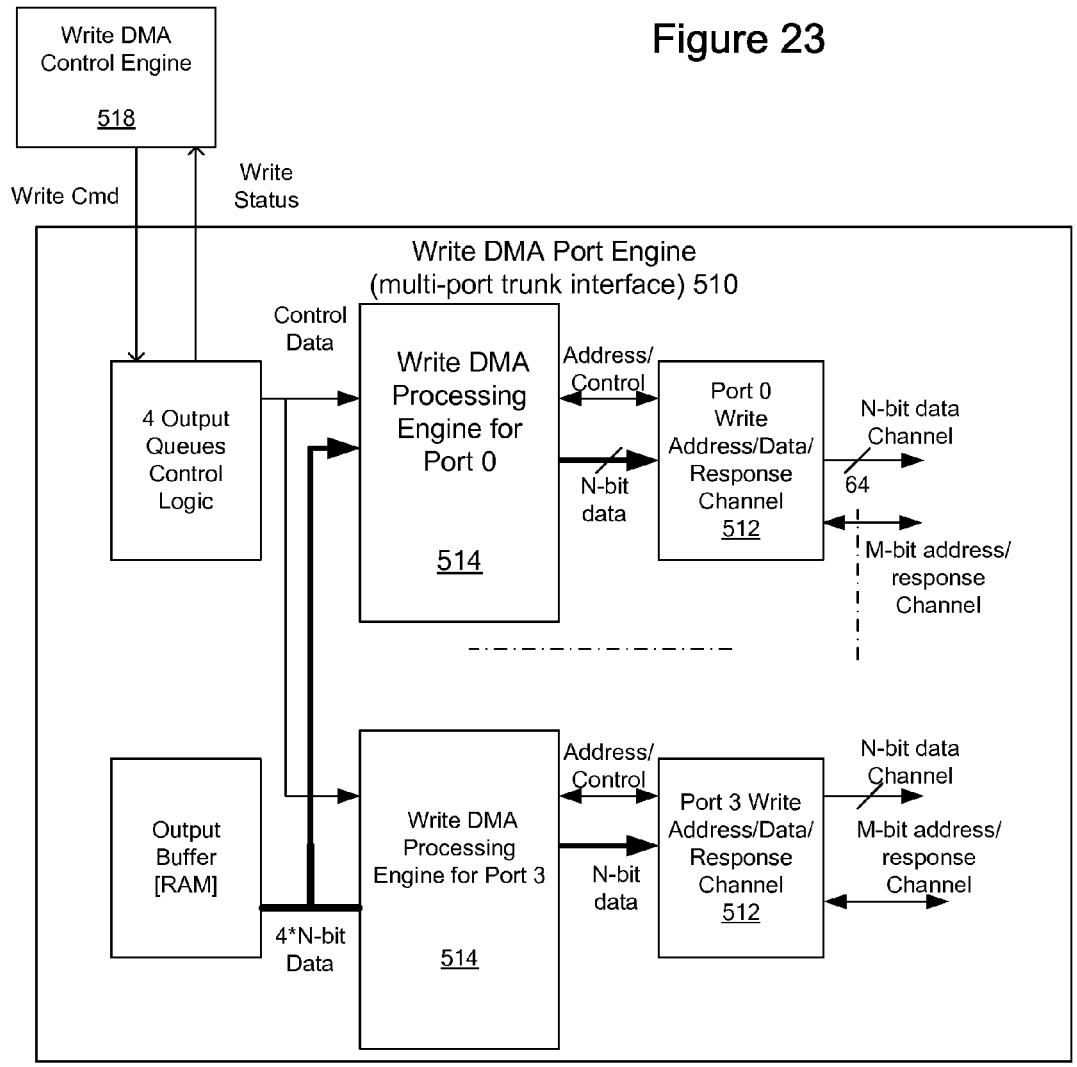
FIG. 23 illustrates port trunking on a sink (destination) port according to an embodiment of the present invention.

The throughput of existing DMA engines is restricted by the speed of individual physical ports of the memory space. The data transfer by such DMA engines is sequentially pipelined to read or write to the memory space using the respective physical port. Embodiments of the present invention can utilize a novel technique to improve data throughput by providing multiple physical ports to access the same memory space. These physical ports are virtually grouped as a single entity and the data transfer is striped across the ports. Each of the physical ports can potentially serve the same DMA or multiple DMAs depending on the DMA transfer size. The order of the DMA data and completion status is preserved while still attaining higher throughput. An embodiment of the present invention implements port trunking using multiple ports to interface with the read and write ports of the memory space. FIG. 22 and FIG. 23 illustrate on how multiple physical ports are used to read data from a memory space or write data to a memory space using the port trunking scheme.

Referring to FIG. 22, a port trunked read DMA port engine 500 has multiple physical ports 502 connected to the same memory space. A preferred embodiment of the invention contains four physical ports (Port0 to Port3) accesses to the read interface of the memory space. In this example embodiment, each of the physical ports 502 has a corresponding read DMA processing engine 504. The basic function of DMA processing engine 504 is to break the GSM read command into multiple AXI read burst transfers and generate the necessary signals compliant to AXI protocol. The read DMA Processing Engine 504 is also responsible for the execution of read commands and aligning the incoming data to AXI data bus boundary and then removing DPI bytes if any are present, and then aligning it to 32-byte words as to be written to the data buffer. The port trunked read DMA port engine 500 periodically checks whether any of the physical ports are available to process read transactions and re-directs the incoming read DMA command onto the first available physical port. If there are multiple ports available, and if sufficient memory slots are reserved for fetching data from each of these multiple ports, the port trunked read DMA port engine 500 can request more read DMA commands and issue them on each of the physical ports. These commands can belong to the same DMA transfer or multiple DMA transfers. The read DMA control engine 508 slices the in-flight DMA of the respective DMA channel, into multiple DMA read commands and issue requests against the port arbiter for grant of access to port trunked read DMA port engine 500. The cumulative bandwidth achieved by using this architecture is N*single_port_DMA_performance where N represents the number of physical ports used in DMA transfer.

Referring to FIG. 23, a port trunked write DMA port engine 510 has multiple physical ports 512 connected to the same memory space. A preferred embodiment of the invention contains four physical port (Port0 to Port3) accesses to the write interface of the memory space. The write DMA control engine 518 issues requests to the VOQ arbiter for grant of access to port trunked write DMA port engine 510 whenever the output RAM buffer has an empty slot to store data belonging to the write command. The port trunked write DMA port engine 510 periodically checks whether any of the physical ports are ready to process write transactions. On availability, each write DMA command is striped across the write DMA processing engines 514 of the associated physical port. These write DMA commands can belong to the same DMA transfer or multiple DMA transfers. If they belong to the same DMA transfer, the transfer byte count is sliced into multiple DMA write commands and each of this command are concurrently issued on the available DMA destination ports. The cumulative bandwidth achieved by using this architecture is N*single_port_DMA_performance where N represents the number of physical ports used in DMA transfer.

In this example embodiment, each of the physical ports 512 has a corresponding write DMA processing engine 514. The write DMA processing engines 514 of the physical ports streams 32-byte data from the Output Buffer RAM in a time-division multiplexed (TDM) order. The basic function of this processing engine is to break the GSM write command into multiple AXI write burst transfers and generate the necessary signals compliant to AXI protocol towards the destination GSM physical port. The write DMA Processing Engine 514 is also responsible for processing the response completions of the AXI burst transfers and generate write command completion towards the port trunked Write Port Engine 510.

Enhanced Port Trunked Read DMA Port Engine

The previously described port trunked read DMA port engine 500 of FIG. 22 is limited to processing DMAs belonging to only one DMA direction. According to an alternate embodiment, the port trunked read DMA port engine 500 can be configured to support multiple DMA directions and to increase bandwidth of any single DMA transfer.

A further description of the alternate port trunked read DMA port engine configuration now follows. The alternate port trunked read DMA port engine has multiple physical ports connected to the same memory space. A preferred embodiment contains eight physical port accesses distributed in two sets of four interface ports. Each set is governed by one alternate port trunked read DMA port engine that interfaces with independent memory subsystems for efficient and concurrent transfers.

This alternate port trunked read DMA port engine has the capability of supporting multiple DMA directions, and the capability to process multiple DMAs across the available physical ports. As with the previous port trunked read DMA port engine 500, if there are multiple ports available and if there are sufficient memory slots reserved for fetching data from each of these multiple ports, it can request for more read DMA commands and issues them on each of the physical port. However in the present alternate embodiment, these commands can belong to the same DMA transfer or multiple DMA transfers for same as well as different DMA direction having common source port.

Enhanced Port Trunked Write DMA Port Engine

The port trunked write DMA port engine 510 of FIG. 23 uses all 4 ports to process write transfer for the same DMA. Accordingly, write DMA port engine 510 does not have the capability to handle (a) multiple DMAs of same DMA direction and (b) the same or multiple DMAs of different DMA directions. In the previously described embodiments, the write data transfer is segmented into single or multiple write commands depending on the DMA transfer size. Therefore, in the case of destination ports employing port trunking, one such write command is processed simultaneously by all the destination ports involved in the port trunking functionality. In other words, all the ports are processing the same DMA if the DMA transfer size is sized the same as the maximum transfer size of write command. Accordingly, the number of ports engaged during the write transfer is dependent on the transfer size of write command. This results in some of the ports not being involved in data transfer, thereby leading to lower overall performance.

According to an alternate embodiment, the port trunked write DMA port engine 510 can be configured to handle features (a) and (b) above. In a preferred alternate embodiment, the port trunked write DMA port engine contains eight physical port accesses distributed in two sets of four interface ports. Each set is governed by one write DMA port engine that interfaces with an independent memory subsystem for efficient and concurrent transfers.

This alternate port trunked write DMA port engine has the capability of supporting multiple DMA directions, and the capability to process multiple DMAs across the available physical ports. The write DMA control engines 518 issue requests to the destination port arbiter for grant of access to port trunked write DMA port Engine. This alternate port trunked write DMA port engine periodically checks whether any of the physical ports are available to process write commands and re-directs the incoming write DMA command onto the first available physical port. If there are multiple ports available and if there are sufficient memory slots reserved for fetching data from each of these multiple ports, it can request for more write DMA commands and issues them on each of the physical ports.

The write DMA control engines 518 can slice the in-flight DMA of the respective DMA channel, into multiple DMA write commands based on the amount of data stored in CP buffers for that DMA, and issue requests against the destination port arbiter for grant of access to this write DMA port engine.

A further refinement of the presently described port trunked write DMA port engine includes configuring the write DMA port engine to process independent write commands.

Figure 24:
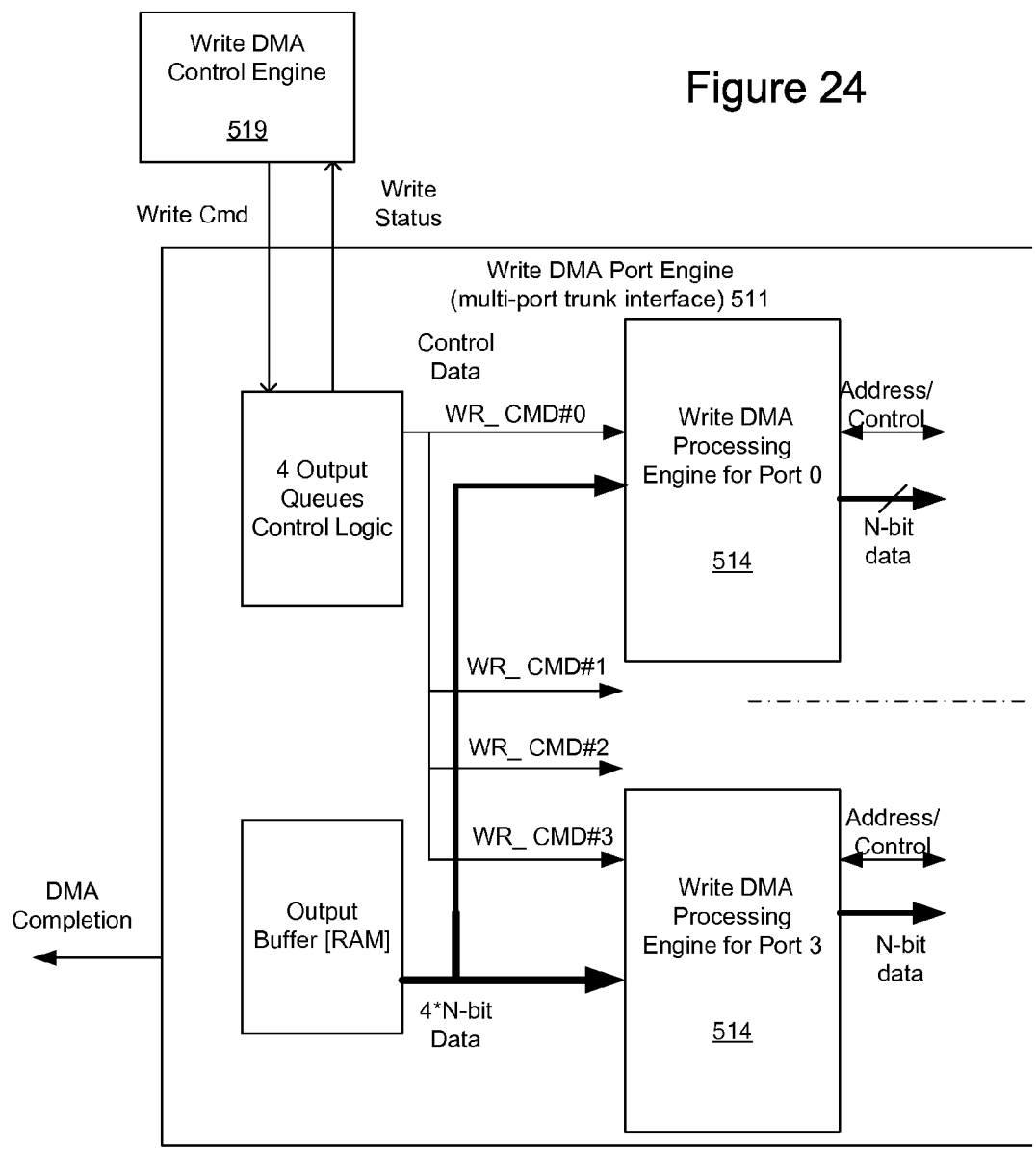
FIG. 24 illustrates an alternate port trunking on a sink (destination) port.

In yet another alternate embodiment of the port trunked write DMA port engine 510 of FIG. 23, each port of the trunked port is configured to process independent write commands and thereby independent DMAs. Due to this capability to process write commands, there is an increase in the burstiness of the write requests issued across the destination ports thereby increasing the data transfer performance. FIG. 24 is a block diagram of an alternate port trunked write DMA port engine 511, according to the present alternate embodiment. FIG. 24 is substantially the same as FIG. 23, except that the multiple physical ports 512 are intentionally omitted in order to simplify the drawing. Port Trunekd Write DMA port engine 511 includes the same components as those shown in FIG. 23. In FIG. 24, the write DMA control engine 519 is configured to provide multiple independent commands, which in the presently shown example of FIG. 24 are four independent commands referred to as WR_CMD#0, WR_CMD#1, WR_CMD#2 and WR_CMD#3.

Another enhanced feature of port trunked write DMA port engine 511 is the provision of a DMA completion status for the write transfer operations. In the case of processing independent write commands belonging to the same DMA, the trunked port will receive write response completions of all the write commands out of order. It is the responsibility of the write port engine to order the response completions and generate in order DMA Completion statuses or in order write command completion statuses and report the completion status towards the respective control modules. In case of processing independent DMAs, the trunked port will report a DMA completion status for the respective DMAs in the order they have been processed. This architecture enhancement is not limited to supporting either modes but also supports a combination of both. For example, in a trunked port of 4 independent ports, three ports can be processing write commands belonging to the same DMA while the remaining last port can be processing write command belonging to a different DMA. In such a case, the trunked port can process DMA Completion Status between both DMAs without any dependency between fourth port and rest of the other ports processing first DMA.

Hole Insertion/Removal

Embodiments of the present invention incorporate a novel feature in the capability to insert or remove holes within the data stream of DMA transfer. In conventional storage or data processing systems, each sub-system inserts or processes data protection information (DPI) fields, such as cyclical redundancy check (CRC) fields, to data received from the interfacing sub-system. As such, each of these sub-systems requires dedicated control logic to process these data holes, the overall system cost increases due to the presence of duplicated logic, and data transfer efficiency is affected. Also, since these data holes can be inserted at different stages of the data transfer, there is no overlapping protection of data, resulting in data corruption. Known DMA engines process these data holes by streaming control information along with the data to indicate whether the data bytes correspond to DMA data or DPI data. The data bus size of such processing engines is typically restricted to 8-byte words and uses single DMA channels. The present invention does not pipeline any control information on a per-byte basis to indicate whether a data byte belongs to a data hole or to the DMA data. Embodiments of the present invention also support hole insertion/removal for multiple concurrent DMA channels with unaligned data transfers, programmable sector sizes and data hole sizes.

Figure 25:
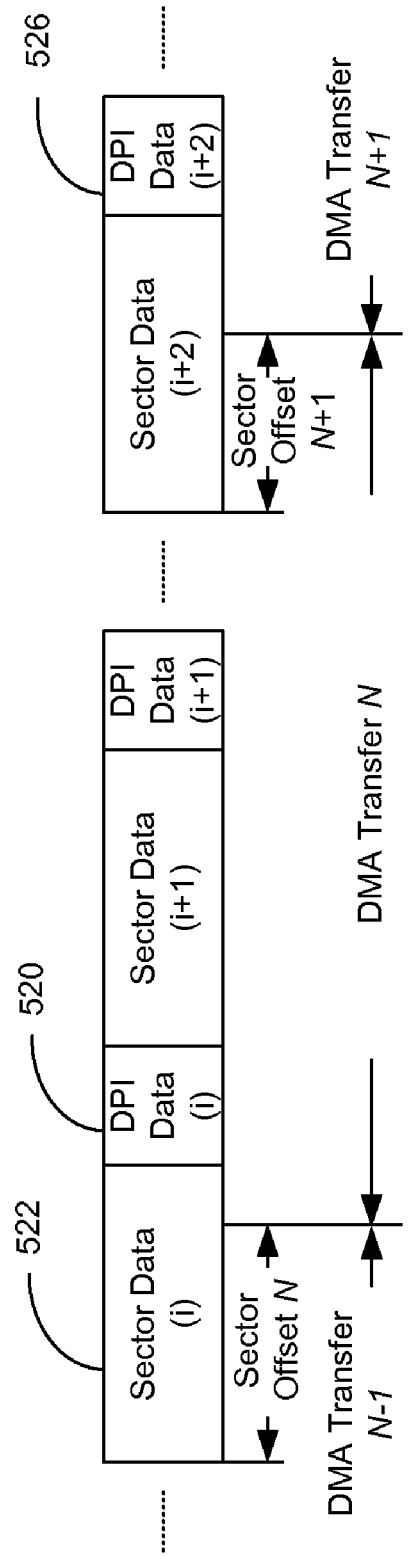
FIG. 25 illustrates data protection information (DPI) insertion/stripping according to an embodiment of the present invention.

FIG. 25 illustrates how data holes 520 containing DPI information are embedded within data formatted as array of sectors similar to disk array memory. This figure shows a DMA transfer, N, and specifies a transfer at SectorOffset-N of SectorData-(i) 522. A DMA transfer could start and end anywhere between the first byte of sector data 522 and the last byte of DPI data 526. One DMA transfer can cross several data sectors and DPI data holes.

Figure 26:
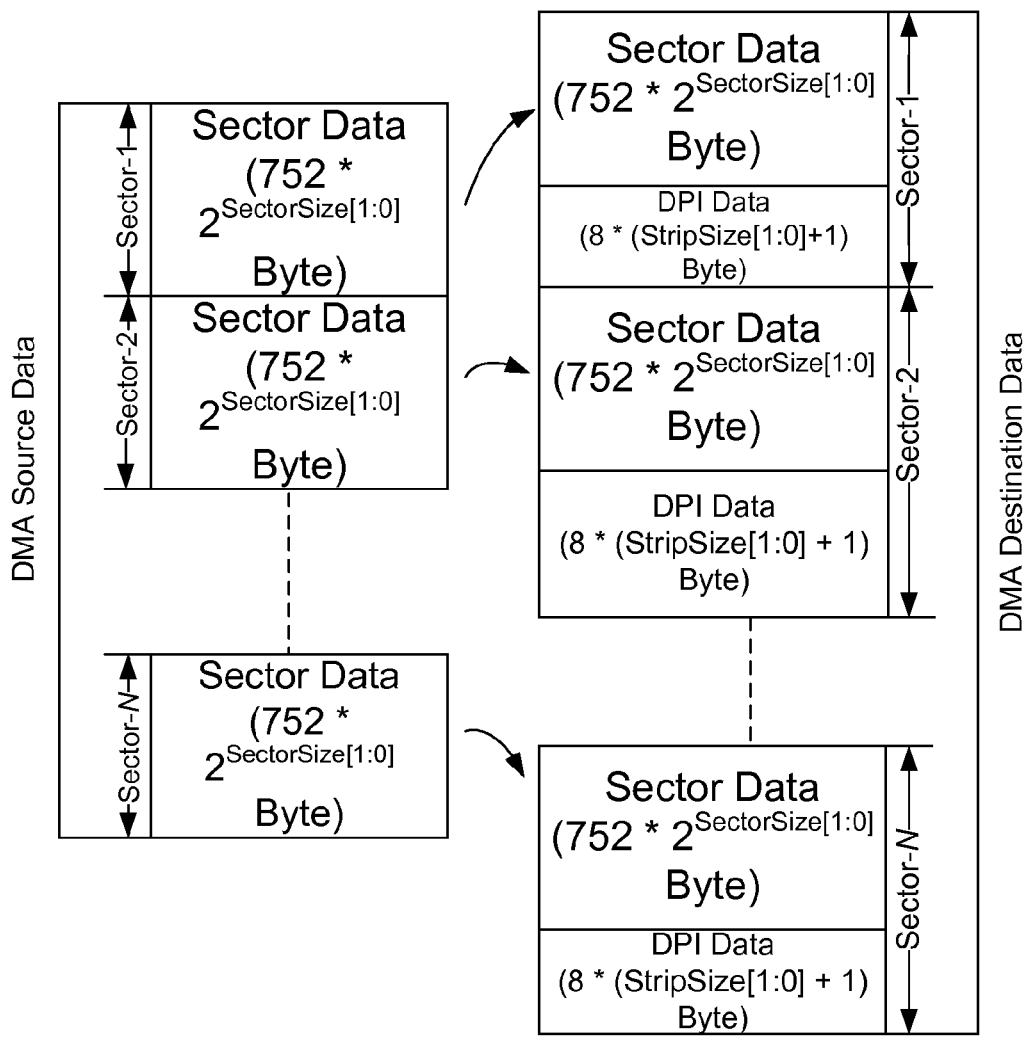
FIG. 26 illustrates DPI data insertion according to an embodiment of the present invention.

In the case of a DMA transfer that includes a Hole Insertion command in the descriptor, the Write DMA Port Engine can perform the function of DPI insertion (Hole Insertion). The positions of the sector data and DPI data are assessed based on the sector offset, sector size and strip size information provided by the write DMA control engine to write DMA port engine. For every write command processed by the write DMA port engine, the offset positions of the hole and sector data are calculated for every write transaction performed across the physical port. Based on these positions, write DMA port engine injects a DPI hole by inserting the appropriate number of all-zeros into the data stream. These DPI bytes are later replaced with CRC bytes of the DMA data. FIG. 26 illustrates data movement when DPI data insertion is selected. At the destination, a memory hole is added to the end of every sector. In this example, the DMA transfer byte count is N*512*2**SectorSize[1:0] Byte. When DPI data insertion is selected, the ByteCount field in the descriptor specifies the valid sector bytes that have been read from the source port.

Figure 27:
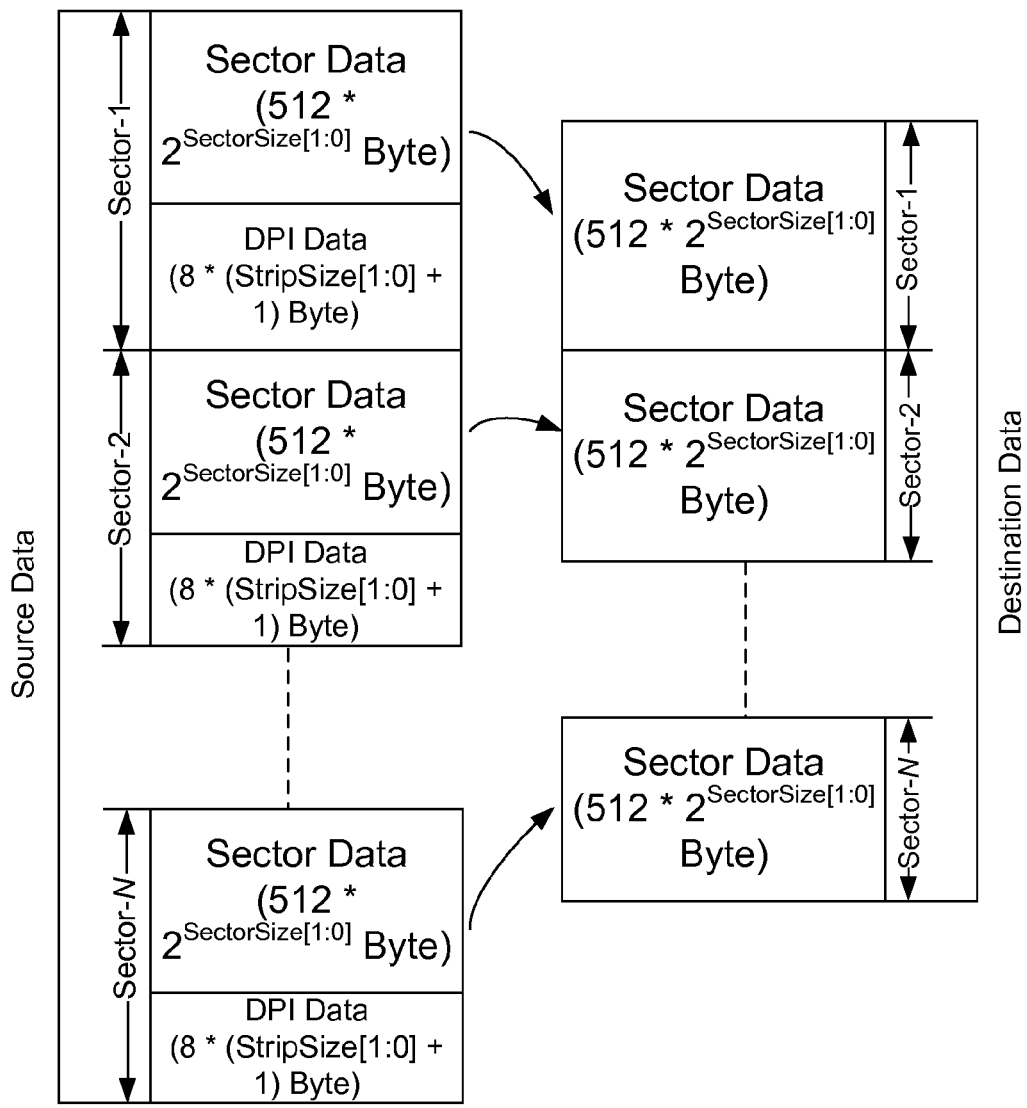
FIG. 27 illustrates DPI data removal according to an embodiment of the present invention.

In case of DMA transfer that includes a Hole Removal command in the descriptor, the read DMA port engine can perform the function of DPI removal (hole removal). The positions of the sector data and DPI data are assessed based on the sector offset, sector size and strip size information provided by the read DMA control engine to the read DMA port engine. For every read command processed by the read DMA port engine, the offset positions of the hole and sector data are calculated for every read transaction performed across the physical port. Based on these positions, the read DMA port engine generates a read strobe signal to indicate valid sector data bytes. Having discarded the hole (DPI) bytes, the sector bytes are then processed by the read DMA engine and stored in the input RAM for DMA transfer. In the case of DMA transfer involving scatter—gather lists, the read DMA port engine has the capability to ignore reading a data fragment that is completely comprised of DPI bytes. FIG. 27 illustrates data movement when DPI data striping is selected. In this example, DMA transfer byte count is N*512*2**SectorSize [1:0] Byte. When DPI data removal is selected, the byte count field in the description specifies the total number of bytes, including the DPI bytes that have been read from the source port.

While the previously described DPI removal or deletion is configured for sector sizes limited to powers of 2, sector sizes of non-powers of 2 can be supported in alternate embodiments.

Endianess Transformation

Data bytes can be ordered in different ways based on the design implementation for a particular application imposed by the transfer protocols. For example, a MIPS processor supports big-endian 32-bit byte ordering while Intel processors in PCs support little-endian byte ordering. Therefore, there exists a discrepancy when dealing with systems using two different byte-ordering schemes. This can be eliminated by re-ordering the bytes prior to transferring data onto destination port or after receiving data from the source port. Most known DMAs operate using a single mode of endian byte-ordering format. Known DMAs, such as that described in U.S. Pat. No. 6,799,232, perform endian conversion after aligning the incoming data on a double word boundary. The present embodiment is not limited by aligning the data before performing endian conversion. It supports any random data transfer whether aligned or un-aligned for various data bus sizes (for example, 256-bit data bus, 128-bit data bus, 64-bit data bus). The incoming data is sent through a data processing engine so as to pack the data appropriately taking into account the different data bus sizes of source read port and sink write port, unaligned addresses, and DPI fields. The processed data is then sent through an endian conversion module. The data is fragmented into bytes and stored in the form of a multi-dimensional array. Depending on the endian translation mode and the desired data bus width, the data from this array is again packed into words or double-words of the appropriate size.

Depending on the width of the data bus, unaligned big-endian data can contain non-contiguous data. Prior art DMA systems do not support data transfer involving non-contiguous data. If the destination port of the DMA transfer is unaligned and involves endian conversion, the first and last transactions of such DMA transfer are usually prone to have non-contiguous data. Embodiments of the present invention have the capability to split the transactions having non-contiguous data into two separate continuous data transactions issuing appropriate address.

Figures 28, 29, 30:
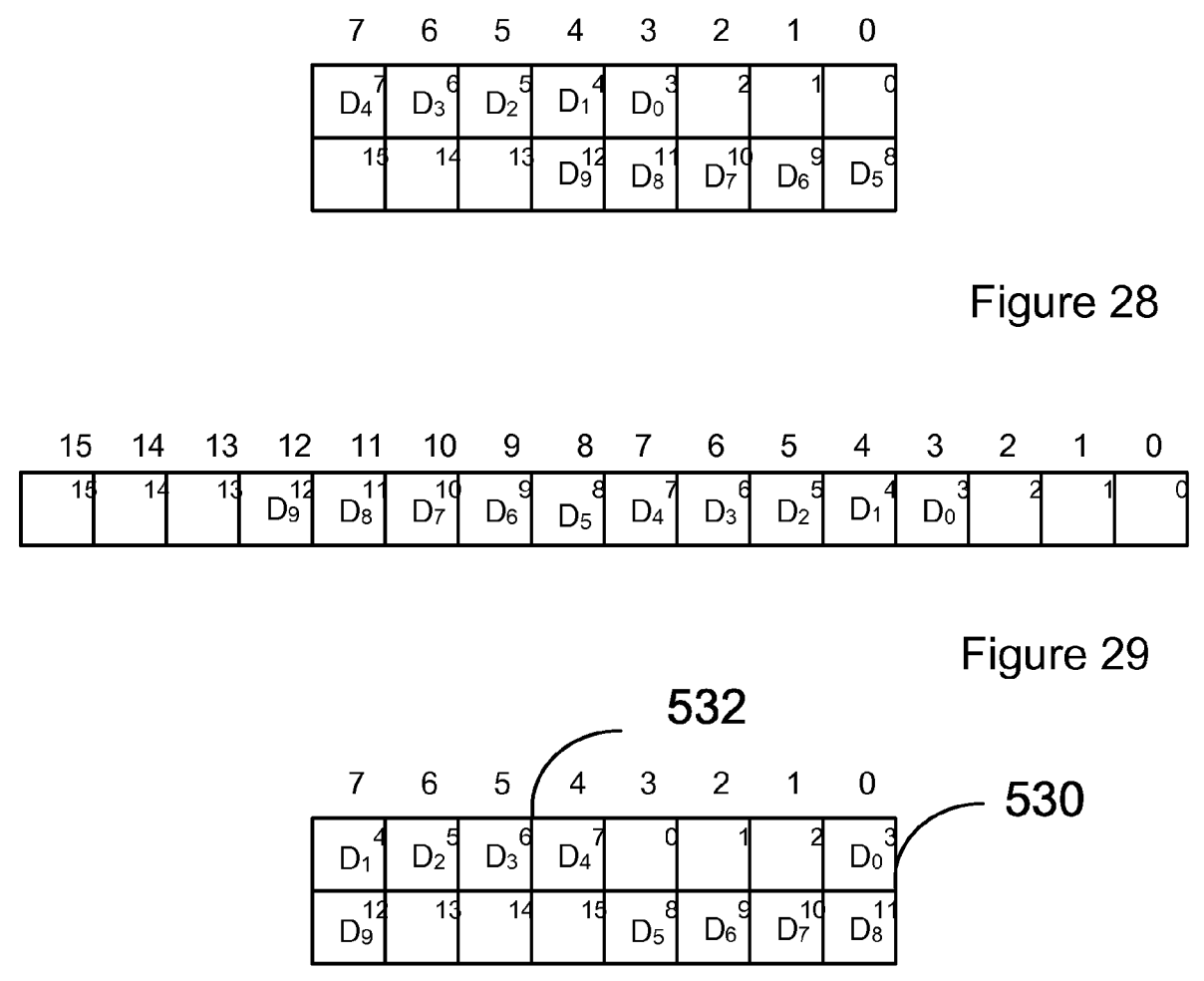
Figures 31, 32, 33:
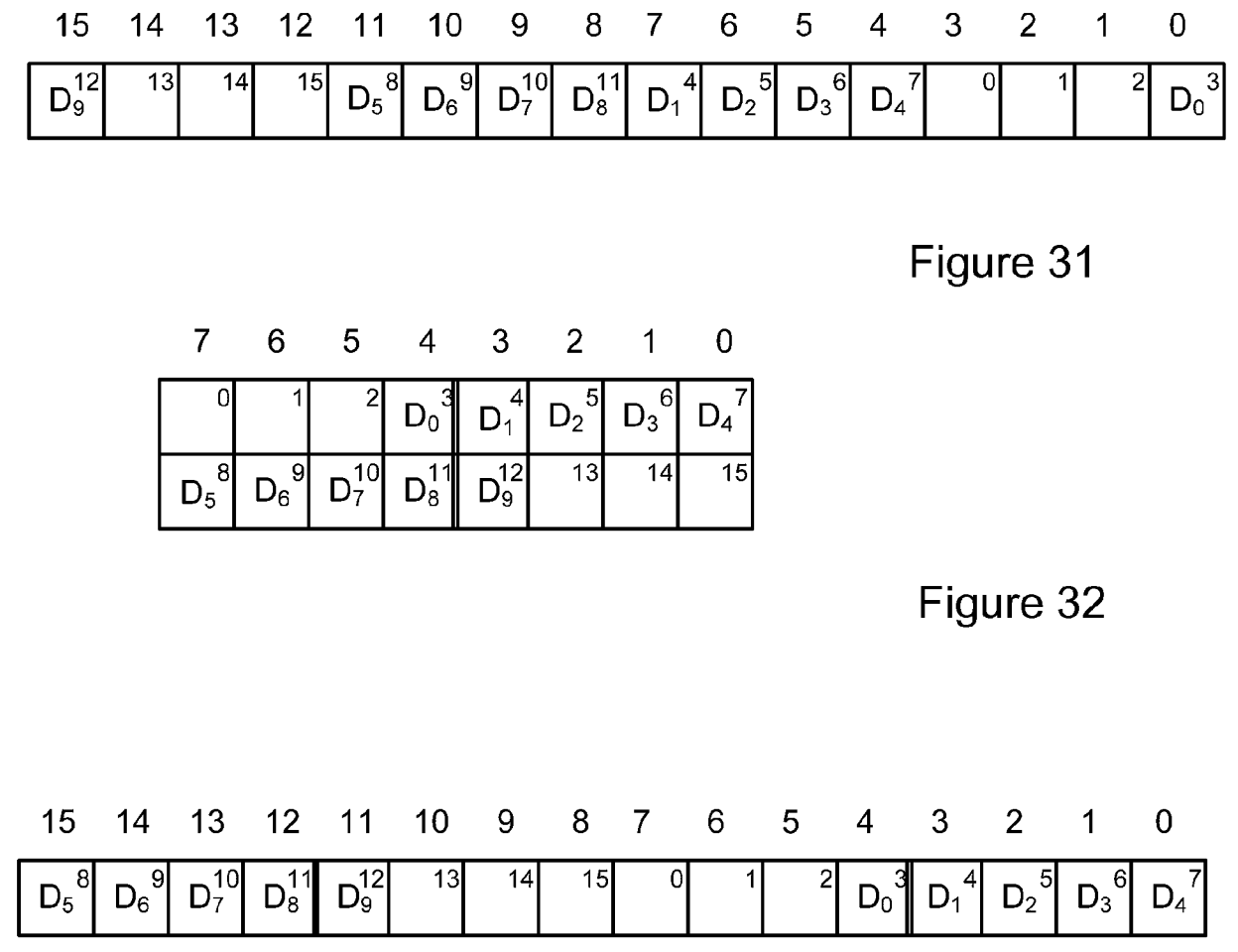

Little-endian is agnostic to data bus width. For example, FIG. 28 and FIG. 29 show 9-byte data in little-endian on 64- and 128-bit busses, respectively. The order of data bytes is the same. The number 0-7 in FIG. 28 and the number 0-15 in FIG. 29 represent the address offset within the data width of the corresponding AXI data bus. When the DMA descriptor indicates the data is in big-endian, the DMA engine will treat the corresponding data address in the descriptor as for big-endian data. Depending on the actual data type, big-endian data will have different mappings on the AXI data bus. For example, in FIG. 30, 32-bit big-endian data will start at address three on a DMA 64-bit data bus. Since this is for big-endian data, the address will be in big-endian. So, the first data byte 530 will go to AXI data byte lane-0, which has a big-endian address of 3. The second data byte 532 will be at big-endian address 4, which is at AXI data byte lane-7. Depending on the width of the data bus, unaligned big-endian data could be on noncontiguous AXI byte lanes. FIG. 31 shows the same 32-bit big endian data will start at address three on a DMA 128-bit data bus. FIG. 32 and FIG. 33 show the mapping of 64-bit big endian data on DMA 64-bit and 128-bit data buses, respectively.

Descriptor Pipelining

The control information to perform DMA transfer is stored in a descriptor. The descriptor consists of several words of data to indicate source address, destination address, DMA transfer byte count, and other information, such as endian format, hole insertion or removal etc. The descriptor is either stored in a register array or memory. Prior art DMA engines fetch and process one descriptor at a time. While the current descriptor is being serviced, these DMA engines pre-fetch the next descriptor to achieve higher system throughput. In the case of systems where the DMA transfers consist of lower transfer size and higher latency in fetching descriptors and processing DMA transfer, the throughput will be low if the prior art DMA engines fetch one or two descriptors per DMA channel.

An embodiment of the present invention has the capability to pre-fetch and process multiple descriptors within the same channel or multiple channels concurrently. The DMA descriptor fetching engine has dedicated descriptor context buffers to store the read and write DMA descriptor context information separately for each of the multiple concurrent channels. This permits the Read DMA control/port engines 586, 592 and write DMA control/port engines 588, 614 to process descriptors concurrently without any dependency on each other. These DMA channels can handle independent read and write transfers on the source and sink memory ports 548 and 550, respectively as explained above. As such, both read DMA port engine 592 and write DMA port engine 614 can fetch descriptors from the descriptor context buffers 580, 582 through their respective control engines and issue multiple requests for read DMA transfers and write DMA transfers.

In the case of read DMA transfer, while the data is still in transit or pending, owing to the long round-trip latency, the read DMA engines (control 586 and port 592) can fetch new descriptors from the read descriptor ring buffers 580 and issue requests as long as there is an available memory slot to store the incoming data. Thus, embodiments of the present invention support having multiple DMAs concurrently in flight in the same DMA direction and among multiple DMA directions.

In a similar manner, in the case of write DMA transfer, after issuing the write transfer on address and data channels towards the sink write port memory 550, while the response is in-flight or pending, the write DMA engines (control 588 and port 614) can fetch new descriptors from the write descriptor ring buffers 582 and perform new write transfers as long as the sink write port memory 550 is ready to accept the write transfer on address and data channels. This mechanism achieves higher throughput even with longer round trip latencies in fetching descriptors and DMA data from multiple memory spaces. Thus, embodiments of the present invention support having multiple DMAs concurrently in-flight in the same DMA direction and among multiple DMA directions.

There may be configurations where new descriptors are fetched by read/write control engines only on the response completion of all requests belonging to the read/write command by the respective read/write port engines. Improved descriptor pre-fetching performance can be obtained by configuring the read and write DMA control engines to pre-fetch new descriptors as soon as the respective read/write commands are accepted by read/write port engines. Furthermore, read or write commands can still be pending while read/write requests are issued towards the respective AXI ports. More specifically, the read DMA control engine can fetch new read descriptors as soon as the last read command has been accepted by the read DMA port engine. Under such a configuration, overall performance is improved as the respective control engines can keep the pipeline busy in processing the read and write commands.

Figure 34:
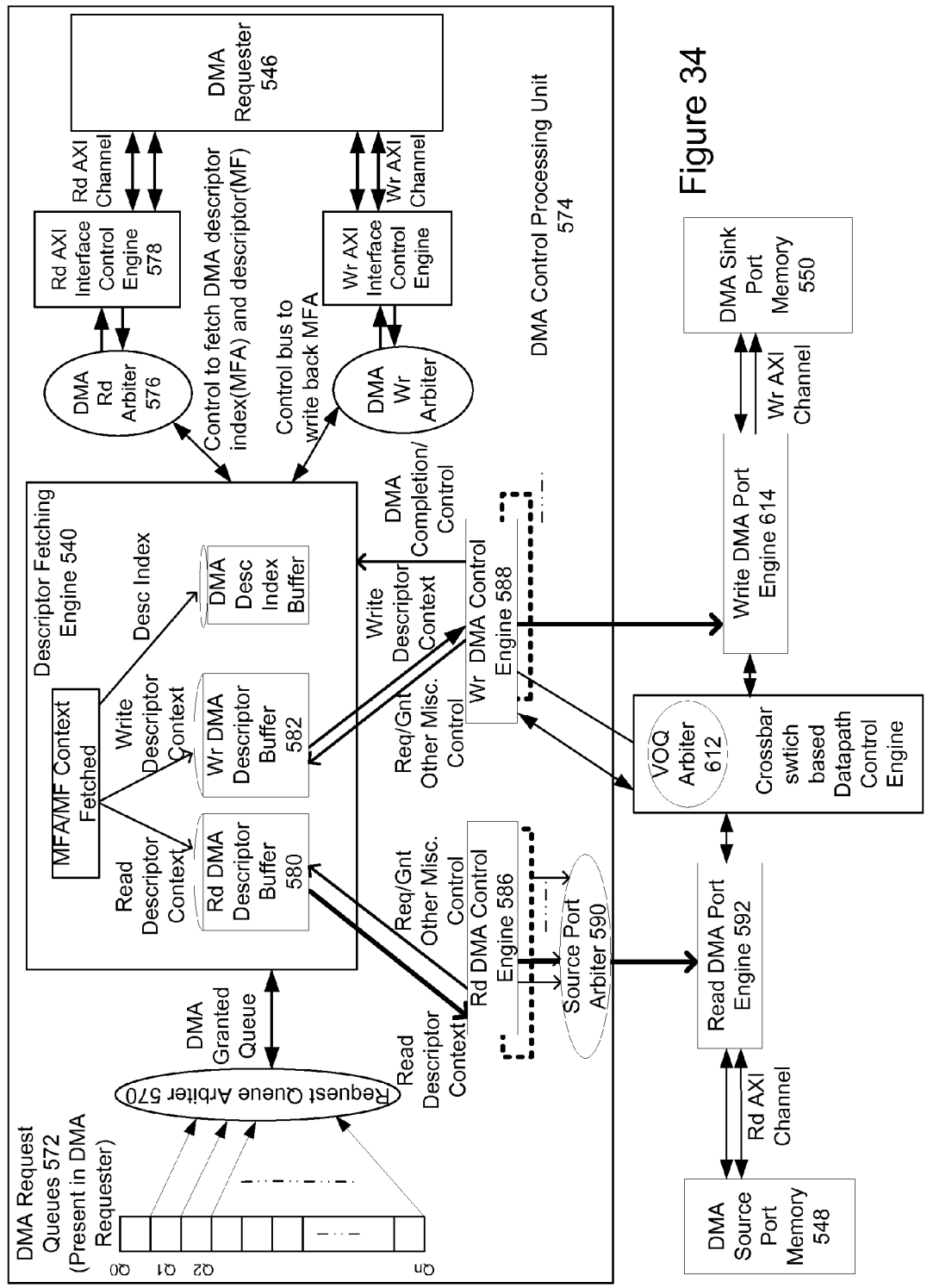
FIG. 34 illustrates descriptor-fetching logic in a DMA engine according to an embodiment of the present invention.
Figure 35:
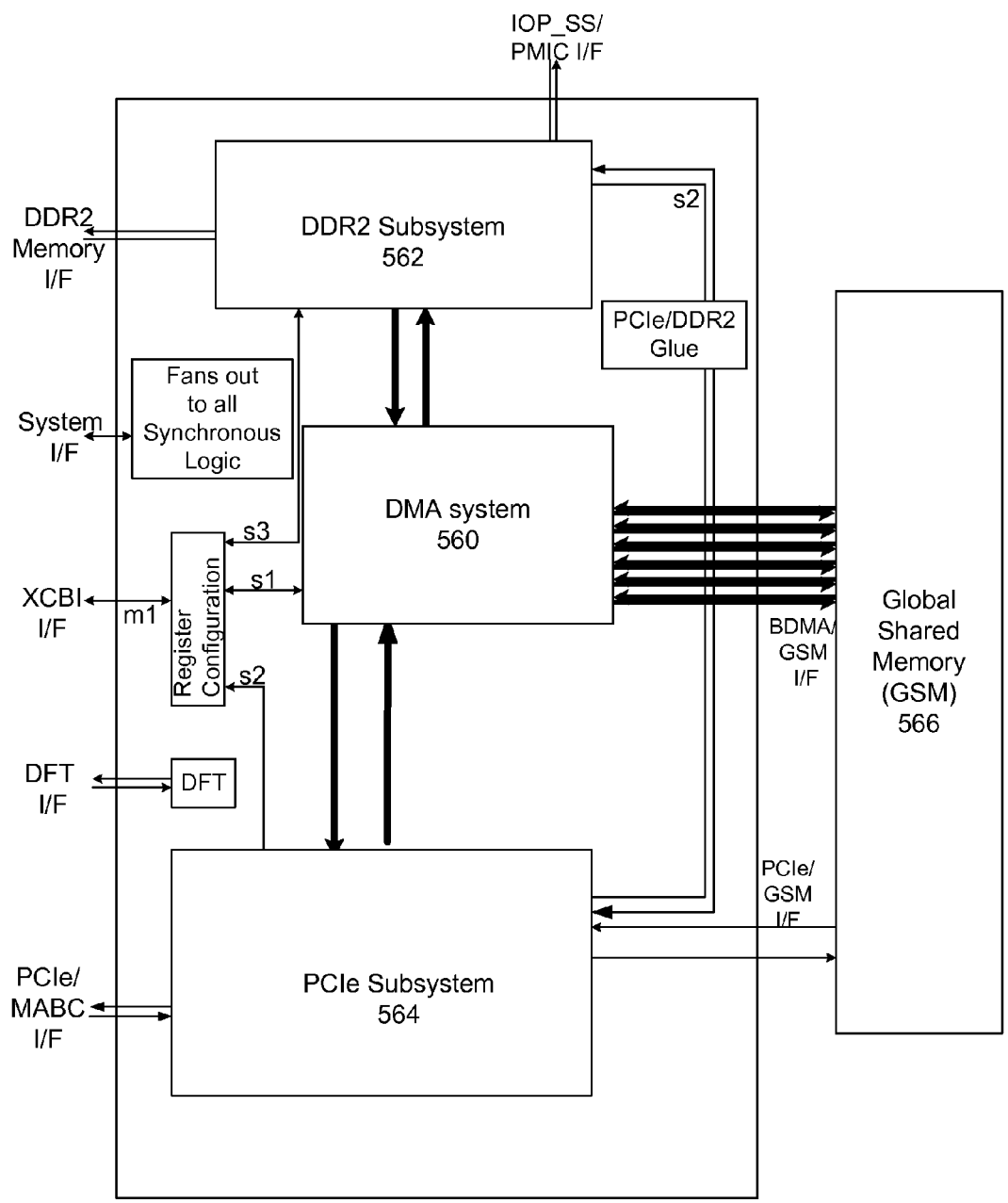
FIG. 35 illustrates a PMIC sub-system block diagram according to an embodiment of the present invention.
Figure 36:
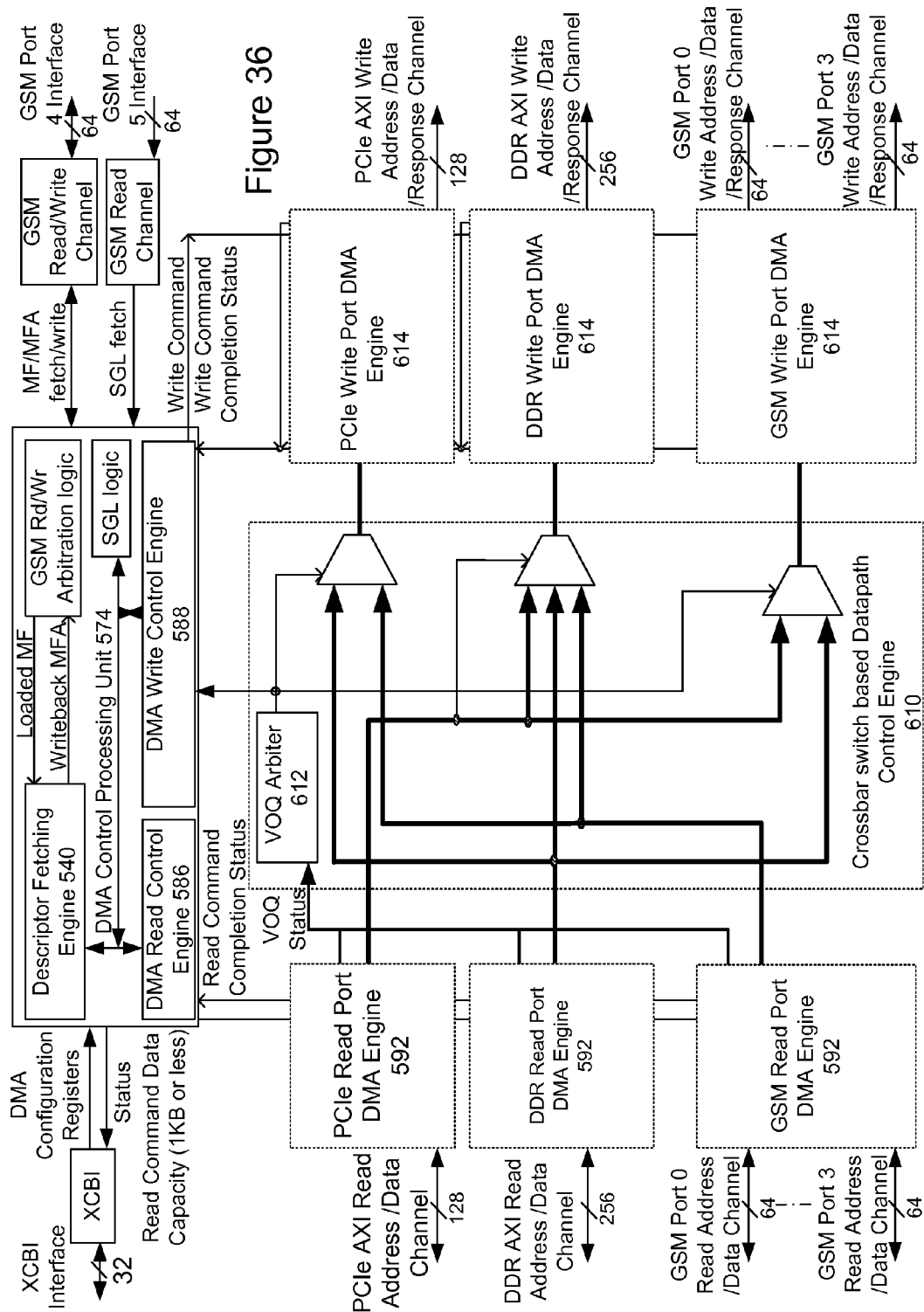
FIG. 36 illustrates a system block diagram of a DMA controller according to an embodiment of the present invention.
Figure 37A:
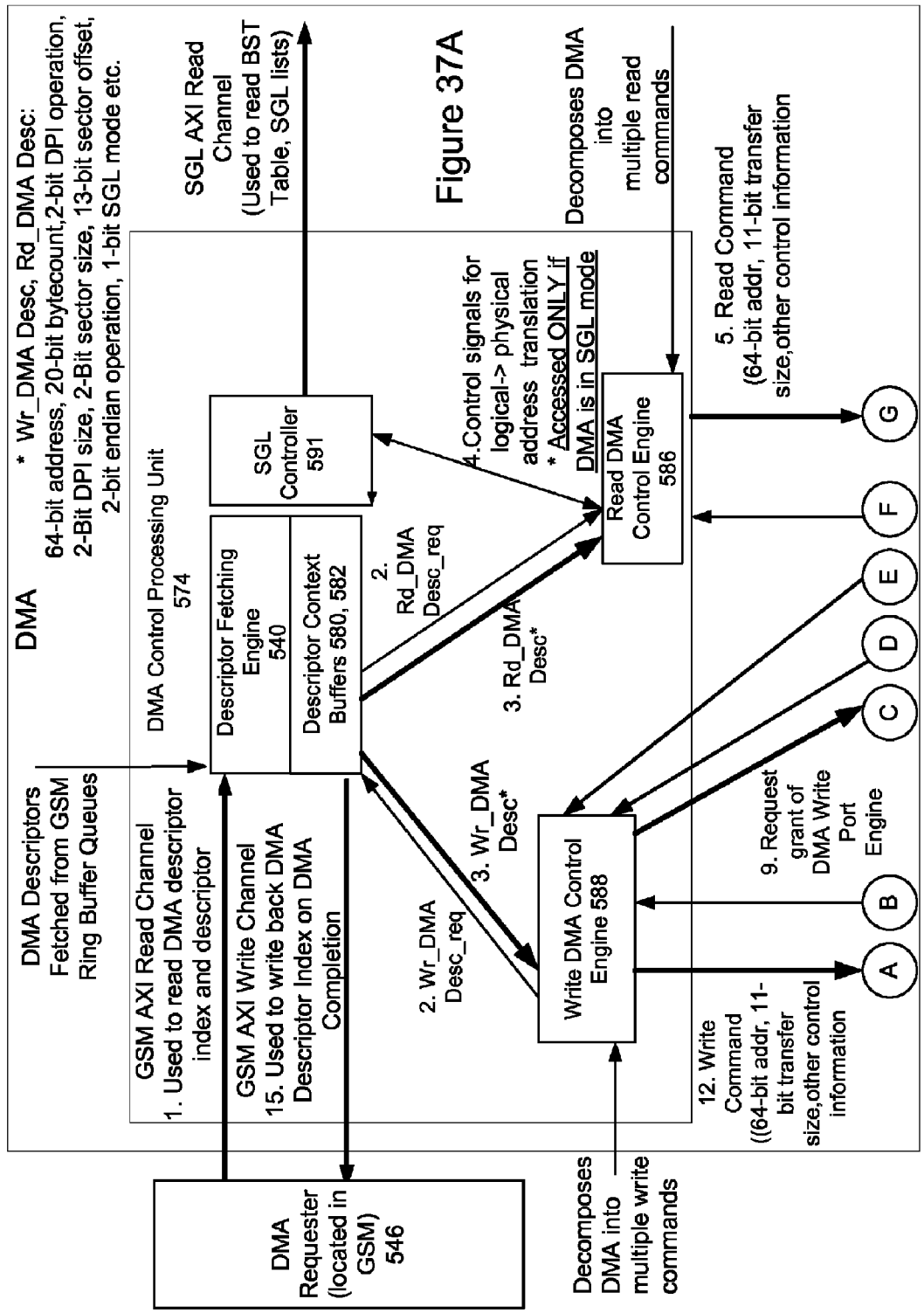
FIGS. 37A and 37B illustrates a functional dataflow diagram of a DMA controller according to an embodiment of the present invention.
Figure 37B:
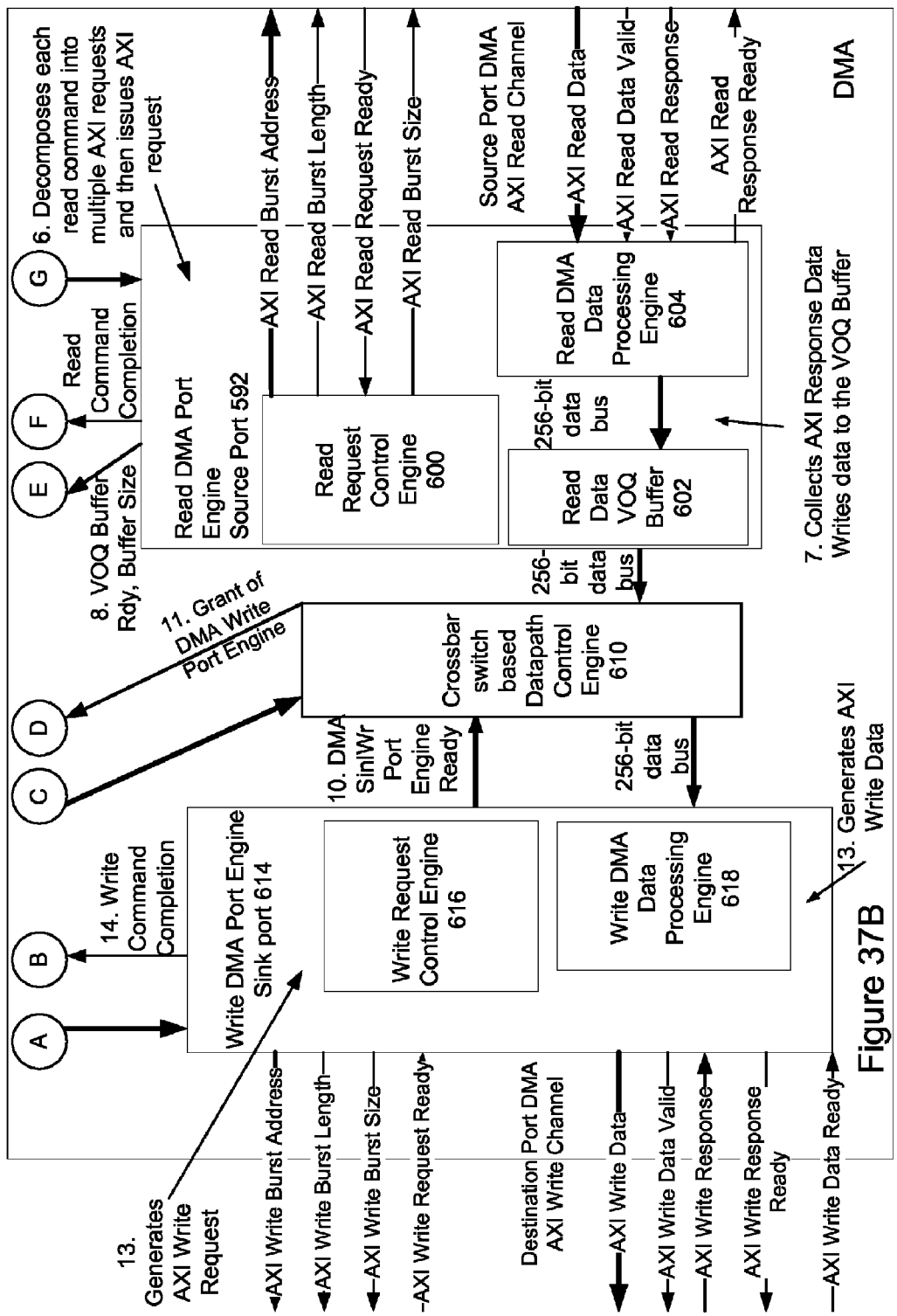
Figure 38:
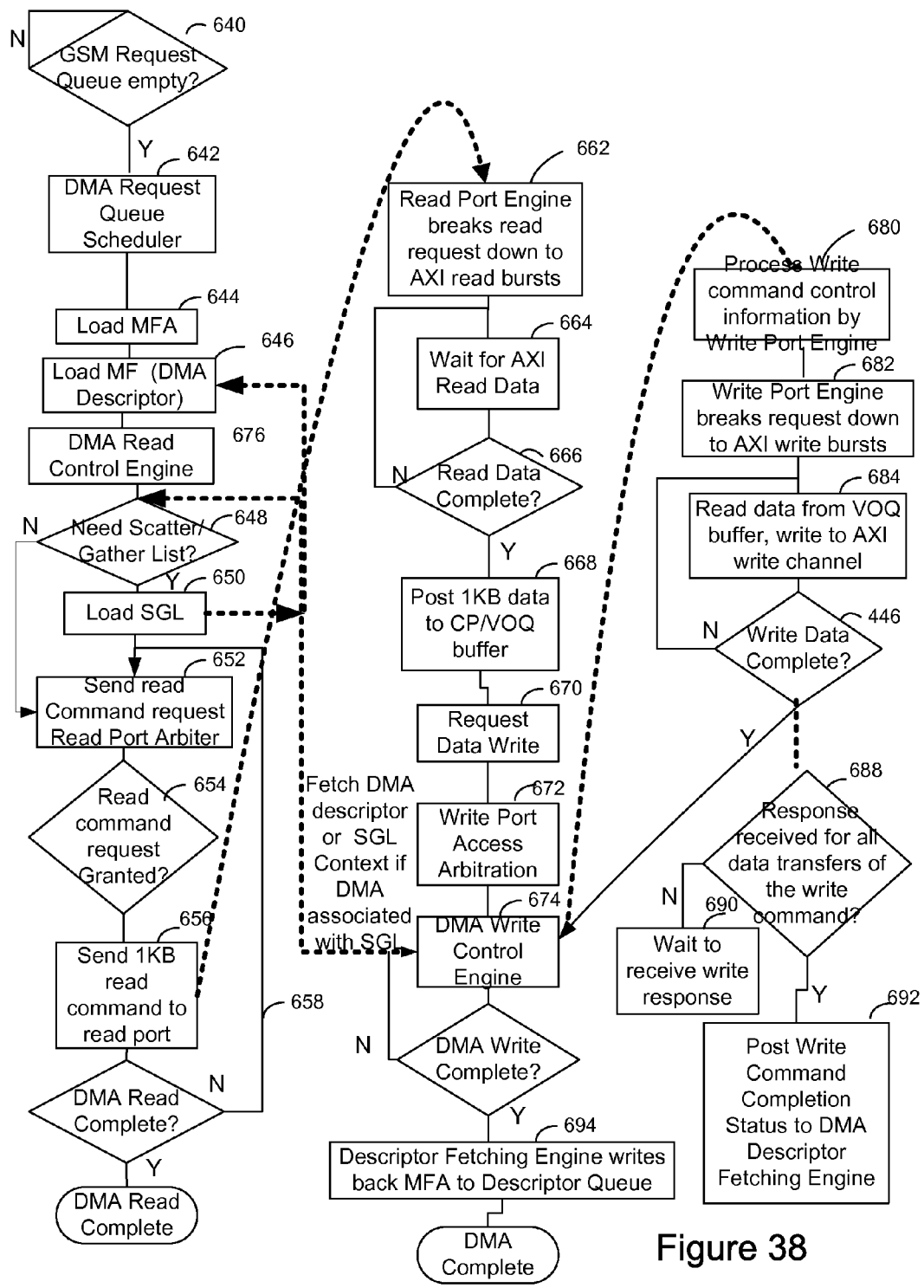
FIG. 38 illustrates a dataflow algorithm for a single DMA transfer using a DMA controller according to an embodiment of the present invention.

FIG. 34 illustrates an implementation of the descriptor fetching logic for a single channel and its interface with the DMA engines, DMA requestor 546, source read port memory 548 and sink write port memory 550. Embodiments of the present invention can be implemented in SAS RAID controllers, and SPC SAS protocol controller devices. FIG. 35 depicts the interface between DMA 560 with the memory sub-systems namely DDR 562, PCIe 564 and GSM 566, while FIG. 36 illustrates the system block diagram of a DMA controller and FIGS. 37A and 37B describes the functional dataflow operation of the embodiment. FIG. 38 illustrates the dataflow chart of a single DMA transfer for a specific DMA direction using the illustrated DMA controller. Since DMA supports multiple concurrent DMA transfers within the same DMA direction and across multiple DMA directions, the dataflow chart for multiple DMA transfer can be interpreted as multiple independent threads following the same protocol depicted in the dataflow chart.

The DMA engine 560 includes queue arbiters 570 for each DMA direction. These arbiters 570 poll through the request queues 572 (steps 640, 642) activated by the DMA requester 546 for data transfer and grant accesses based on the arbitration scheme. The DMA descriptor fetching engines 540 present in the DMA control processing unit 574 will send their requests to DMA read arbiter engine 576 so as to read the Descriptor Index (MFA) (step 644) and subsequently the DMA descriptor (step 646) via the AXI interface 578. Since the AXI interface 578 supports independent address and data channels, the DMA descriptor fetching engine 540 can fetch multiple descriptors concurrently.

TABLE 1a

DMA MFA Structure:

| Bit | Type | Function |
| --- | --- | --- |
| 63:32 | R | MFA Application Tag[31:0] |
| 31 | W | Success |
| 30:22 | W | Error Status[8:0] |
| 21:20 | W | Reserved |
| 19:0 | R | MFAddress [22:3] |

The DMA descriptor specifies how data movement operations are to be executed. The DMA descriptor is defined as a Message Frame (MF) and the address pointer to the MF is called Message Frame Address (MFA). The MFA pointers are written and read out of the messaging queues and the MFs are stored in the shared memory of DMA requester. The format of Message Frame Address and the descriptor are illustrated in Table 1a and Table 2a.

TABLE 2a

DMA Descriptor Format:

| 32bit Word | Address | Description |
| --- | --- | --- |
| 0 | 0x00 | SA[31:0] |
| 1 | 0x04 | SA[63:32] |
| 2 | 0x08 | DA[31:0] |
| 3 | 0x0C | DA[63:32] |
| 4 | 0x10 | Descriptor Control Word 1 |
| 5 | 0x14 | Descriptor Control Word 2 |
| 6 | 0x18 | MF Application Tag |
| 7 | 0x1C | Reserved |

Table 1b below is an alternate DMA MFA structure which can be used.

TABLE 1b alternate DMA MFA Structure:

| Bit | Description |
|---|---|
| 63-48 | Application Tag/IO Tag [15:0] |
| 47-44 | Reserved |
| 43-40 | RAID Engine Num [3:0] |
| 39-32 | End to End CRC [7:0] |
| 31 | DMA Failure |
| 30 | Reserved |
| 29 | CRC Error |
| 28-24 | Error Status |
| 23 | CRC Enable |
| 22 | RAID Engine Enable |
| 21 | RAID Type |
| 20-0 | MF [23:3] |

Table 2b below is an alternate MF descriptor (MF) format which can be used.

TABLE 2b alternate descriptor (MF) format:

| 32bit Word | Address | Description |
|---|---|---|
| 0 | 0x00 | SA[31:0] |
| 1 | 0x04 | SA[63:32] |
| 2 | 0x08 | DA[31:0] |
| 3 | 0x0C | DA[63:32] |
| 4 | 0x10 | Descriptor Control Word 1 |
| 5 | 0x14 | Descriptor Control Word 2 |
| 5 | 0x18 | Descriptor Control Word 3 (Inter Descriptor Field) |
| 7 | 0x1C | MF/OSSP Application Tag |

Descriptor Control Word 1 contains control information about DMA transfer byte count, Source_SGL, Dest_SGL, Source_Endian, Dest_Endian, DMA Bypass Mode. Descriptor Control Word 2 contains control information about DPI (hole) insertion and removal.

TABLE 3

Source Address Fields:

| DMA | No Scatter/Gather (SOURCE_SG = 0) | | Scatter/Gather (SOURCE_SG = 1) | |
|---|---|---|---|---|
| Source | SA[63:32] | SA[31:0] | SA[63:32] | SA[31:0] |
| DDR | Upper 32-bit DDR address | Lower 32-bit DDR address | DDR Scatter/Gather Logic Address | |
| PCI | Upper 32-bit PCI address | Lower 32-bit PCI address | PCI Scatter/Gather LogicAddress | |
| GSM | Always 0 | GSM address | Always 0 | GSM address |

TABLE 4

Destination Address Fields:

| DMA | No Scatter/Gather (DEST_SG = 0) | | Scatter/Gather (DEST_SG = 1) | |
|---|---|---|---|---|
| Destination | DA[63:32] | DA[31:0] | DA[63:32] | DA[31:0] |
| DDR | Upper 32-bit DDR address | Lower 32-bit DDR address | DDR Scatter/Gather Logic Address | |

TABLE 4-continued

Destination Address Fields:

| DMA | No Scatter/Gather (DEST_SG = 0) | | Scatter/Gather (DEST_SG = 1) | |
|---|---|---|---|---|
| Destination | DA[63:32] | DA[31:0] | DA[63:32] | DA[31:0] |
| PCI | Upper 32-bit PCI address | Lower 32-bit PCI address | PCI Scatter/Gather Logic Address | |
| GSM | Always 0 | GSM address | Always 0 | GSM address |

When the Source_SGL bit in the DMA descriptor is not set, SA [63:0] fields are used as the beginning of source address. When the Source_SGL bit in the DMA descriptor is set, this DMA source address is using scatter/gather mode. When the Dest_SGL bit in the DMA descriptor is not set, DA [63:0] fields are used as the beginning of destination address. When the Dest_SGL bit in the DMA descriptor is set, this DMA destination address is using scatter/gather mode. If scatter/gather mode is indicated (step 648), the appropriate SGL is loaded (step 650).

For a specific channel, on fetching a descriptor, the DMA descriptor fetching engine 540 can store the descriptor context information for read and write operations in two separate descriptor buffers 580, 582. The DMA engine 560 supports processing multiple DMA transfers concurrently for the same channel. These descriptor ring buffers 580, 582 will be filled with descriptors as long as there is an empty slot available in the buffer provided that there are valid DMA requests issued by the DMA requester 546. Each DMA channel has a set of read DMA control engine 586 and write DMA control engine 588.

In case of a read DMA operation, the read DMA control engine 586 can send request and fetch descriptors from read DMA descriptor buffers 580. Based on the DMA transfer byte count, it will break the read DMA transfer into multiples of 1 Kbyte read commands (step 656). In case of DMA transfer involving SGL on source port, the read DMA control engine 586 can issue a request on source port arbiter 590 and when granted access to the SGL controller 591, it can issue the logical address to fetch the physical translated address and fragment byte count. The mechanism to fetch translated addresses by the SGL controller 591 is based on the address translation scheme described above. On completion of issuing read commands for the DMA in-flight (loop 658), even while the data for read commands is in-flight, the read DMA control engine 586 issues a posted completion status to the descriptor fetching engine 540 and fetches a new DMA descriptor.

Each source read port has a corresponding port arbiter interface 590. The read DMA control engines 586 that have a common source read port post their requests towards the source port arbiter 590 (step 652). The access is granted to one read DMA control engine 586 at a time based on the availability of buffer slots in the VOQ data buffer (step 654). The granted read DMA control engine 586 now has full accessibility over the read DMA port engine 592.

The read DMA port engine 592 comprises a read request control engine 600, VOQ data buffer 602 to store the processed data and read DMA data processing engine 604. On receiving a 1 Kbyte read command (step 656), the request control engine 600 can issue multiple AXI read transactions (step 662) to fetch the 1K data (step 664), until the read request is complete (step 666). If the address is unaligned, the first read transaction can align the address to the closest burst boundary so that the subsequent read transfers optimally utilize the bandwidth. On completion of the read command, the read DMA port engine 592 can be granted to the next pending 1K read command. In this way, while the data is in flight, owing to longer round trip data latency, the read DMA port engine 592 can support multiple read AXI transactions concurrently. The read DMA data processing engine 604 can receive the incoming data from the source port data channel. This DMA data processing engine 604 can thereby identify the location of the DPI holes, and remove them if present, (specified in the DMA descriptor control word 2), pack all the valid bytes into double words (32-byte words) by performing data width adjustment. If the data stream requires an endian mode translation, the read DMA data processing engine 604 performs endian conversion and then the resulting data is stored in the allocated buffer slot in VOQ data buffer 602 (step 668). The VOQ data buffer 602 has dedicated buffer slots for each DMA direction so that it has the capability to support concurrent multiple DMA transfers from different DMA channels.

The crossbar switch based datapath module 610 consists of VOQ arbiter 612 that grants access to the requests issued by write DMA control engines 588 for accessing the corresponding write DMA port engine 614 (step 670). It also has control logic to steer the control information between source read port 548 and sink write port 550 when the connection is made for DMA transfer. The VOQ arbiter 612 monitors the FIFO status of VOQ data buffer 602 and whether the write DMA port engine 614 is ready to accept data. Based on these inputs, it grants access to one of the pending requests issued by write DMA control engine 614 (step 672).

The write DMA control engine 588 fetches the descriptor information from the write descriptor ring buffer 582 as well as byte count information of the slots filled in VOQ data buffer 602 for that specific DMA channel. Based on the slot byte count, it issues write command requests towards the VOQ arbiter 612 for grant of write DMA port engine 614. It issues DMA transfer posted completion status towards the appropriate descriptor fetching engine 540 when all the write commands for the DMA have been issued and proceeds forward to fetch new descriptor (step 674). On receiving responses for all the write commands that are in flight for a particular DMA, the write DMA control engine 588 issues DMA transfer response completion status to the descriptor fetching engine 540 (step 692). The descriptor fetching engine 540 uses these completion status to issue a new descriptor to write DMA control engine 588 and as well as to write back the DMA completion status to DMA requester 546 (step 694).

The write DMA port engine 614 comprises a write request control engine 616, and write DMA data processing engine 618. For the memory interfaces that do not support back pressuring data, the write DMA port engine 614 may contain a memory buffer to store data read from the VOQ data buffer 602 so to sustain the transfer bandwidth. The write request control engine 616 and write DMA data processing engine 618 receive write commands from the upstream write DMA control engine 588 and issue multiple AXI write transactions towards the sink write memory interface (step 682). The write request control engine 616 has the capability to break the transaction into multiple transfers with contiguous write strobe (write enable), if the data happens to be non-contiguous. For example, if the write command was to write 8 bytes of data across an address 0x0000 such that write strobe was 11000111, the write request control engine will break this write transaction into two write transfers, the first with address 0x0000 and write strobe 00000111 and the second with address 0x0006 and write strobe as 11000000. The write DMA data processing engine 618 issues data for the respective write address request across the write AXI interface of the sink (destination) write port 550.

The write DMA data processing engine 618 consists of a data de-aligner module that adjusts the data read from VOQ data buffer 602 to appropriate data bus width of the destination port. In case of DMA data transfer in SGL mode, it contains control logic to send requests to the SGL interface arbiter. When the arbiter grants access, it issues the relevant logical address in order to fetch the translated physical address of the destination port and fragment byte count. On receiving a write command from the write DMA control engine 588, the write DMA data processing engine 618 issues control logic to read data present in the source VOQ buffer slot, adjust the data to the appropriate bus width of the destination port and transmit it via the AXI Interface bus (step 684). It also consists of control logic to insert DPI holes and endian conversion if the appropriate bits in Descriptor Control Word 1 and Descriptor Control Word 2 are asserted.

Performance of SGL mode DMA transfers of the presently described DMA engine embodiment, can be enhanced by improving concurrency of existing processes which otherwise bottleneck overall performance. For example, SGL DMA transfer concurrency, minimizing dependency on read data fetching, and caching SGL elements that belong to current and following DMAs, either alone or in combination can improve performance of DMA transfers in SGL mode.

Concurrency of SGL DMA Transfers

During a write DMA transfer, previous DMA engines could handle multiple DMAs only in two independent operations—DMAs in write address/data phase and DMAs in write response completion phase. This was due to the fact that the write DMA operation was not initiated until source data has been stored in the VOQ buffer. In a present embodiment, the write DMA control/port engines in that are responsible for write data transfer can handle multiple DMAs in three to four concurrent threads—DMAs in logical to physical address fetch, DMAs in write address/data phase, and DMAs in write response completion phase. This can be achieved by introducing concurrency of SGL requests and data transfers which are independent of read and write DMA operation, namely by initiating fetching of write SGL physical address context concurrently with read DMA operation. FIG. 38 reflects the original embodiment of the invention. In an enhancement of the same in alternate embodiment, the Write Control engine 674 can pre-fetch descriptors from descriptor fetching engine 646 and initiate pre-fetching SGL context (steps 648 and 650) while the write data transfer (steps 684 and 446) and write response completion phase (step 688) can happen concurrently.

Minimizing Dependency on Read Data Fetch

The write control engine of previous DMA engines fetched SGL Context required for initiating write commands only after the completion of the read command transfer. For example, in the previously described DMA engine embodiment, performance bottlenecks in the case of DMA transfers involved with logical address translation can arise. Although read and write DMA transfers are processed independently, in case of DMA transfers involved in SGL mode, if the destination port is configured in SGL mode, the write DMA control engine will not issue a request to the SGL controller for logical to physical address (LA→PA) translation until the data for the corresponding read command has been fetched and stored in the respective buffer slot. As a result, the write DMA control engine cannot process the DMA descriptor and generate write commands required for write data transfer due to dependency on the read DMA data fetch operation.

Figure 2A:
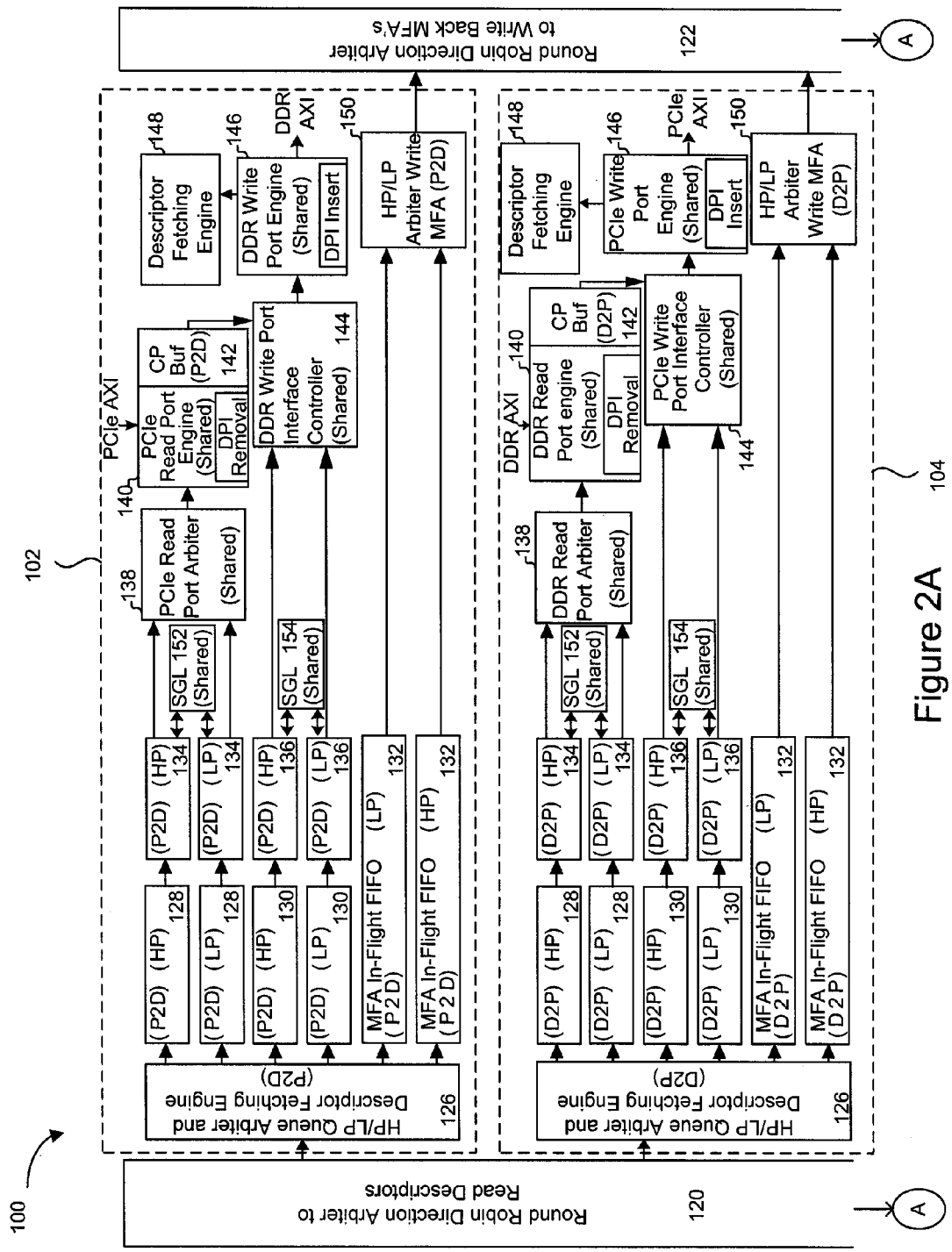
FIGS. 2A, 2B, 2C and 2D shows a block diagram of a DMA engine architecture, according to an embodiment of the present invention.
Figure 2B:
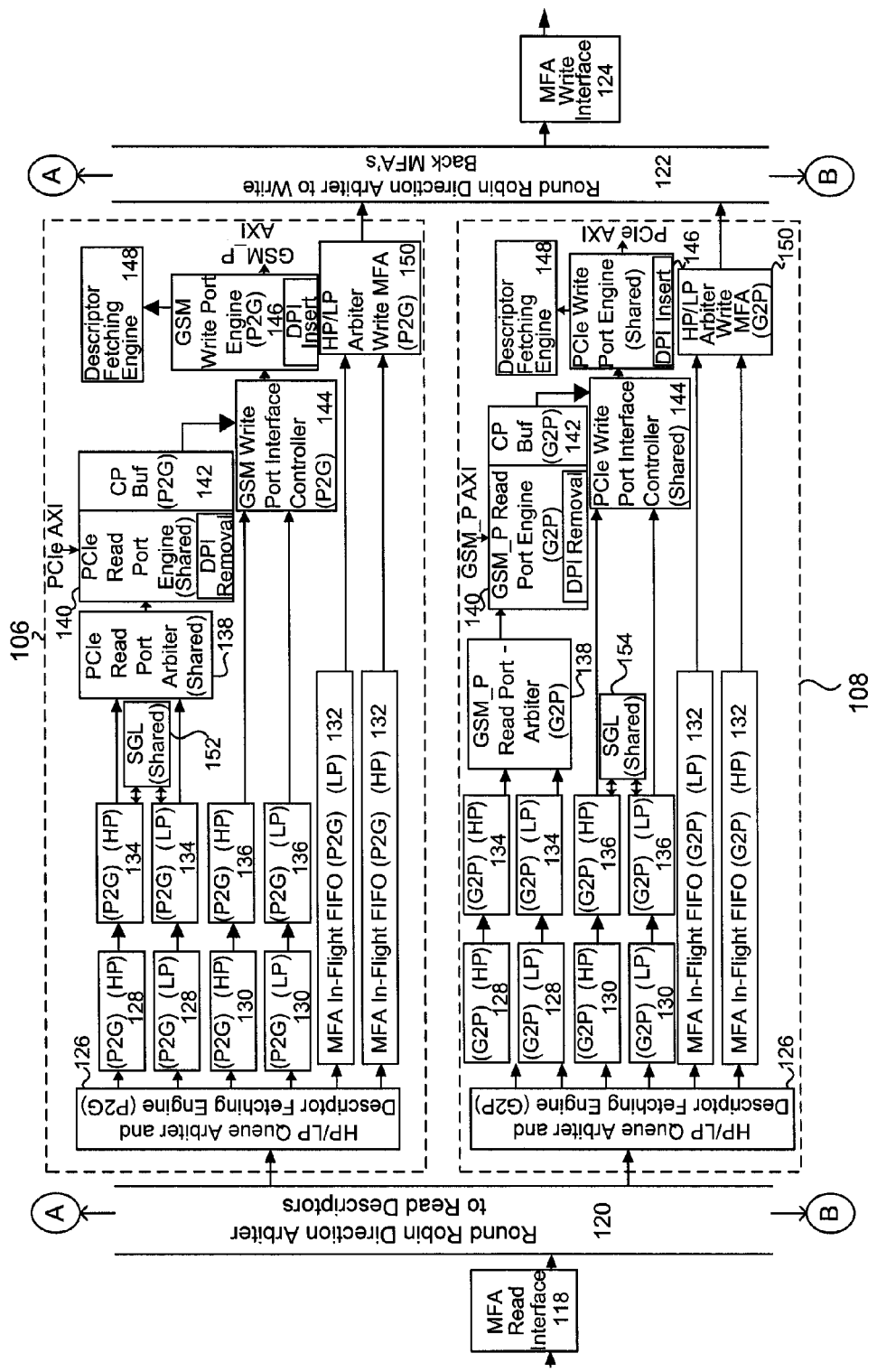
Figure 2C:
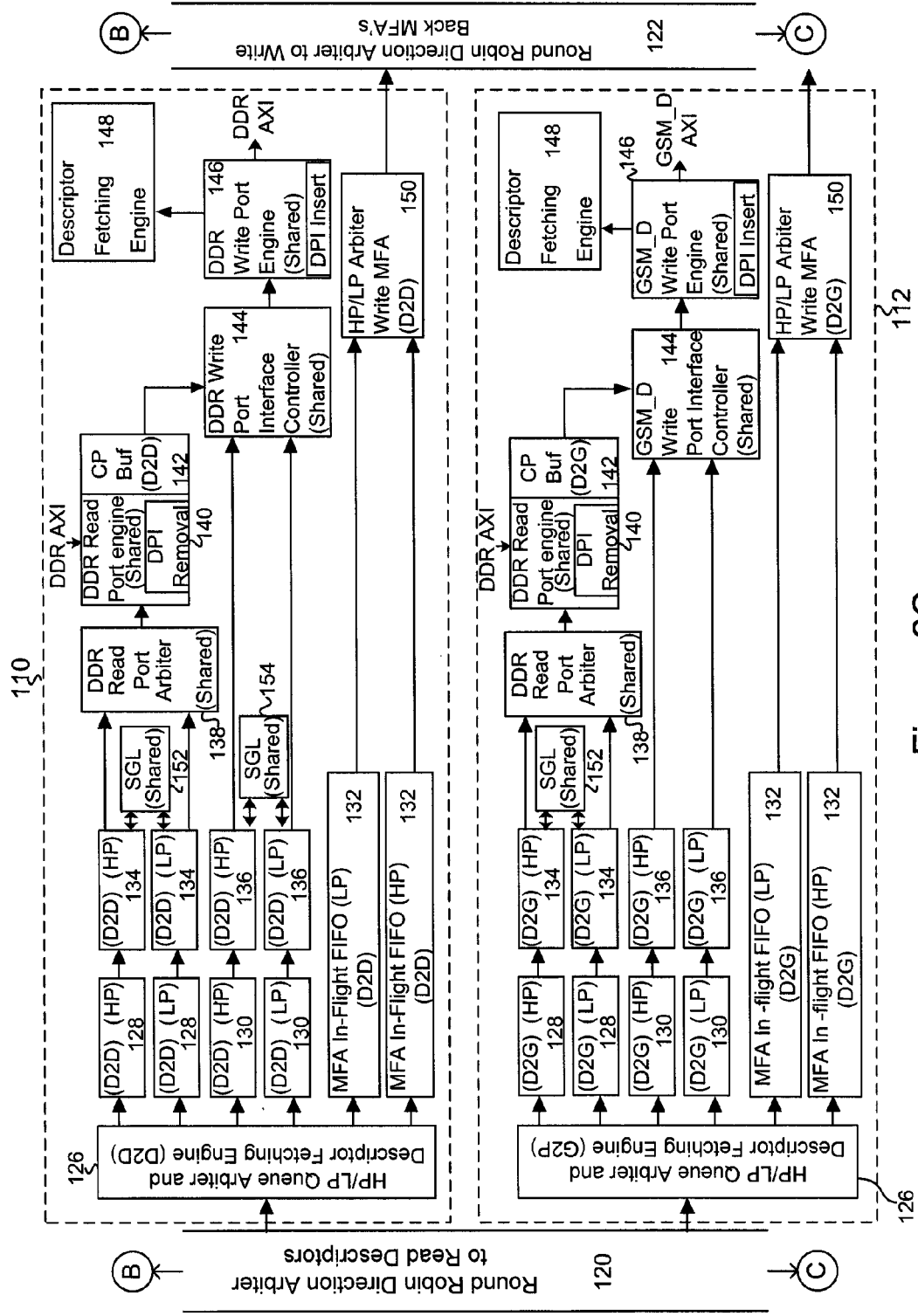
Figure 2D:
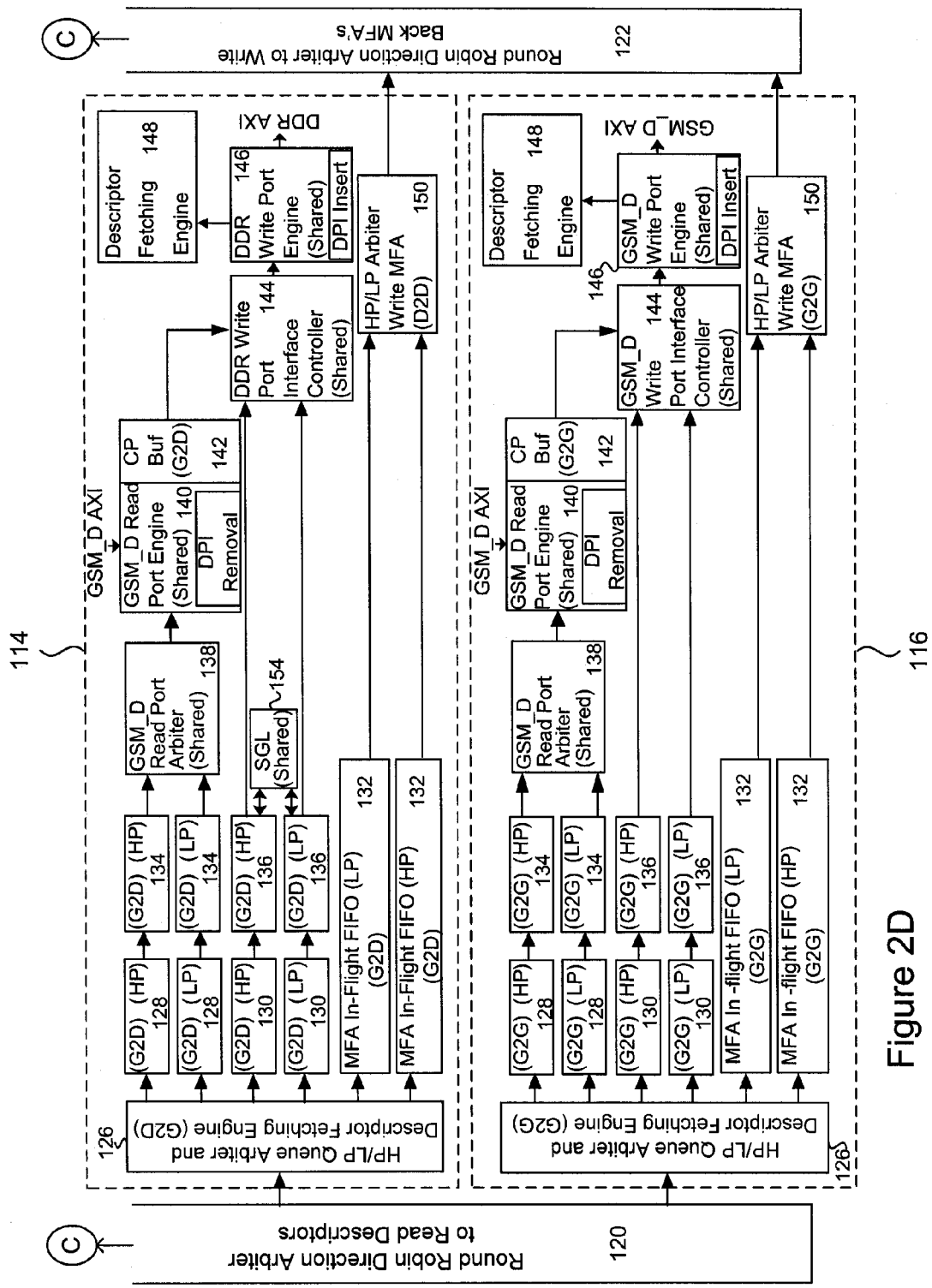

In the present embodiment, the write DMA control engine issues a request towards the SGL cache controller for LA→PA address translation as soon as it fetches a new descriptor, wherein the destination port is configured in SGL mode. The SGL fragment information received as part of the address translation is stored in pre-fetch FIFOs residing in write control engine 136 and utilized when the corresponding write DMA port engine 146 (as shown in FIG. 2A) requests for physical address context when processing the write commands. Accordingly, concurrency in fetching physical address context required for write data transfer without waiting for the completion of read data transfer is obtained. Now the write control engine operates independently of read command completion in initiating requests to fetch SGL context. As illustrated in FIG. 38, the DMA Write Control engine (step 674) fetches new DMA descriptor (step 646) on a parallel thread in concurrent process to read control logic (step 676—dotted line) as soon as it processes the last write command of the current DMA descriptor. If the new DMA descriptor is associated with SGL transfers, then the write control engine will pre-fetch the SGL fragments associated with the DMA transfer as indicated in steps (648 and 650—dotted line). This SGL context information is passed over from write control engine to write port engine during the processing of write command by the write port engine (step 680).

Caching SGL elements

In case of DMAs associated with SGL mode, the previously described DMA engine embodiment does not pre-fetch the physical address (PA) context for all the SGL fragments associated with the DMA. As a result, the DMA engine has to issue requests towards the SGL Cache controller whenever it finished consuming the SGL fragment for read/write data transfer. Such SGL requests are arbitrated for grant of access in fetching SGL context by the SGL cache controller. This results in unnecessary wait cycles that could otherwise be used in read/write data transfer for more efficient performance.

According to a present embodiment, SGL fragments that belong to a current DMA and the next DMA are pre-fetched and cached while processing data transfer of the current DMA is underway. The control information of these SGL fragments are stored in pre-fetch FIFO inside the respective Write Control engine 136.

More specifically, in case of DMAs configured with destination SGL mode, the write DMA control engine pre-fetches the control information of all SGL fragments associated with the DMA. If all the write commands have been issued for the fetched DMA, then it proceeds to fetch the next DMA descriptor and pre-fetch all the SGL fragments for the next DMA. Although this preferred embodiment is described for the destination port, the same pre-fetch and caching scheme can be extended to pre-fetch all the SGL fragments associated with read DMA data transfer.

While a theoretical operation of the previously described DMA engine embodiments should be optimal, unforeseen problems can arise with the actual hardware implementation of the DMA engine. Therefore, troubleshooting, robustness and testing features are built in to the DMA engine to assist manufacturers and users in assessing potential problems or actual performance of the device.

Error Detection and Error Handling

In some DMA engines, detection of a fatal error can trigger an interrupt and unnecessarily freeze or halt all DMA operations. For example, as previously described for the present DMA engine embodiments, if the DMA requests data beyond the last SGL element's size, the SGL controller can trigger an error interrupt, and halt all operations. In some DMA engines, any error is simply categorized as a fatal error. This may require resetting the DMA controller for re-starting data transfers, which would severely impact performance of the system.

According to a present embodiment, the possible error types encountered during operation are categorized into those that are fatal and those that are non-fatal. The DMA engine 352 or 372 (see FIGS. 12 and 13) can be configured to determine these types of errors, such as the previously described error typed. More specifically, the generated error types are stored in error registers and decoded to determine if they are fatal or simply DMA errors. Unless the appropriate control registers related to the error type are configured as the fatal type, the DMA engine is permitted to continue processing the incoming DMA requests and perform data transfer. Furthermore, in case of non-fatal errors that do not freeze DMA operations, the DMA engine propagates the error status to be captured in DMA Completion Status registers as well as in Error Status registers for interrupting firmware as soon as the first error is triggered. This enhancement in error handling feature provides firmware better control on error handling and error recovery.

Figure 39:
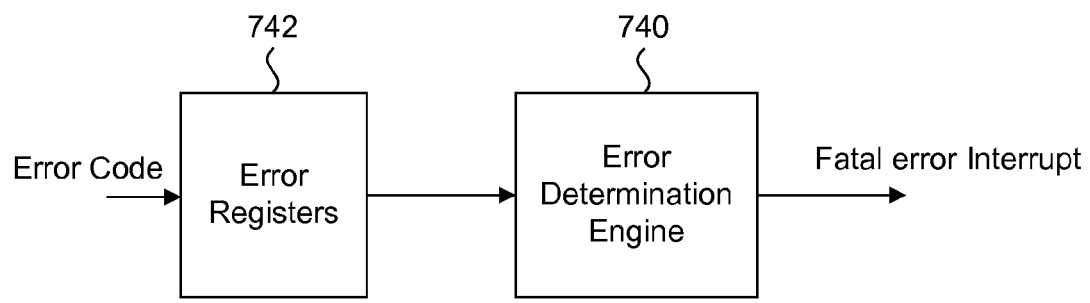
FIG. 39 is a simplified block diagram showing an error determination engine, according to an embodiment of the present invention.

In the present embodiments, each of the sub-blocks of the previously described DMA engine are configured to report at least one particular error code in the event of some type of failure occurring therein. FIG. 39 is a simplified block diagram showing an error determination engine 740 which receives error codes stored in error registers 742. The error codes are provided by the aforementioned sub-blocks where the error occurred, and there can be any number of error registers configured for storing one or more codes provided from different sub-blocks. The error determination engine 740 includes logic for processing the error register codes and determining if they are fatal or non-fatal. If the error code is determined to be of the fatal type, then a fatal error interrupt status signal is issued to trigger a freeze of all DMA operations. For example, the most significant digits of the error code can be decoded to represent a fatal type of error, which can easily be detected by appropriately configured logic circuitry.

DMA Bypass Mode

System level performance analysis can be improved by configuring the DMA controller to support a DMA transfer where the descriptor is fetched and written back immediately without transferring data from source node to sink node. According to the present embodiment, DMA control structure processing and SGL translation request processing can be executed without executing any actual data transfer, and writing of the DMA completion status can be skipped. Buy purely bypassing DMA without doing any control processing, cleanup of some of the control information initiated by firmware for performing data transfers is facilitated, and/or speedup of dataflow performance by letting firmware skip in not reading some of the transfer completion tags can be achieved. This mode is also useful in bandwidth analysis of the sub-systems during system level performance tests.

The DMA bypass mode is entered by configuring specific fields in the DMA descriptor. Not only is the DMA engine and controller configured to recognize the bypass mode and the specific bypass functions, they are configured modify existing operations with the described bypass functions. Specific configuration of the control bits in these fields of the DMA descriptor can enable the various bypass functions described above. For example, a specific control bit configuration in the DMA descriptor can initiate the DMA bypass mode, while enabling skip writing back the DMA Completion Status after performing data transfer. This feature facilitates firmware in skipping or inhibiting unnecessary memory reads in reading DMA Completion status where the status is expected.

In another example of the bypass mode feature where a DMA is involved with SGL data transfer wherein there is no data transfer involved, the system will process the DMA descriptor, initiate a request towards the SGL Controller for logical to physical address translation, and then reports back the DMA completion status. If the SGL Controller detects errors while fetching the SGL fragments, the error status is propagated towards DMA controller which BDMAv will in-return report back the error as part of DMA Completion Status.

DMA Data Protection

The addition of parity bits to data is used during data transfer to ensure integrity of the data. The processing of parity is typically done at the interface level of the DMA engine, when data is received by the DMA engine or output by the DMA engine. This ensures that received and provided data is protected, meaning that the data is either free of bit errors or correctable to avoid re-transmission of the data. In prior DMA engines, parity support is provided only at the interface level. According to a present embodiment, the internal components of the DMA engine are configured to support the use of parity. Hence true end-to-end data protection is provided. Within the DMA engine, new parity information is generated prior to transfer, passed with the data during transit within the DMA engine, and then processed for any data error just before output, and then the data is output with new parity information at the interface level.

In the present embodiment, data protection in transit within the DMA engine is provided using byte and word level parity in addition to supporting CRC (cyclic redundancy check). Provided the data received at the DMA engine interface is determined as being error free after processing of the accompanying parity information, new parity information is generated at the read port receiving the data, such as read port 140 of FIG. 2A. This parity information and the data is transferred to the write port, such as write port 146 of FIG. 2A, and processed therein. If an error is detected after processing of the parity information, then the appropriate error code can be issued. Responses can include the re-transmission of the data from the read port or correction of the data if permitted by the selected parity scheme. Otherwise, if there are no errors detected, then write port transmits the data. The interface level parity can be referred to as global parity while the internal parity used within the DMA engine can be referred to as local parity which is transparent to the user. Hence any type of parity scheme can be used to implement the local parity.

Diagnostic Support

In prior art DMA engines, only the last read and write address issued across the memory subsystems interfacing to the DMA engine could be monitored. These are for example, AXI port level addresses. According to a present embodiment, diagnostic support is enhanced by reporting the status of internal control signals such as current and previous states of FSM (finite state machines), arbitration grants, and read/write addresses initiated by the DMA Controller. The status of these control signals are captured in registers called debug mode registers that are selected using a one-hot encoded mux. Based on the user selection of the selection mode of this multiplexer, the status of the appropriate debug mode register is latched into the user accessible debug status register.

Performance Counters

DMA performance cannot be easily determined from monitoring the status of internal control signals, the occurrence of arbitration grants or the initiation of read/write addresses. Performance is typically a measure of a number of repeated operations of a specific type executed over a given time interval, where the operations can include a number of clock cycles or events of a specific type. According to a present embodiment, performance counters for measuring performance metrics are included throughout the DMA engine for counting the occurrence of particular events in time intervals, of 1 second for example. Examples of the performance metrics to monitor using the performance counters include DMA throughput, idle time, descriptor fetch throughput and SGL cache efficiency. Such performance counters can be implemented on a per-direction, per-port or per-SGL cache region. Examples of such performance counters appears in Tables 5, 6 and 7.

Table 5 is a non-exhaustive listing of per-direction performance counter types and a corresponding functional description for each.

TABLE 5

Per-Direction Counters

| Count Type Name | Function |
| --- | --- |
| Total DMA descriptor count per channel counter | Counts the number of descriptors per channel |
| Total DMA byte counter | Accumulates the DMA transfer size of all descriptors associated with the DMA channel with 8-byte granularity |
| Idle counter | Number of clock cycles when there are no descriptors posted for the DMA channel |
| SGL cache DMA counter | Accumulates the DMA transfer size of all DMAs assigned for a specific cache line |
| SGL cache BST context change counter | Counts every time the BST context changes on a specific cache line |

Table 6 is a non-exhaustive listing of per-port performance counter types and a corresponding functional description for each.

TABLE 6

Per-Port Counters

| Count Type Name | Function |
| --- | --- |
| Total DMA descriptor count per source port | Counts the number of descriptors per source port |
| Total DMA byte count per source port | Accumulates the DMA transfer size of all descriptors associated with a source port (8-byte granularity) |
| Total DMA descriptor count per destination port | Counts the number of descriptors per destination port |
| Total DMA byte count per destination port | Accumulates the DMA transfer size of all descriptors associated with a destination port (8-byte granularity) |
| Read address accept count | Number of valid read address requests issued towards a source port. (ARVALID& ARREADY) |
| Read unaligned address accept count | Number of valid unaligned read address requests issued towards a source port. (ARVALID& ARREADY) |
| Read address backpressure count | Number of cycles that source port backpressured BDMAv in accepting read address requests. (ARVALID & ~ARREADY) |
| Read data accept count | Number of valid read data requests issued towards a source port. (RVALID& RREADY) |
| Read data backpressure count | Number of cycles that the source port back-pressured BDMAv in accepting read data requests. (RVALID & ~RREADY) |
| Write address accept count | Number of valid write address requests issued towards a destination port. (AWVALID& AWREADY) |
| Write unaligned address accept count | Number of valid unaligned write address requests issued towards a destination port. (AWVALID& AWREADY) |

TABLE 6-continued

Per-Port Counters

| Count Type Name | Function |
| --- | --- |
| Write address backpressure count | Number of cycles that destination port backpressured BDMAv in accepting write (address requests. AWVALID& ~AWREADY) |
| Write data accept count | Number of valid write data requests issued towards a destination port. (WVALID& WREADY) |
| Write data backpressure count | Number of cycles that destination port backpressured BDMAv in accepting write data requests. (WVALID& ~WREADY) |
| Write response backpressure count | Number of cycles that destination port backpressured BDMAv in accepting write response requests. (BRESPVALID & ~BRESPREADY) |

Table 7 is a non-exhaustive listing of per-cache region performance counter types and a corresponding functional description for each.

TABLE 7

Per-Cache Region Counters

| Count Type Name | Function |
| --- | --- |
| Cache line hit count | The number of cache hits (BST is valid in cache) |
| Cache line miss count | The number of cache misses (BST is not in cache) |
| Cache element hit count | The number of cache element hits (BST is valid elements in cache) |
| Cache element miss count | The number of cache element misses (BST does not have valid elements in cache) |
| Cache element TLR count | The number of times offset stored in the cache is greater than the offset being requested in the DMA |
| Cache prefetch available count | The number of times the prefetch was requested and a prefetch slot was available |
| Cache prefetch unavailable count | The number of times the prefetch was requested and request was dropped due to prefetch slot was not available |
| Cache BST_BVT fetch accumulated latency | Accumulates total clock cycles a BST or BVT fetch is outstanding |
| Cache BST_BVT fetch count | The total number of BST or BVT fetches |
| Cache BVT writer stall accumulated latency | Accumulates the total clock cycles the cache FSM is stalled waiting for BVT write back to finish |
| Cache BVT write stall count | The number of times the cache FSM is stalled waiting for BVT write back |
| Cache SG/Index list element fetch accumulated latency | Accumulates total clock cycles a SG/Index list element fetch is outstanding |
| Cache SG/Index list element foreground fetch count | The total number of foreground SG/Index list element fetches |

Figure 40:
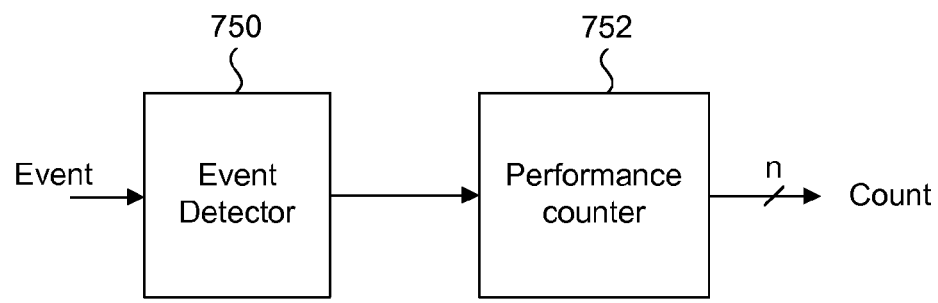
FIG. 40 is a simplified block diagram showing a performance monitor, according to an embodiment of the present invention.

Each of the counters of Tables 5, 6 and 7 can include a respective detector for monitoring activity on a suitable node of the circuits involved with the function to be monitored. FIG. 40 is a simplified block diagram showing a general performance monitor according to a present embodiment. The performance monitor includes an event detector 750 and a performance counter 752. The event detector 750 is connected to a node of a particular circuit for which the specific function is to be counted. Preferably, the node provides some signal that can be determined as a count to be measured. The signal Event generically represents such a signal. The detected event is signaled to the performance counter in the form of a pulse for example. The performance counter 752 includes a counter of a predetermined bit width n, which increments in response to the received pulse. The event detector 750 can be integrated with the performance counter 752, which may not be required in some embodiments.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method for operating a direct memory access (DMA) engine for data transfer operations, comprising:
   concurrently fetching at least two DMA descriptors, each of the at least two DMA descriptors corresponding to respective data transfer operations between devices;
   processing each of the at least two DMA descriptors for determining a source device and a destination device, read address information of data to be read from the source device and write address information of the destination device where the data is to be written, and executing logical to physical address translation of at least one of the read address information and the write address information;
   generating multiple read and write commands corresponding to each of the at least two DMA descriptors;
   executing concurrent data transfer of data between source ports and destination ports of the DMA engine in response to the read and write commands; and,
   reporting in order DMA completion status for each of the at least two DMA descriptors.

2. The method of claim 1, further comprising pre-fetching a new DMA descriptor in response to completion of all requests related to the read and write command corresponding to a source port and a destination port.

3. The method of claim 1, further comprising pre-fetching a new DMA descriptor in response to acceptance of all requests related to the read and write command corresponding to a source port and a destination port.

4. The method of claim 1, wherein at least one of the at least two DMA descriptors comprises a field configured for DMA bypass mode operation to process control information for the at least one of the at least two DMA descriptors, and inhibiting the logical to physical address translation and the steps of generating and executing.

5. The method of claim 1, wherein at least one of the at least two DMA descriptors comprises a field configured for DMA bypass mode operation to process control information for the at least one of the at least two DMA descriptors and inhibiting the step of reporting.

6. The method of claim 1, wherein at least one of the at least two DMA descriptors comprises a field configured for DMA bypass mode operation to process control information for the at least one of the at least two DMA descriptors, and inhibiting the steps of generating and executing.

7. The method of claim 1, wherein a request for logical to physical address translation and fetching of physical address related to write data transfers are executed concurrently with read data transfers.

8. The method of claim 1, wherein processing comprises requesting logical to physical address translation of the write address information concurrently with storing the data read from the source device into a buffer.

9. The method of claim 1, wherein at least one of the source device and the destination device includes a fragmented physical buffer comprising arbitrarily aligned and arbitrarily sized memory fragments defined by at least one scatter/gather list (SGL), and logical to physical address translation comprises:

mapping each of the fragments to contiguous logical offset addresses in a contiguous logical address space equal to a total length of the fragments, and, determining a physical address corresponding to a logical offset address of one of the fragments by:

accessing an SGL element associated with the fragment to determine a physical start address for the fragment; and offsetting the physical start address by the logical offset address less the length of preceding fragments listed in the at least one SGL.

10. The method of claim 9, wherein the step of determining is executed for all the fragments.

11. The method of claim 9, wherein SGL fragment context information is fetched and stored concurrently with write data transfer and read data transfer.

12. The method of claim 1, further comprising monitoring internal control signals of the DMA engine.

13. The method of claim 12, wherein said internal control signals correspond to states of finite state machines, states of arbitration grants or read/write addresses.

14. A method for operating a direct memory access (DMA) engine for data transfer operations, comprising:

concurrently fetching at least two DMA descriptors, each of the at least two DMA descriptors corresponding to respective data transfer operations between devices;

processing each of the at least two DMA descriptors for determining a source device and a destination device, read address information of data to be read from the source device and write address information of the destination device where the data is to be written;

generating multiple read and write commands corresponding to each of the at least two DMA descriptors; and, executing concurrent data transfer of data between source ports and destination ports of the DMA engine in response to the read and write commands, including detecting an error code generated by sub-blocks of the DMA engine during data transfer operations, wherein detecting comprises decoding the error code to be a fatal error type or a non-fatal error type; and the step of executing continues if the error code is decoded to be of the non-fatal error type.

15. The method of claim 14, wherein the step of executing is halted if the error code is decoded to be of the fatal error type.

16. The method of claim 14, further comprising monitoring internal control signals of the DMA engine.

17. The method of claim 16, wherein said internal control signals correspond to states of finite state machines, states of arbitration grants or read/write addresses.

18. The method of claim 14, further comprising pre-fetching a new DMA descriptor in response to completion of all requests related to the read and write command corresponding to a source port and a destination port.

19. The method of claim 14, further comprising pre-fetching a new DMA descriptor in response to acceptance of all requests related to the read and write command corresponding to a source port and a destination port.

* * * * *